United States Patent
Schaffert

(10) Patent No.: US 9,723,777 B2
(45) Date of Patent: Aug. 8, 2017

(54) SUPPORTING DEVICE FOR MOUNTING A FURROW DEVICE ON A SEED TUBE

(71) Applicant: SCHAFFERT MANUFACTURING COMPANY, INC., Indianola, NE (US)

(72) Inventor: Paul E. Schaffert, Indianola, NE (US)

(73) Assignee: Schaffert Manufacturing Company, Inc., Indianola, NE (US)

( * ) Notice: Subject to any disclaimer, the term of this patent is extended or adjusted under 35 U.S.C. 154(b) by 0 days.

(21) Appl. No.: 14/186,673

(22) Filed: Feb. 21, 2014

(65) Prior Publication Data
US 2014/0238285 A1 Aug. 28, 2014

Related U.S. Application Data

(60) Provisional application No. 61/768,378, filed on Feb. 22, 2013, provisional application No. 61/802,359, filed on Mar. 15, 2013.

(51) Int. Cl.
A01C 7/20 (2006.01)

(52) U.S. Cl.
CPC .................. *A01C 7/201* (2013.01)

(58) Field of Classification Search
CPC .............. A01C 7/201; A01C 7/20; A01C 7/00
See application file for complete search history.

(56) References Cited

U.S. PATENT DOCUMENTS

| | | |
|---|---|---|
| 13,683 A | 10/1855 | McCormick |
| 35,510 A | 6/1862 | De Haven |
| 122,299 A | 12/1871 | Wight et al. |
| 176,708 A | 4/1876 | Templin |
| 183,947 A | 10/1876 | Lewis |
| 203,207 A | 4/1878 | Springer |
| 211,601 A | 1/1879 | Springer |
| 221,004 A | 10/1879 | Strayer |
| 252,265 A | 1/1882 | Scofield |
| 288,661 A | 11/1883 | Purdy et al. |
| 308,327 A | 11/1884 | Runstetler |
| 322,841 A | 7/1885 | Miskimen |
| 410,438 A | 9/1889 | Patric et al. |
| 555,897 A | 3/1896 | Crane |
| 789,798 A | 5/1905 | Deterding |
| 889,947 A | 6/1908 | Miller |

(Continued)

FOREIGN PATENT DOCUMENTS

| | | |
|---|---|---|
| DE | 3114771 | 10/1982 |
| DE | 3321490 A1 | 12/1984 |

(Continued)

OTHER PUBLICATIONS

Author Unknown, "1200 Series Advanced Seed Meter Planters", Case lil, 2005, 1-35.

(Continued)

*Primary Examiner* — Christopher J Novosad
(74) *Attorney, Agent, or Firm* — Dorsey & Whitney LLP

(57) ABSTRACT

A supporting device for operably connecting a furrow device to a seed tube of a planting unit for planting seeds into a furrow is provided. The supporting device may include a clip configured to engage the furrow device and the seed tube. The clip may be at least partially positioned inside the seed tube. The clip may at least partially engage a top surface of the furrow device.

33 Claims, 31 Drawing Sheets

(56) References Cited

U.S. PATENT DOCUMENTS

| | | | |
|---|---|---|---|
| 909,137 | A | 1/1909 | Bellerive |
| 1,104,602 | A | 7/1914 | Akers |
| 1,473,297 | A | 11/1923 | Knight |
| 1,691,466 | A | 11/1928 | Burtner |
| 1,934,490 | A | 11/1933 | Elliott |
| 2,096,230 | A | 10/1937 | Elliott |
| 2,533,374 | A | 12/1950 | Hyland |
| 2,554,205 | A | 5/1951 | Oehler |
| 2,753,054 | A | 7/1956 | Becher |
| 2,849,969 | A | 9/1958 | Taylor |
| 2,872,883 | A | 2/1959 | Padrick |
| 3,182,345 | A | 5/1965 | Smith |
| 3,185,837 | A * | 5/1965 | Stern ............... F21V 19/02 362/371 |
| 3,336,885 | A | 8/1967 | Lebow |
| 4,108,089 | A | 8/1978 | van der Lely |
| 4,148,267 | A | 4/1979 | Bennett et al. |
| 4,253,412 | A | 3/1981 | Hogenson |
| 4,276,836 | A | 7/1981 | Pust |
| 4,373,455 | A | 2/1983 | Friggstad |
| 4,420,516 | A | 12/1983 | Ermert et al. |
| 4,445,445 | A | 5/1984 | Sterrett |
| 4,446,801 | A | 5/1984 | Machnee et al. |
| 4,542,705 | A | 9/1985 | Orth |
| 4,565,141 | A | 1/1986 | Kopecky |
| 4,580,507 | A | 4/1986 | Dreyer et al. |
| D285,205 | S | 8/1986 | Johnson |
| 4,607,581 | A | 8/1986 | Kopecky |
| 4,628,841 | A | 12/1986 | Powilleit |
| 4,671,193 | A | 6/1987 | States |
| 4,674,419 | A | 6/1987 | Kopecky |
| 4,779,674 | A | 10/1988 | McNulty |
| 4,911,090 | A | 3/1990 | Schimke |
| 5,092,255 | A | 3/1992 | Long et al. |
| 5,375,542 | A | 12/1994 | Schaffert |
| 5,425,318 | A | 6/1995 | Keeton |
| D376,751 | S | 12/1996 | Hanson et al. |
| 5,640,915 | A | 6/1997 | Schaffert |
| 5,673,638 | A | 10/1997 | Keeton |
| 5,730,074 | A | 3/1998 | Peter |
| 5,852,982 | A | 12/1998 | Peter |
| 5,918,557 | A | 7/1999 | Schaffert |
| 5,996,514 | A | 12/1999 | Arriola et al. |
| D422,483 | S | 4/2000 | Shea |
| 6,067,917 | A | 5/2000 | Nimberger et al. |
| D426,453 | S | 6/2000 | Stearns et al. |
| 6,082,274 | A | 7/2000 | Peter |
| 6,082,275 | A | 7/2000 | Schaffert |
| 6,119,608 | A | 9/2000 | Peterson et al. |
| D436,310 | S | 1/2001 | Arnold |
| 6,209,466 | B1 | 4/2001 | Wodrich |
| 6,220,191 | B1 | 4/2001 | Peter |
| 6,283,050 | B1 | 9/2001 | Schaffert |
| D456,821 | S | 5/2002 | Ege et al. |
| 6,397,767 | B1 | 6/2002 | Dietrich, Sr. |
| D463,251 | S | 9/2002 | Shea |
| 6,453,832 | B1 | 9/2002 | Schaffert |
| 6,530,334 | B2 | 3/2003 | Hagny |
| 6,666,156 | B1 | 12/2003 | Mayerle et al. |
| 6,763,773 | B2 | 7/2004 | Schaffert |
| 7,121,216 | B2 | 10/2006 | Schaffert |
| D557,116 | S | 12/2007 | Zakowski |
| 7,497,174 | B2 | 3/2009 | Sauder et al. |
| D591,776 | S | 5/2009 | Rasset et al. |
| 7,552,689 | B2 | 6/2009 | Schaffert |
| 7,942,102 | B2 | 5/2011 | Schaffert |
| D661,713 | S | 6/2012 | Marchesan |
| D735,770 | S | 8/2015 | Schaffert |
| 2003/0051650 | A1 | 3/2003 | Engelke et al. |
| 2007/0113763 | A1 | 5/2007 | Schaffert |
| 2009/0084295 | A1 | 4/2009 | Schaffert |
| 2010/0212558 | A1 | 8/2010 | Schaffert |
| 2011/0266013 | A1 | 11/2011 | Ryan |
| 2014/0209001 | A1 | 7/2014 | Schaffert |

FOREIGN PATENT DOCUMENTS

| | | |
|---|---|---|
| DE | 3441610 A1 | 5/1986 |
| GB | 320179 * | 10/1929 |

OTHER PUBLICATIONS

Author Unknown, "Cost-Effective Solutions for Real-World Needs", Yetter Profitable Solutions, at least as early as Dec. 21, 2007, Dec. 21, 2007, 1-27.

Author Unknown, "http://precision_planting.com/html/keeton.html", at least as early as Dec. 30, 2000, Dec. 30, 2000, 1 page.

Author Unknown, "Keeton Seed Firmer", J & K Enterprises, 1994, 2 pages.

Author Unknown, "Keeton Seed Firmer, Precision Planting", at least as early as Apr. 9, 2001, 4 pages.

Author Unknown, "Seed to Soil Inforcer", Seed Flap, Spring 1995, 1 page.

Author Unknown, "Tube Alignment Brackets", M & J Cotton Farms, Inc., at least as early as Oct. 30, 1995, Oct. 30, 1995, 1 page.

Author Unknown, "We Know It's All About Strong Roots", Yetter Profitable Solutions, at least as early as Dec. 21, 2007, Dec. 21, 2007, 1-29.

Finck, "Put seed in its place", Farm Journal (Jan. 1995), 16-17.

US Advisory Action dated Oct. 21, 2010, U.S. Appl. No. 12/493,703, filed Jun. 29, 2009, 3 pages.

US Amendment and Response and Terminal Disclaimer to Non-Final Office Action dated Oct. 15, 1998, U.S. Appl. No. 08/881,177, filed Jun. 23, 1997, 13 pages.

US Amendment and Response and Two Terminal Disclaimers to Non-Final Office Action dated Jun. 10, 1998, U.S. Appl. No. 08/881,176, filed Jun. 23, 1997, 15 pages.

US Amendment and Response dated Oct. 11, 1996, U.S. Appl. No. 08/550,088, filed Oct. 30, 1995, 13 pages.

US Amendment and Response to Final Office Action dated Apr. 6, 2001, U.S. Appl. No. 09/563,106, filed May 2, 2000, 5 pages.

US Amendment and Response to Final Office Action dated Jun. 21, 2006, U.S. Appl. No. 10/819,565, filed Apr. 6, 2004, 5 pages.

US Amendment and Response to Final Office Action dated Oct. 15, 2010, U.S. Appl. No. 12/493,703, filed Jun. 29, 2009, 5 pages.

US Amendment and Response to Final Office Action dated Sep. 29, 2011, U.S. Appl. No. 12/773,645, filed May 4, 2010, 8 pages.

US Amendment and Response to Non-Final Office Action dated Apr. 9, 2012, U.S. Appl. No. 12/773,645, filed May 4, 2010, 7 pages.

US Amendment and Response to Non-Final Office Action dated Dec. 18, 2000, U.S. Appl. No. 09/563,106, filed May 2, 2000, 4 pages.

US Amendment and Response to Non-Final Office Action dated Jul. 2, 2010, U.S. Appl. No. 12/493,703, filed Jun. 29, 2009, 6 pages.

US Amendment and Response to Non-Final Office Action dated Jun. 29, 1998, U.S. Appl. No. 08/881,177, filed Jun. 23, 1997, 20 pages.

US Amendment and Response to Non-Final Office Action dated Jun. 30, 1999, U.S. Appl. No. 08/881,177, filed Jun. 23, 1997, 13 pages.

US Amendment and Response to Non-Final Office Action dated Nov. 17, 2003, U.S. Appl. No. 10/228,688, filed Aug. 26, 2002, 13 pages.

US Amendment and Response to Non-Final Office Action dated Nov. 2, 2009, U.S. Appl. No. 11/862,477, filed Sep. 27, 2007, 13 pages.

US Amendment and Response to Non-Final Office Action dated Nov. 24, 1999, U.S. Appl. No. 08/881,177, filed Jun. 23, 1997, 8 pages.

US Amendment and Response to Non-Final Office Action dated Oct. 13, 2008, U.S. Appl. No. 11/169,050, filed Jun. 28, 2005, 7 pages.

US Amendment and Response to Non-Final Office Action dated Dec. 21, 2005, U.S. Appl. No. 10/819,565, filed Apr. 6, 2004, 9 pages.

(56) References Cited

OTHER PUBLICATIONS

US Amendment and Response to Notice of Non-Compliant Response to Restriction Requirement dated May 13, 2008, U.S. Appl. No. 11/169,050, filed Jun. 28, 2005, 7 pages.
US Amendment and Response to Restriction Requirement dated Dec. 20, 2007, U.S. Appl. No. 11/169,050, filed Jun. 28, 2005, 6 pages.
US Amendment and Response to Restriction Requirement dated Jun. 10, 2009, U.S. Appl. No. 11/862,477, filed Sep. 27, 2007, 10 pages.
US Applicant-Initiated Interview Summary dated Apr. 5, 2012, U.S. Appl. No. 12/773,645, filed May 4, 2010, 3 pages.
US Decision dated Nov. 5, 2010 Approving Terminal Disclaimer filed Oct. 15, 2010, U.S. Appl. No. 12/493,703, filed Jun. 29, 2009, 1 page.
US Final Office Action dated Jan. 10, 2001, U.S. Appl. No. 09/563,106, filed May 2, 2000, 5 pages.
US Final Office Action dated Jul. 16, 2010, U.S. Appl. No. 12/493,703, filed Jun. 29, 2009, 6 pages.
US Final Office Action dated Jun. 29, 2011, U.S. Appl. No. 12/773,645, filed May 4, 2010, 8 pages.
US Final Office Action dated Mar. 23, 2006, U.S. Appl. No. 10/819,565, filed Apr. 6, 2004, 5 pages.
US Non-Final Office Action dated Aug. 30, 2007, U.S. Appl. No. 11/582,154, filed Oct. 16, 2006, 11 pages.
US Non-Final Office Action dated Dec. 9, 2011, U.S. Appl. No. 12/773,645, filed May 4, 2010, 7 pages.
US Non-Final Office Action dated Feb. 10, 1998, U.S. Appl. No. 08/881,176, filed Jun. 23, 1997, 11 pages.
US Non-Final Office Action dated Feb. 27, 2012, U.S. Appl. No. 13/109,147, filed May 17, 2011, 14 pages.
US Non-Final Office Action dated Feb. 7, 2011, U.S. Appl. No. 12/773,645, filed May 4, 2010, 8 pages.
US Non-Final Office Action dated Jan. 28, 1998, U.S. Appl. No. 08/881,177, filed Jun. 23, 1997, 13 pages.
US Non-Final Office Action dated Jan. 5, 1999, U.S. Appl. No. 08/881,177, filed Jun. 23, 1997, 10 pages.
US Non-Final Office Action dated Jul. 1, 2009, U.S. Appl. No. 11/862,477, filed Sep. 27, 2007, 10 pages.
US Non-Final Office Action dated Jul. 11, 2008, U.S. Appl. No. 11/169,050, filed Jun. 28, 2005, 6 pages.
US Non-Final Office Action dated Jul. 15, 1998, U.S. Appl. No. 08/881,177, filed Jun. 23, 1997, 11 pages.
US Non-Final Office Action dated Jul. 16, 2003, U.S. Appl. No. 10/228,688, filed Aug. 26, 2002, 10 pages.
US Non-Final Office Action dated Jul. 27, 1999, U.S. Appl. No. 08/881,177, filed Jun. 23, 1997, 9 pages.
US Non-Final Office Action dated Jun. 11, 1996, U.S. Appl. No. 08/550,088, filed Oct. 30, 1995, 6 pages.
US Non-Final Office Action dated Mar. 2, 2010, US Application No. 12/493,703, filed Jun. 29, 2009, 7 pages.
US Non-Final Office Action dated Oct. 19, 2005, U.S. Appl. No. 10/819,565, filed Apr. 6, 2004, 20 pages.
US Non-Final Office Action dated Sep. 18, 2000, U.S. Appl. No. 09/563,106, filed May 2, 2000, 7 pages.
US Notice of Allowance and Interview Summary dated Dec. 29, 2010, U.S. Appl. No. 12/493,703, filed Jun. 29, 2009, 6 pages.
US Notice of Allowance dated Apr. 18, 2001, U.S. Appl. No. 09/563,106, filed May 2, 2000, 2 pages.
US Notice of Allowance dated Apr. 23, 2012, U.S. Appl. No. 12/773,645, filed May 4, 2010, 5 pages.
US Notice of Allowance dated Dec. 12, 2003, U.S. Appl. No. 10/228,688, filed Aug. 26, 2002, 6 pages.
US Notice of Allowance dated Dec. 15, 2009, U.S. Appl. No. 11/862,477, filed Sep. 27, 2007, 4 pages.
US Notice of Allowance dated Dec. 20, 1999, U.S. Appl. No. 08/881,177, filed Jun. 23, 1997, 8 pages.
US Notice of Allowance dated Dec. 9, 1996, U.S. Appl. No. 08/550,088, filed Oct. 30, 1995, 7 pages.
US Notice of Allowance dated Feb. 25, 2009, U.S. Appl. No. 11/169,050, filed Jun. 28, 2005, 4 pages.
US Notice of Allowance dated Jan. 21, 1999, U.S. Appl. No. 08/881,176, filed Jun. 23, 1997, 3 pages.
US Notice of Allowance dated Jun. 30, 2006, U.S. Appl. No. 10/819,565, filed Apr. 6, 2004, 4 pages.
US Notice of Allowance dated May 7, 2002, U.S. Appl. No. 09/832,740, filed Apr. 9, 2001, 6 pages.
US Notice of Allowance dated Nov. 17, 2008, U.S. Appl. No. 11/169,050, filed Jun. 28, 2005, 4 pages.
US Notice of Allowance dated Sep. 29, 1998, U.S. Appl. No. 08/881,176, filed Jun. 23, 1997, 4 pages.
US Notice of Non-Compliant Response to Restriction Requirement dated Feb. 13, 2008, U.S. Appl. No. 11/169,050, filed Jun. 28, 2005, 3 pages.
US Notice to File Corrected Application Papers dated Feb. 18, 2011, U.S. Appl. No. 12/493,703, filed Jun. 29, 2009, 3 pages.
US Preliminary Amendment dated Jun. 23, 1997, U.S. Appl. No. 08/881,176, filed Jun. 23, 1997, 4 pages.
US Preliminary Amendment dated May 2, 2000, U.S. Appl. No. 09/563,106, filed May 2, 2000, 4 pages.
US Request for Continue Examination dated Sep. 29, 2011, U.S. Appl. No. 12/773,645, filed May 4, 2010, 1 page.
US Response and Terminal Disclaimer to Non-Final Office Action dated May 9, 2011, U.S. No. 12/773,645, filed May 4, 2010, 5 pages.
US Response to Notice to File Corrected Application Papers dated Mar. 15, 2011, U.S. Appl. No. 12/493,703, 5 pages.
US Response to Restriction Requirement dated Nov. 23, 2011, U.S. Appl. No. 12/773,645, filed May 4, 2010, 8 pages.
US Response to Rule 312 Communication dated Mar. 23, 2011, U.S. Appl. No. 12/493,703, 2 pages.
US Restriction Requirement dated May 1, 2009, U.S. Appl. No. 11/862,477, filed Sep. 27, 2007, 8 pages.
US Restriction Requirement dated Nov. 21, 2007, U.S. Appl. No. 11/169,050, filed Jun. 28, 2005, 7 pages.
US Restriction Requirement dated Oct. 24, 2011, U.S. Appl. No. 12/773,645, filed May 4, 2010, 6 pages.
US Restriction Requirement dated Oct. 29, 2010, U.S. Appl. No. 12/773,645, filed May 4, 2010, 5 pages.
US Supplemental Amendment and Response to Final Office Action dated Oct. 4, 2011, U.S. Appl. No. 12/773,645, filed May 4, 2010, 8 pages.
US Supplemental Notice of Allowability dated Apr. 1, 2011, U.S. Appl. No. 12/493,703, filed Jun. 29, 2009, 2 pages.
US Supplemental Notice of Allowability dated Apr. 1, 2011, U.S. Appl. No. 12/493,703, 4 pages.
US Supplemental Notice of Allowability dated Apr. 11, 2011, U.S. Appl. No. 12/493,703, 4 pages.
US Terminal Disclaimer dated May 9, 2011, U.S. Appl. No. 12/773,645, filed May 4, 2010, 1 page.
US Terminal Disclaimer dated Oct. 15, 2010, U.S. Appl. No. 12/493,703, filed Jun. 29, 2009, 1 page.
Prosecution Document, US Non-Final Office Action dated Oct. 19, 2005 for U.S. Appl. No. 10/819,565, 20 pages.
Prosecution Document, US Non-Final Office Action dated Sep. 18, 2000 for U.S. Appl. No. 09/563,106, 7 pages.
Prosecution Document, US Notice of Allowance dated Apr. 18, 2001 for U.S. Appl. No. 09/563,106, 2 pages.
Prosecution Document, US Notice of Allowance dated Jan. 21, 1999 for U.S. Appl. No. 08/881,176, 3 pages.
Prosecution Document, US Notice of Allowance dated Dec. 15, 2009 for U.S. Appl. No. 11/862,477, 4 pages.
Prosecution Document, US Notice of Allowance dated Feb. 25, 2009 for U.S. Appl. No. 11/169,050, 4 pages.
Prosecution Document, US Notice of Allowance dated Jun. 30, 2006 for U.S. Appl. No. 10/819,565, 4 pages.
Prosecution Document, US Notice of Allowance dated Nov. 17, 2008 for U.S. Appl. No. 11/169,050, 4 pages.
Prosecution Document, US Notice of Allowance dated Sep. 29, 1998 for U.S. Appl. No. 08/881,176, 4 pages.
Prosecution Document, US Notice of Allowance dated Apr. 23, 2012 for U.S. Appl. No. 12/773,645, 5 pages.

(56) References Cited

OTHER PUBLICATIONS

Prosecution Document, Notice of Allowance dated Dec. 12, 2003 for U.S. Appl. No. 10/228,688, 6 pages.
Prosecution Document, US Notice of Allowance dated May 7, 2002 for U.S. Appl. No. 09/832,740, 6 pages.
Prosecution Document, US Notice of Allowance dated Dec. 9, 1996 for U.S. Appl. No. 08/550,088, 7 pages.
Prosecution Document, US Notice of Allowance dated Dec. 20, 1999 for U.S. Appl. No. 08/881,177, 8 pages.
Prosecution Document, US Notice of Allowance and Interview Summary dated Dec. 29, 2010 for U.S. Appl. No. 12/493,703, 6 pages.
Prosecution Document, US Notice of Non-Compliant Response to Restriction Requirement dated Feb. 13, 2008 for U.S. Appl. No. 11/169,050, 3 pages.
Prosecution Document, US Notice to File Corrected Application Papers dated Feb. 18, 2011 for U.S. Appl. No. 12/493,703, 3 pages.
Prosecution Document, US Preliminary Amendment dated Jun. 23, 1997 for U.S. Appl. No. 08/881,176, 4 pages.
Prosecution Document, US Preliminary Amendment dated May 2, 2000 for U.S. Appl. No. 09/563,106, 4 pages.
Prosecution Document, US Request for Continued Examination dated Sep. 29, 2011 for U.S. Appl. No. 12/773,645, 1 page.
Prosecution Document, US Response and Terminal Disclaimer to Non-Final Office Action dated May 9, 2011 for U.S. Appl. No. 12/773,645, 5 pages.
Prosecution Document, US Response to Notice to File Corrected Application Papers dated Mar. 15, 2011 for U.S. Appl. No. 12/493,703, 5 pages.
Prosecution Document, US Response to Restriction Requirement dated Nov. 23, 2011 for U.S. Appl. No. 12/773,645, 8 pages.
Prosecution Document, US Response to Rule 312 Communication dated Mar. 23, 2011 for U.S. Appl. No. 12/493,703, 2 pages.
Prosecution Document, US Restriction Requirement dated Oct. 29, 2010 for U.S. Appl. No. 12/773,645, 5 pages.
Prosecution Document, US Restriction Requirement dated Oct. 24, 2011 for U.S. Appl. No. 12/773,645, 6 pages.
Prosecution Document, US Restriction Requirement dated Nov. 21, 2007 for U.S. Appl. No. 11/169,050, 7 pages.
Prosecution Document, US Restriction Requirement dated May 1, 2009 for U.S. Appl. No. 11/862,477, 8 pages.
Prosecution Document, US Supplemental Amendment and Response to Final Office Action dated Oct. 4, 2011 for U.S. Appl. No. 12/773,645, 8 pages.
Prosecution Document, US Supplemental Notice of Allowability dated Apr. 1, 2011 for U.S. Appl. No. 12/493,703, 2 pages.
Prosecution Document, US Supplemental Notice of Allowability dated Apr. 1, 2011 for U.S. Appl. No. 12/493,703, 4 pages.
Prosecution Document, US Supplemental Notice of Allowability dated Apr. 11, 2011 for U.S. Appl. No. 12/493,703, 4 pages.
Prosecution Document, US Terminal Disclaimer dated May 9, 2011 for U.S. Appl. No. 12/773,645, 1 page.
Prosecution Document, US Terminal Disclaimer dated Oct. 15, 2010 for U.S. Appl. No. 12/493,703, 1 page.
U.S. Appl. No. 11/169,050, filed Jun. 28, 2005.
U.S. Appl. No. 12/493,703, filed Jun. 29, 2009.
U.S. Appl. No. 13/109,147, filed May 17, 2011.
U.S. Appl. No. 29/444,134, filed Jan. 25, 2013.
U.S. Appl. No. 29/446,440, filed Feb. 22, 2013.

\* cited by examiner

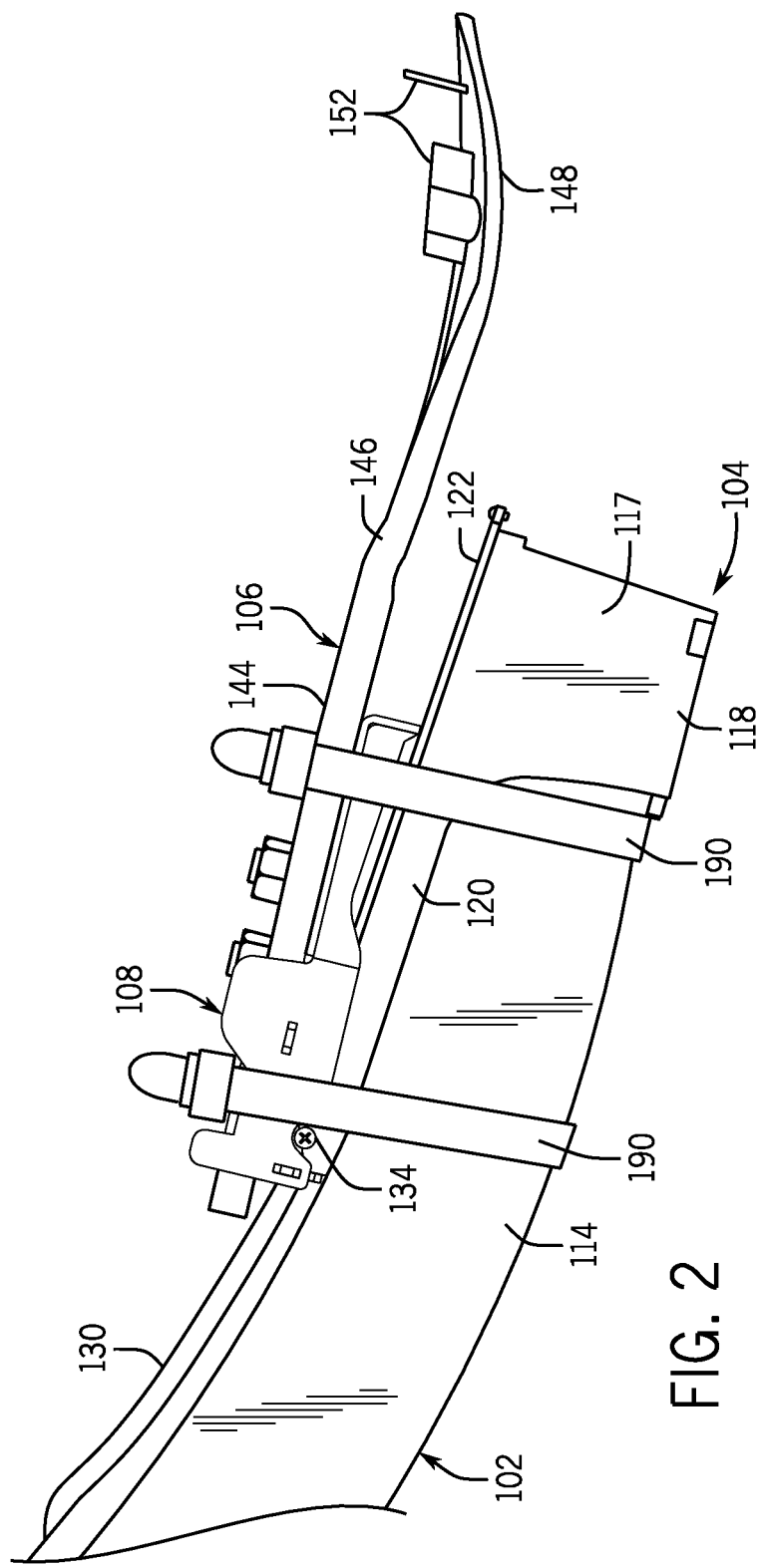

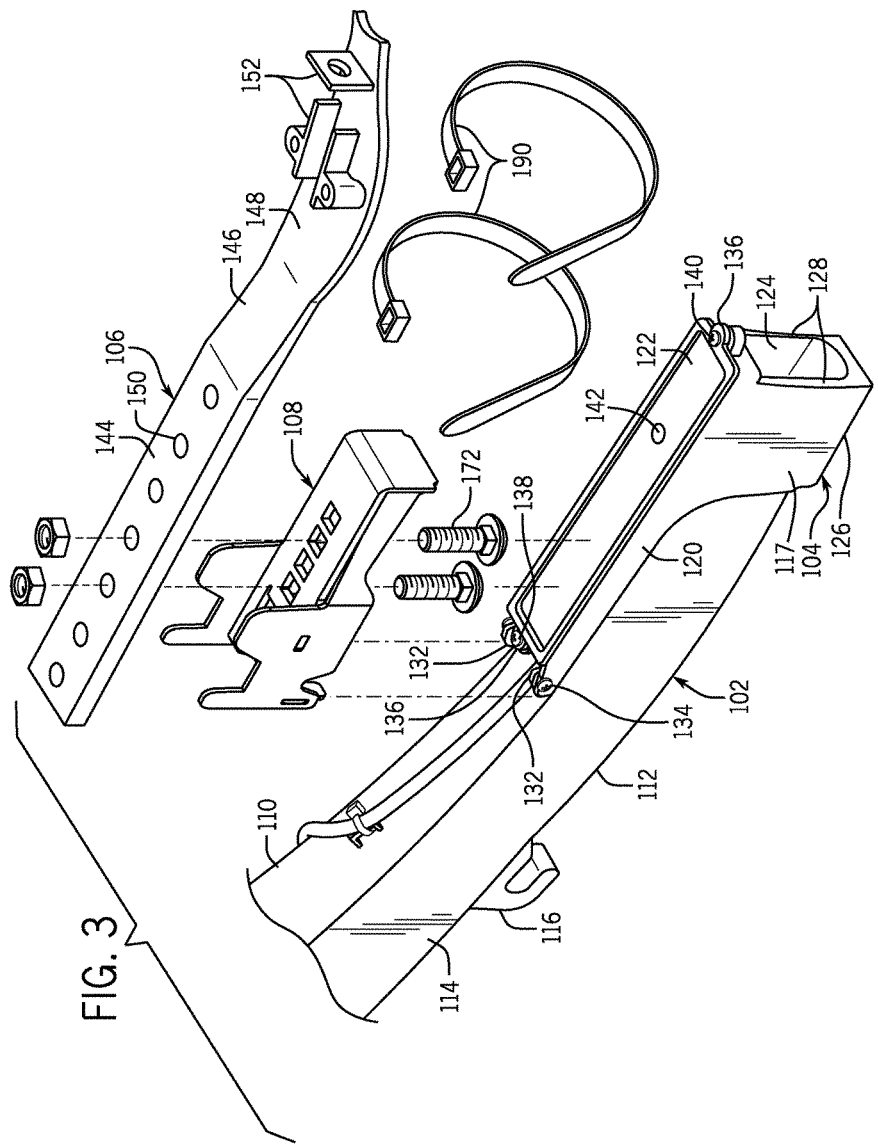

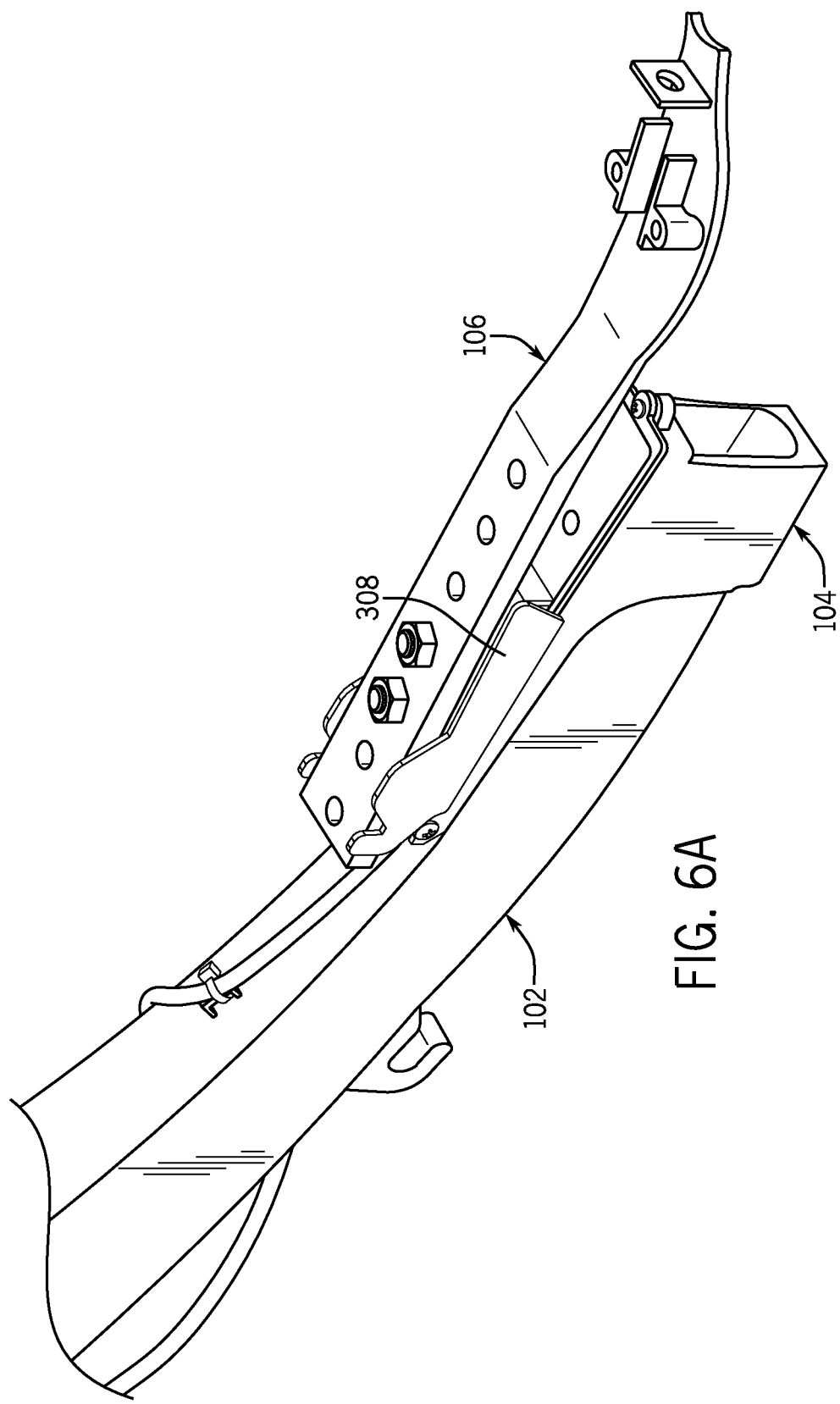

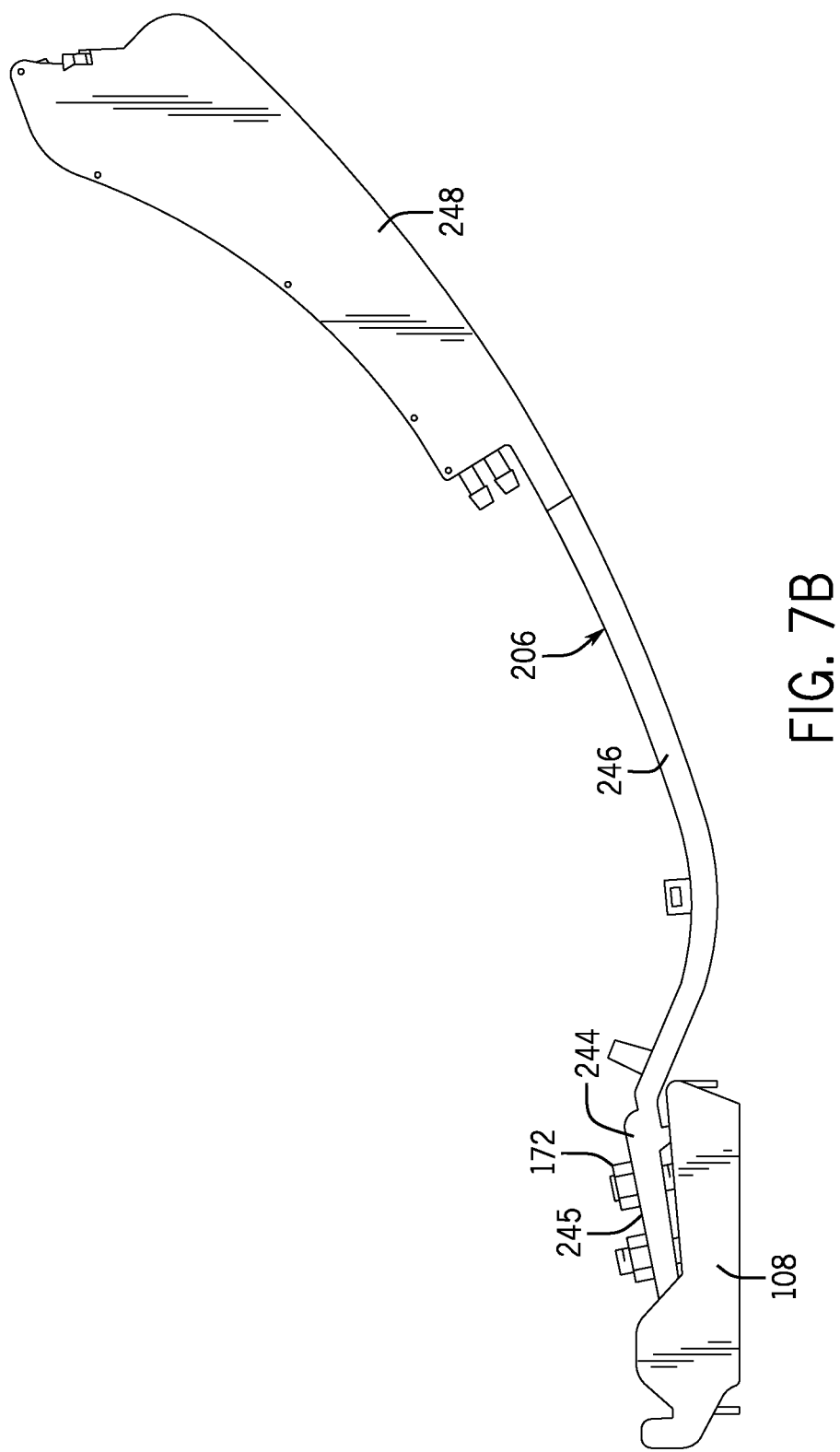

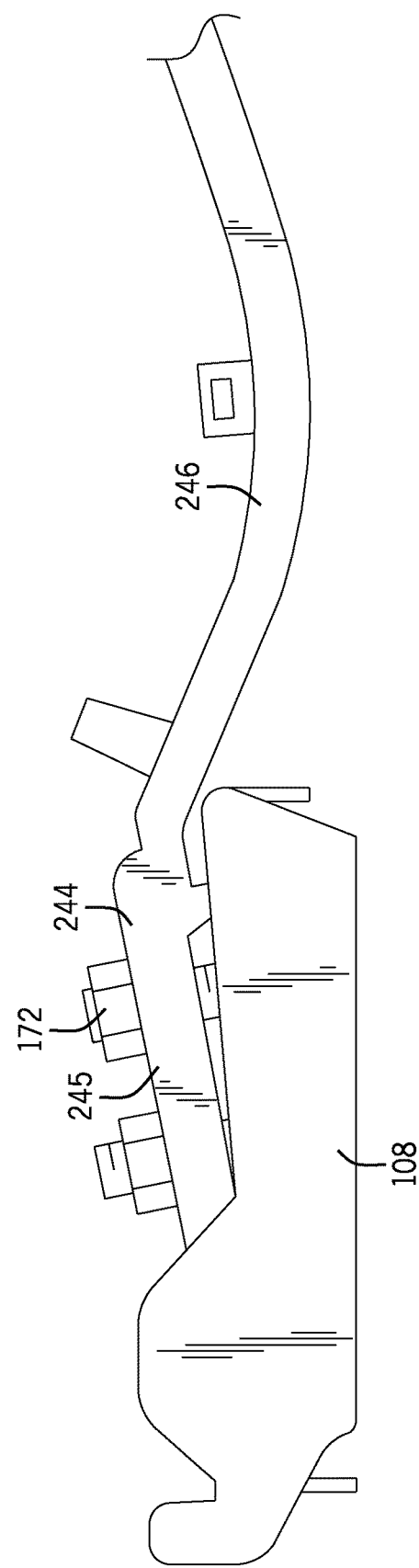

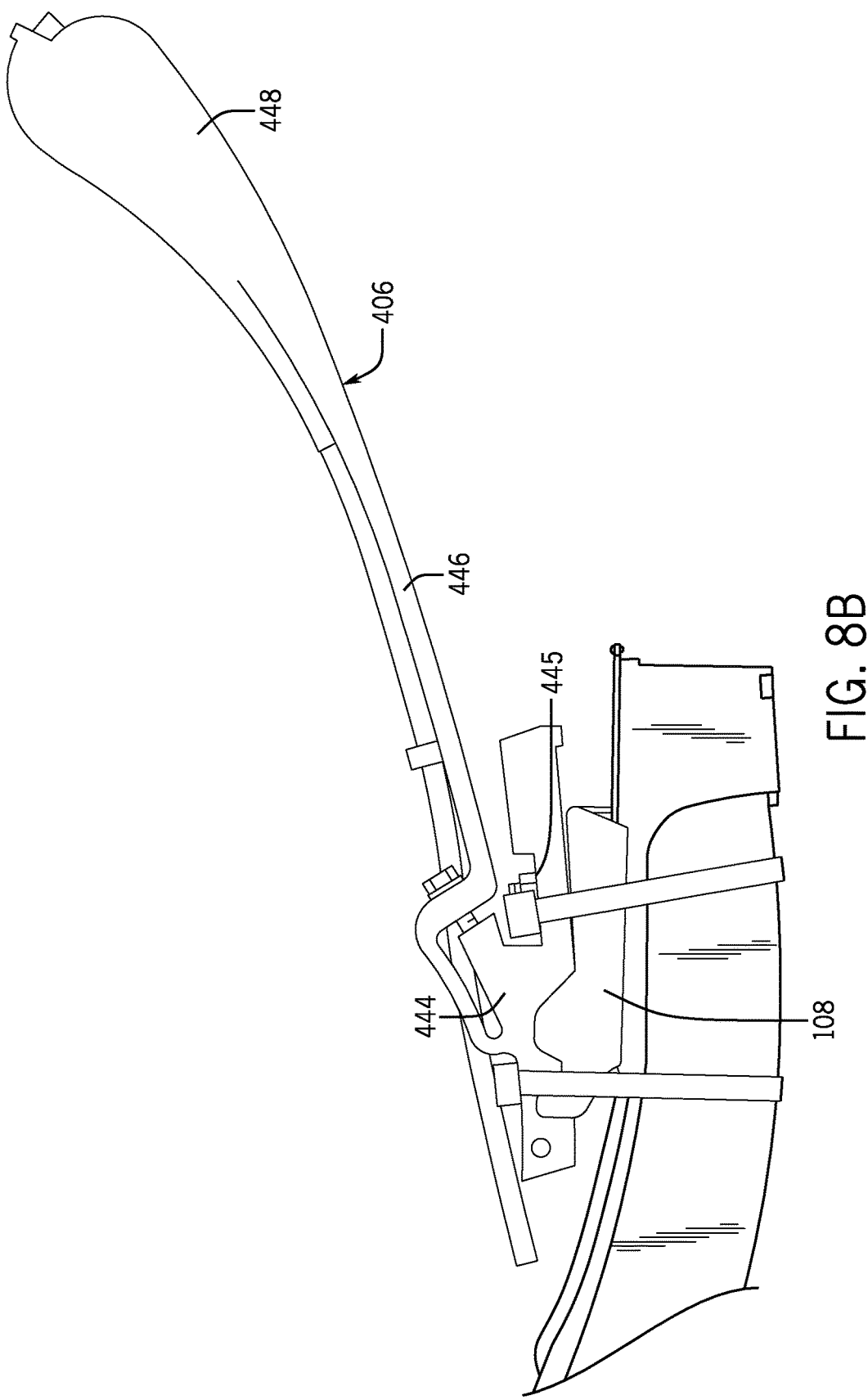

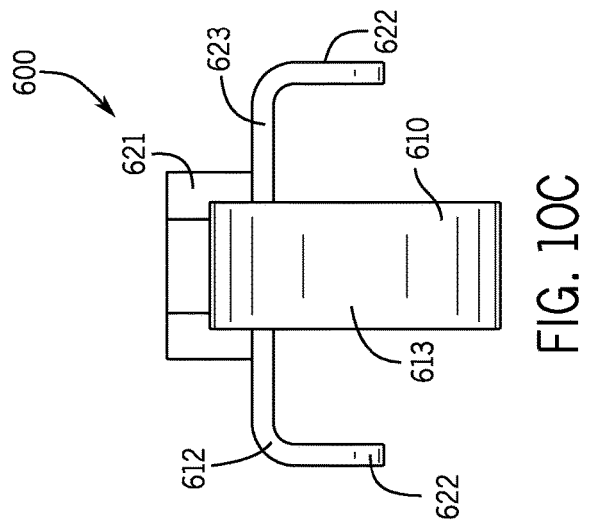
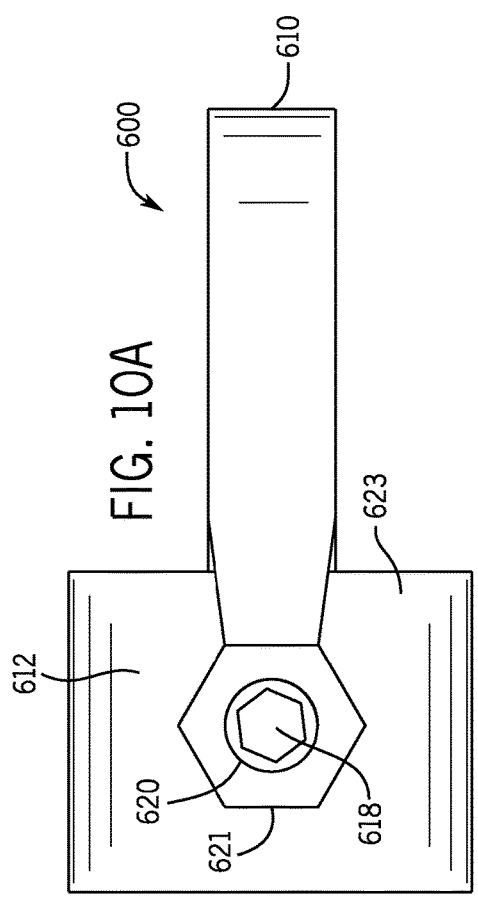
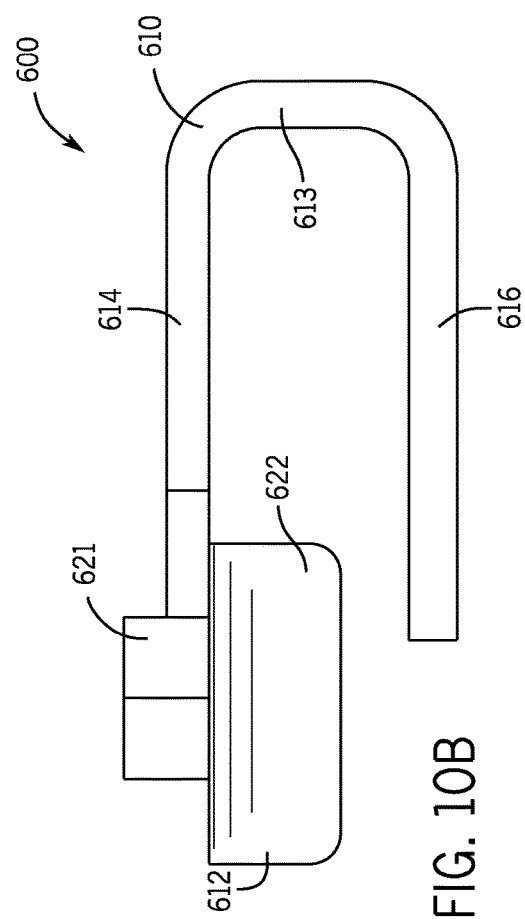

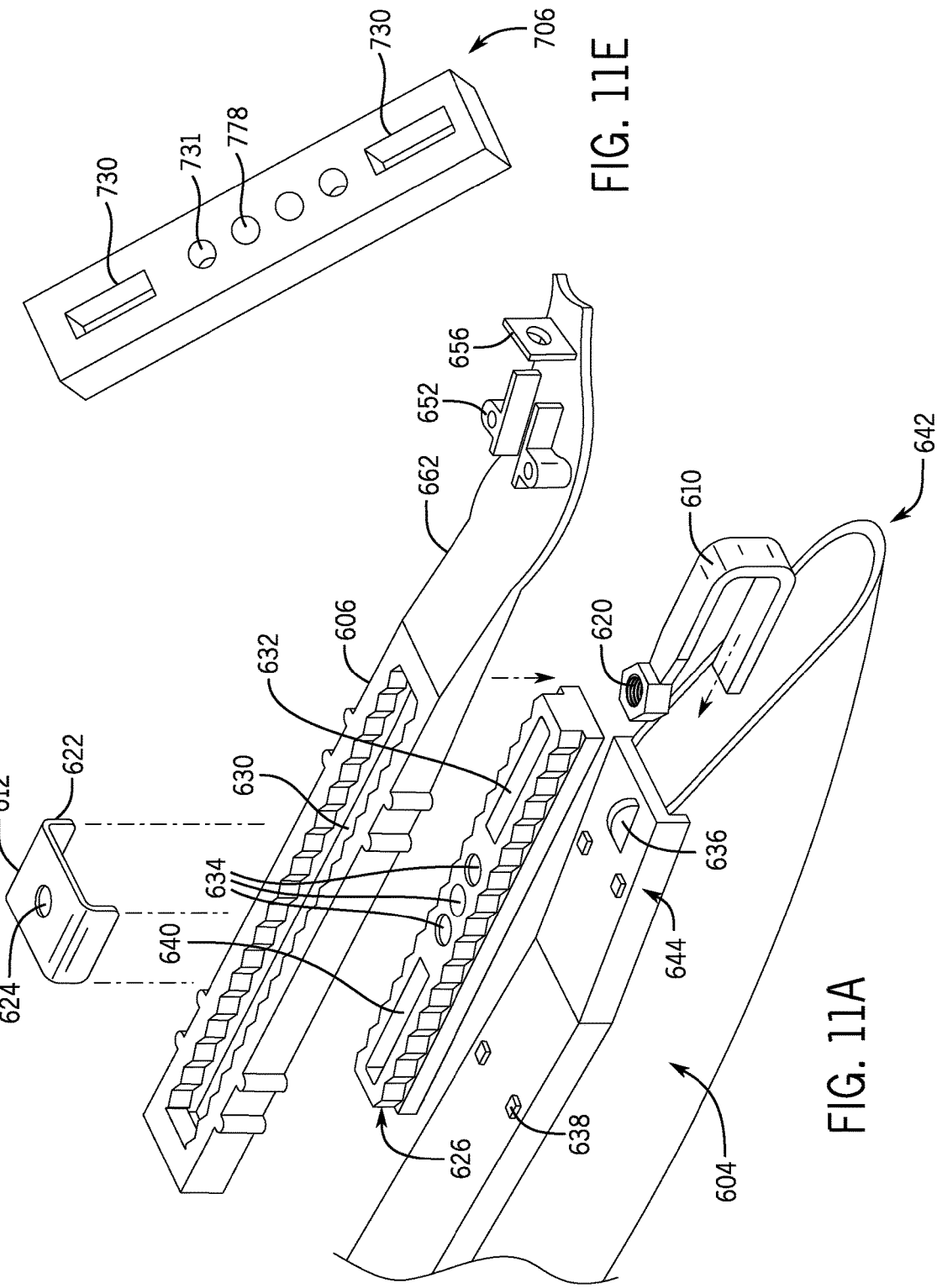

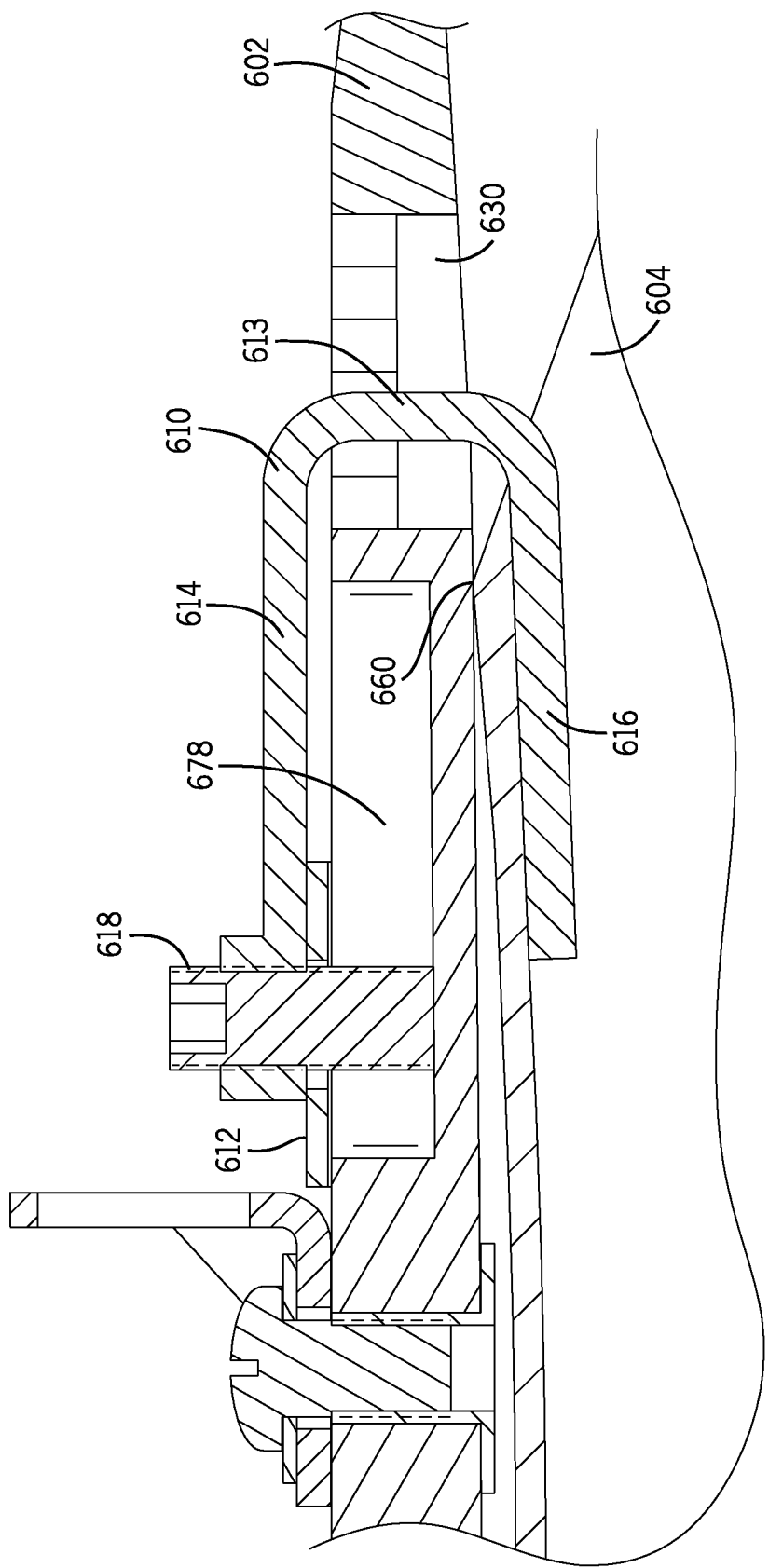

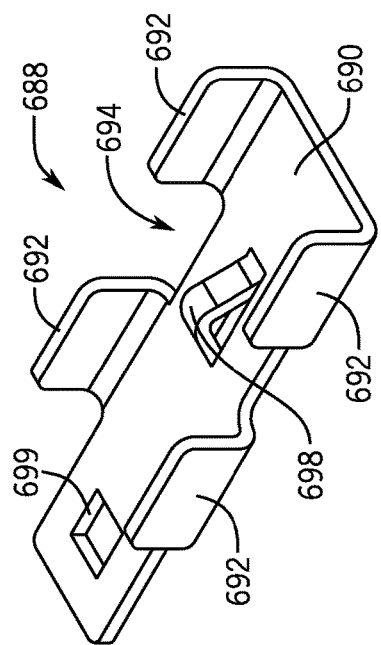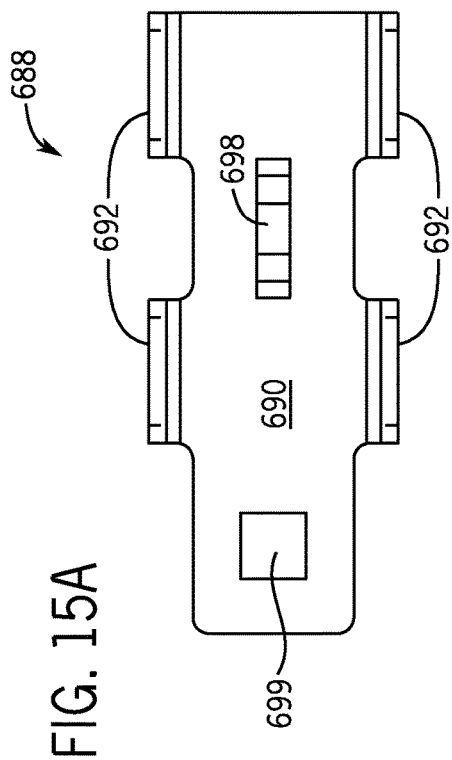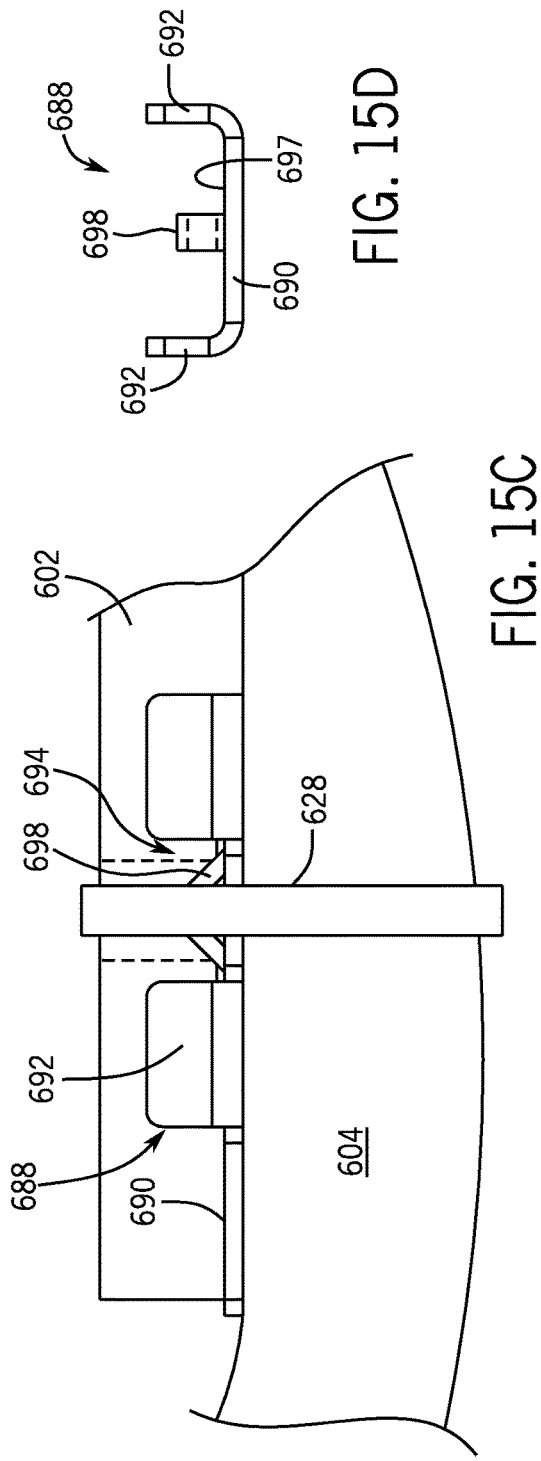

SUPPORTING DEVICE FOR MOUNTING A FURROW DEVICE ON A SEED TUBE

CROSS-REFERENCE TO RELATED APPLICATIONS

This application claims the benefit under 35 U.S.C. §119(e) of U.S. provisional patent application No. 61/768,378, filed Feb. 22, 2013, and entitled "Supporting Device for Mounting a Furrow Device on a Seed Tube", and of U.S. provisional patent application No. 61/802,359, filed Mar. 15, 2013, and entitled "Supporting Device for Mounting a Furrow Device on a Seed Tube", which are hereby incorporated by reference herein in their entireties.

TECHNOLOGICAL FIELD

The technological field relates to seed planters. More particularly, the present disclosure relates to devices, in some instances having one or two components, for supporting a planting unit component, such as a furrow device, and/or for connecting the same to a seed tube of a seed planting unit.

BACKGROUND

Seed planters often include several seed planting units transversely arranged relative to a travel direction of the seed planter. Each seed planting unit may include a seed tube for depositing seeds into seed furrows during seed planting. The seed planting unit may also include a furrow device, such as a seed follower for controlling the positions of the seed as they are released from the seed tube. The seed follower may be positioned in an aft position relative to the seed tube and may be attached to the seed tube. The attachment mechanism for securing the seed tube follower to the seed tube may not be convenient to use, robust or easily adjustable.

SUMMARY

Described herein are supporting devices for supporting a planting unit component, such as a furrow device, and/or for connecting the same to a seed tube of a seed planting unit, a furrow device assembly including the supporting device, and a seed planting unit including the supporting device. Also described herein are methods for connecting a planting unit component, such as a furrow device, to a seed tube of a seed planting unit.

Examples of the disclosure may include a supporting device for operably connecting a furrow device to a seed tube of a planting unit for planting seeds into a furrow. The supporting device may include a bracket assembly including a clip. The clip may engage the furrow device and the seed tube. The clip may be at least partially positioned inside the seed tube.

In some examples, the clip may at least partially engage a top surface of the furrow device. In some examples, the clip may be positioned through an aperture formed in the furrow device.

In some examples, the bracket assembly may include a retainer. The retainer may engage the furrow device and resist movement of the furrow device. In some examples, the clip and the retainer are fixed together. In some examples, the clip and the retainer are separate elements.

In some examples, the clip applies a clamping load between the furrow device and the seed tube. In some examples, the seed tube defines at least one protrusion extending outwardly therefrom, the furrow device defines at least one feature that receives the at least one protrusion, and the clamping load created by the clip resists the disengagement of the furrow device from the protrusions. In some examples, the clip includes a load member, and the load member applies a load directly or indirectly to the seed tube to create the clamping force between the load member and the portion of the clip positioned inside the seed tube. In some examples, the load member applies a load directly to the seed tube, which creates the clamping load. In some examples, the load member applies a load directly to the furrow device, which in turn applies a load to the seed tube, which creates the clamping load.

In some examples, the clip defines an aperture, the load member is a pin positioned in the aperture, and the clamping load is created by adjusting the pin within the aperture to force the pin into operable engagement with the seed tube. In some examples, the pin directly contacts the seed tube. In some examples, the pin directly contacts the furrow device.

In some examples, a supplemental bracket is positioned on the seed tube, the supplemental bracket defines a protrusion, the furrow device receives the protrusion mounted on the supplemental bracket, and the clamping force created by the clip resists the furrow device disengaging from the protrusion positioned on the supplemental bracket.

In some examples, the clip includes an upper leg and a lower leg, the upper leg engages a top surface of the furrow device, and the lower leg is at least partially received inside the seed tube and engages an inner wall of the top surface of the seed tube.

In some examples, the supporting device includes a supplementary clip positioned on the seed tube and spaced away from an end of the seed tube. The supplementary clip may include side flanges defining a notch in each side flange. A portion of the furrow device may be positioned in the supplementary clip and between the flanges. In some examples, a circumferential fastener is positioned around the seed tube, the furrow device, and the supplemental clip. In some examples, the clip and the supplemental clip together assist in aligning the furrow device to extend generally in line with an axis defined by the seed tube.

This summary of the disclosure is given to aid understanding, and one of skill in the art will understand that each of the various aspects and features of the disclosure may advantageously be used separately in some instances, or in combination with other aspects and features of the disclosure in other instances.

While multiple embodiments are disclosed, still other embodiments of the present disclosure will become apparent to those skilled in the art from the following detailed description, which shows and describes illustrative embodiments of the disclosure. As will be realized, the disclosure is capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying figures, in which:

FIG. 2 is a side elevation view of the portion of the planting unit of FIG. 1.

FIG. 3 is an exploded perspective view of the portion of the planting unit of FIG. 1.

FIG. 6A is a perspective view of a portion of a planting unit similar to that of FIG. 1, incorporating a third example of a supporting device.

FIG. 7B is a side elevation view of the supporting bracket and the seed follower shown in FIG. 7A.

FIG. 7C is an enlarged view of the supporting bracket and a portion of the seed follower shown in FIG. 7B.

FIG. 8B is a side elevation view of the portion of the planting unit of FIG. 8A.

FIG. 10A is a top plan view of the supporting device of FIG. 9.

FIG. 10B is a side elevation view of the supporting device of FIG. 9.

FIG. 10C is a side elevation view of the supporting device of FIG. 9.

FIG. 11A is an exploded view of a portion of a planting unit similar to that of FIG. 9, with the supporting device of FIG. 9.

FIG. 11E is a perspective view of an example connection portion of a seed tube extension.

FIG. 13E is a cross sectional view of the supporting device of FIG. 9 attached to a portion of a planting unit similar to that of FIG. 9.

FIG. 15A is a top plan view of a positioning clip for securing a seed tube extension to a seed tube.

FIG. 15B is a perspective view of the positioning clip of FIG. 15A.

FIG. 15C is a side elevation view of the positioning clip of FIG. 15A positioned on a seed tube and supporting a seed tube extension.

FIG. 15D is a side elevation view of the positioning clip of FIG. 15A.

DESCRIPTION

The present disclosure relates to supporting devices for supporting a planting unit component, such as a furrow device, and/or for connecting the same to a seed tube of a seed planting unit. To aid one in understanding the disclosure, seed followers are described as exemplary furrow devices, which may be supported and connected to a seed tube by the supporting device. It should be understood that the supporting devices as described herein may be used to support and/or connect other types of planting unit components or furrow devices.

The supporting device may include a connection element and an alignment element. The connection element may include a connection feature for adjustably and/or securely attaching a seed follower thereto. The connection element may also include an alignment feature for reducing axial shift of the supporting device and/or the seed follower attached thereto along their longitudinal axes. The connection element may further include a stand feature for positioning the seed follower at a desired angle relative to the seed furrow and/or the seed tube. The alignment element may include an alignment feature for axially aligning the seed follower with the seed tube. The alignment element may also include a positioning feature for positioning the seed follower at a desired location along the seed tube.

Figure 1:
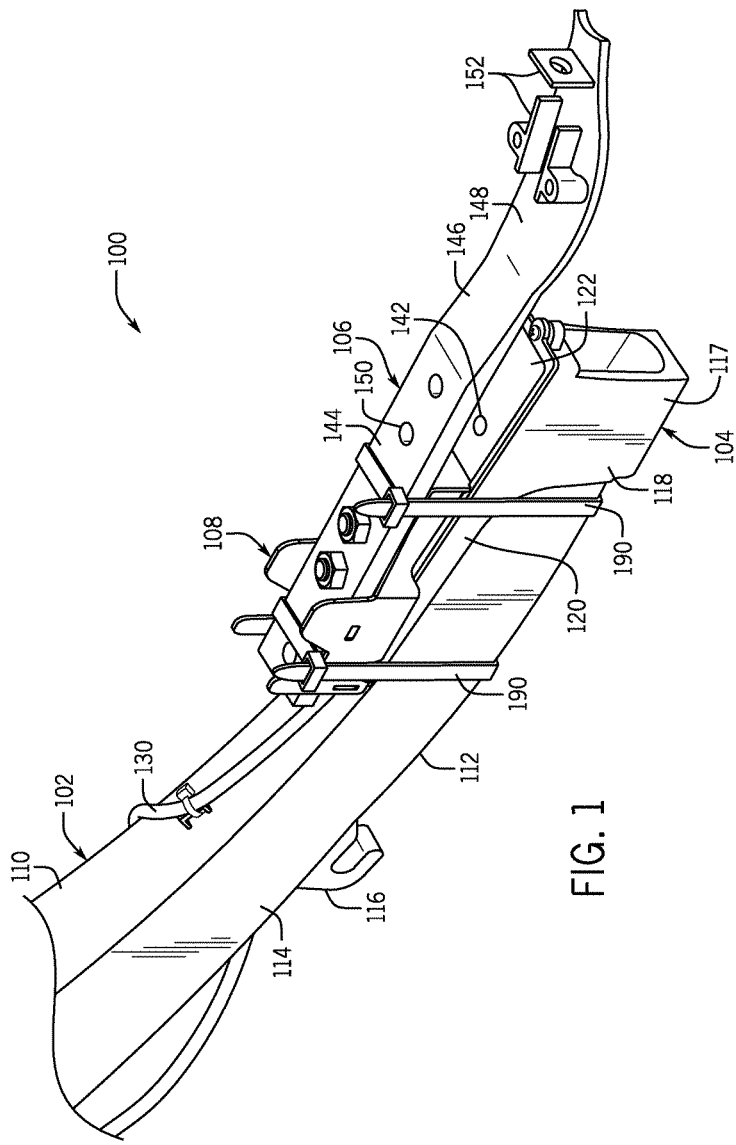
FIG. 1 is a perspective view of a portion of a planting unit for placing seeds into a furrow.

Referring now to FIGS. 1, 2, and 3, a portion of a seed planting unit 100 is shown. The planting unit 100 may include a seed tube 102, through which seeds are released and deposited into a furrow, a seed sensor assembly 104 attached to the lower egress end of the seed tube 102, a furrow device 106, such as a seed follower, and a supporting device 108 for supporting the seed follower 106 on the seed sensor assembly 104. The planting unit 100 may further include structures and components for securing the seed tube 102 to the planting unit 100.

The seed tube 102 may be an elongated and curved tubular body extending generally in a downward and rearward direction relative to the travel direction of the planting unit 100. The seed tube 102 may include a top tube wall 110, a bottom tube wall 112, and two opposing side tube walls 114 collectively defining a seed passageway. The top tube wall 110 may include one or more pairs of protrusions formed along either side edges of the top tube wall 110. Each of the protrusions may include an aperture formed therein. The pairs of protrusions with apertures formed therein may be configured to receive fasteners for securing other planting unit components to the seed tube 102. The bottom tube wall 112 may include a hook 116 for mounting the seed tube 102 to a mounting point of the seed planting unit 100.

The seed sensor assembly 104 may include a sensor arrangement adjacent to the lower egress end of the seed tube 102 for sensing seeds passing there through and a sensor housing 117 enclosing the sensor arrangement and attaching the same to the lower egress end of the seed tube 102. The housing 117 may include a housing body 118, an upper leg 120, and an access cover 122. The housing body 118 may include an upper opening, a lower opening 124, a bottom housing wall 126 and two opposing housing side walls 128. The bottom housing wall 126, the two opposing side walls 128, and a lower portion of the access cover 122 may collectively form, in general, an extension of the seed tube 102. Upon exiting the lower egress end of the seed tube 102, the seeds may pass through the housing body 118 by entering the upper opening and exiting the lower opening 124 thereof. The passage of seeds may be sensed by the sensing components of the sensor arrangement contained in the housing body 118.

The upper leg 120 of the housing may be raised over or above the top tube wall 110 and extend forward and upward along the side edges of the top tube wall 110. The upper leg 120 and an upper portion of the access cover 122 may collectively define a space for receiving, for example, the circuitry of the sensor arrangement. Cables or harnesses 130 connected to the sensor arrangement may exit from an upper opening formed by the upper leg 120 and the access cover 122. A recess may be formed at each of the two opposing sides of the upper leg 120 adjacent to the front opening. Each of the recesses may be aligned with an aperture formed in a protrusion 132 extending from the top tube wall 110. A fastener 134 may be received within the recess and pass through the aperture of the protrusion 132 for securing the sensor assembly 104 to the seed tube 102.

The access cover 122 may include ears 136 formed at the upper end and the lower end thereof. Ears may also be formed at corresponding locations of the upper leg 120 and the housing body 118 of the housing. The ears 136 of the access cover 122 and the ears of the housing may be aligned and may receive fasteners 138, 140 for securing the access cover 122 to the housing. The access cover 122 may also include a status indicator 142. The status indicator 142 may be configured as a window for passing through a light signal transmitted from the sensor arrangement inside the housing. The window may be positioned at a lower half of the access cover 122.

In continuing reference to FIGS. 1, 2 and 3, the seed follower 106 may be a seed rebounder. The seed follower 106 may be positioned rearward of the seed tube 102 and may be configured to control the position of seeds in the furrow by, for example, bringing bouncing seeds to rest in the bottom of the furrow, scraping or dislodging seeds from the sides of the furrow and causing them to fall to the bottom of the furrow into a more suitable position, and so on. The seed follower 106 may be a generally elongate and flexible element configured to be positioned behind the seed tube 102 and to flexibly engage the furrow. The seed follower 106 may include a connection portion 144, a neck portion 146, and an engaging portion 148.

The connection portion 144 of the seed follower 106 may be configured for adjustable connection of the seed follower 106 to a supporting device 108. The adjustable connection may allow the depth of the seed follower 106 relative to the furrow to be adjusted thereby providing the farmer with some control over the level of engagement of the seed follower 106 with the furrow. The connection portion 144 may include one or more fastener holes or apertures 150. Alternatively, the connection portion 144 may include slotted holes, a ratchet type connection, a friction type clamp, or other fastening mechanism. Other fastening devices may be provided for the connection portion 144. The one or more fastener holes or apertures 150 may allow for selective alignment of holes or apertures 150 in the seed follower 106 with apertures in a supporting device 108 to control the depth of the seed follower 106. The connection portion 144 may have a width similar to that of the seed tube 102 to allow a snug engagement with a supporting device 108 described below.

The neck portion 146 of the seed follower 106 may be positioned between the connection portion 144 and the engaging portion 148. The neck portion 146 may include a flexibility feature in the form of a reduced thickness, width, or both, providing an increased level of flexibility relative to the connection portion 144, for example. Alternative flexibility features may be provided such as score marks, grooves, or material changes.

The engaging portion 148 may extend from the neck portion 146 and may be shaped and sized to engage the bottom and sides of the furrow. The engaging portion 148 may be somewhat teardrop-shaped so as to gradually engage the furrow along a front side edge and feather out of engagement along a trailing side edge. The trailing side edges of the engaging portion 148 may form an acute angle or V-shape allowing for inclined engagement with the V-shaped furrow. That is, the trailing side edges of the engaging portion 148 may form a tighter V-shape than the furrow due to the inclined engagement of the engaging portion 148 with the furrow. The rear portion of the engaging portion 148 may include a truncating notch allowing seeds in the bottom of the furrow to pass through the notch without unduly being pressed into the bottom of the furrow and further avoiding dragging the seeds along the furrow. The engaging portion 148 may further include irrigation support features 152 for securing liquid fertilization tubes or other items to the seed follower 106.

The seed follower 106 may be made from a resilient material allowing it to repeatedly flexibly engage the furrow. The seed follower 106 may be made from a high density polymer, for example. Other polymer materials or other materials may also be used.

Other types, shapes, and kinds of seed followers 106 may also be provided. In some embodiments, the seed followers described in U.S. Pat. No. 5,640,915, the contents of which are hereby incorporated by reference herein in their entirety, may be provided. In some embodiments, the seed followers described in U.S. Pat. No. 7,942,102, the contents of which are hereby incorporated by reference herein in their entirety, may be provided. Other types of seed followers may also be used such as flaps positioned in the path of the seed to be placed or positioned above the placement location, chains hanging in the path of the seed to be placed or above the placement location, and firming bars for pressing the seed into the bottom of the furrow. Still other types of seed followers may also be used or selected to suitably assist keeping the seeds in the furrow upon being released from the seed tube 102.

With reference again to FIGS. 1, 2, and 3, the seed planting unit 100 may include a supporting device 108 for supporting the seed follower 106 in an aft position relative to the seed tube 102 and the sensor assembly attached thereto. With further reference to FIGS. 4A, 4B, 4C, and 4D, the supporting device 108 may include a first element 154, such as a connection element, and a second element 156, such as an alignment element. In some examples, the supporting device 108 may further include a third element 158, such as a reinforcement element. The connection element 154 may be configured to operably support the seed follower 106 and/or attach the seed follower 106 thereto. The alignment element 156 may be configured to axially align the seed follower 106 with the seed tube 102 along their longitudinal axes. The reinforcement element 158 may be configured to enhance the structural strength of the supporting device 108.

In some examples, the connection element 154 may include an elongated body 159 extending between a first end 160 (e.g. an upper end) and a second end 162 that is distal from the first end 160 (e.g., a lower end) of the supporting device 108. The first end 160 and the second end 162 may delineate a length dimension of the connection element 154. In some examples, the connection element 154 may be configured with a length dimension that may allow the status indicator 142 on the access cover 122 of the seed sensor assembly 104 to be exposed or visible when the supporting device 108 is positioned on the seed tube 102 (see FIG. 1). The elongated body 159 may include a substantially planar first or top surface 164 facing the seed follower 106 attached thereto and a substantially planar second or bottom surface 166 facing the access cover 122 of the sensor assembly 104. As such, the elongated body 159 may take the form of a plate or the like. The plate may include two side edges 168 delineating a width dimension of the connection element 154. In some examples, the width dimension of the connection element 154 may be substantially consistent along its longitudinal dimension. In some examples, the connection element 154 may include a varying width along its longitudinal dimension. In some examples, along at least suitable portions, or the entirety, of its longitudinal axis, the connection element 154 may be configured with a width dimension to be similar to, or substantially the same as, the width dimension of the connection portion 144 of the seed follower 106 and/or the width dimension of the housing and the access cover 122 thereof of the sensor assembly 104. The connection element 154 of the supporting device 108 may axially align with at least a portion of the connection portion 144 of the seed follower 106 and/or at least a portion of the access cover 122 of the sensor assembly 104 along their longitudinal axes when joined together.

Figure 4A:
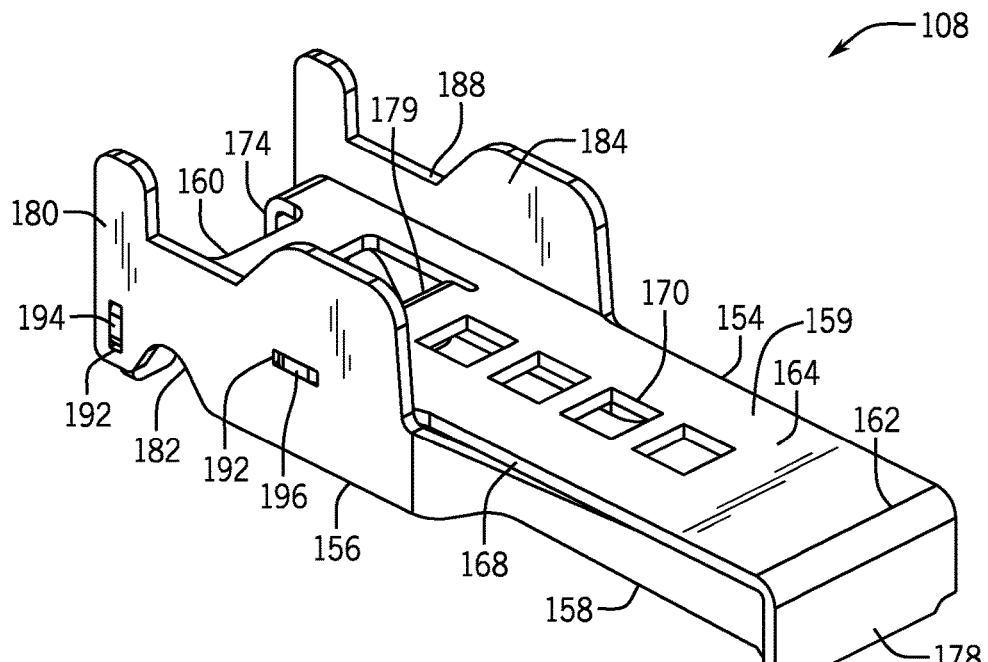
FIG. 4A is a perspective view of the supporting device of the portion of the planting unit of FIG. 1.
Figure 4B:
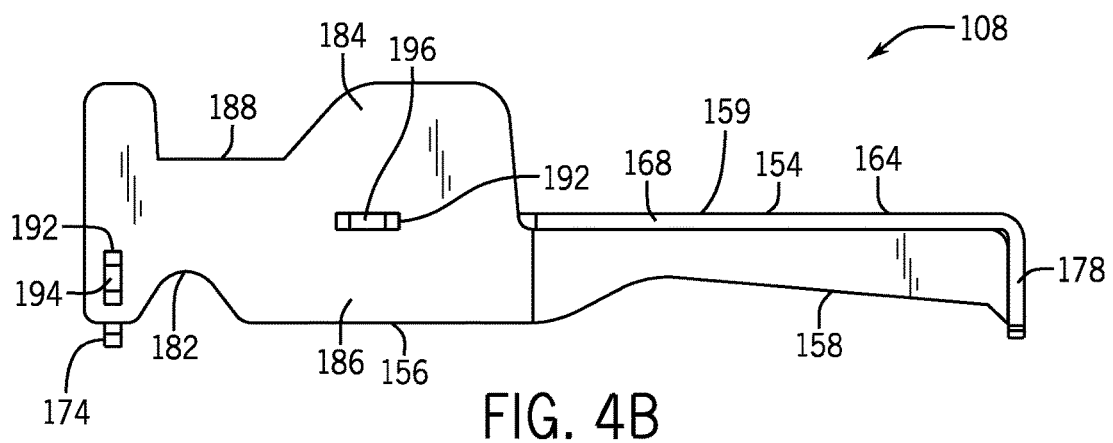
FIG. 4B is a side elevation view of the supporting device of FIG. 4A.
Figure 4C:
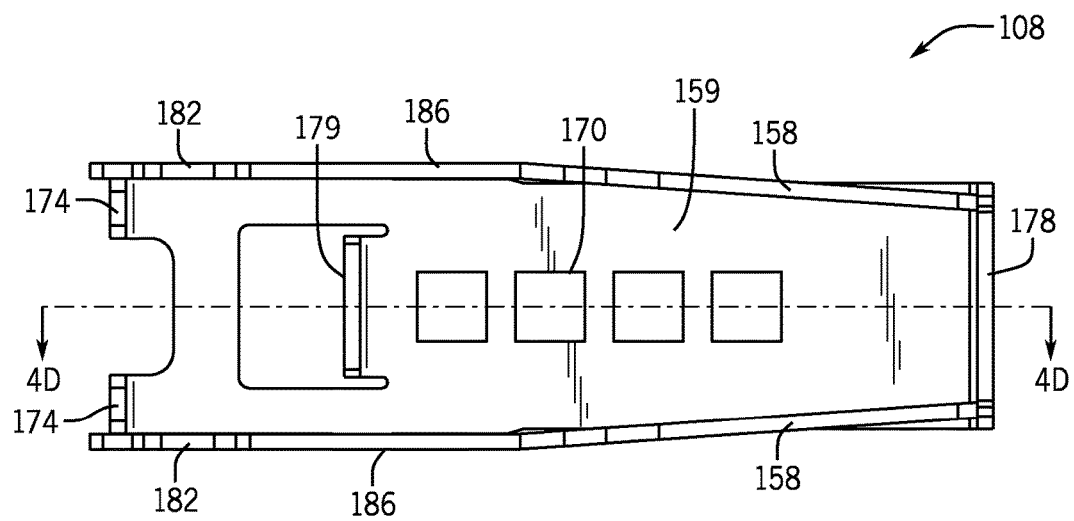
FIG. 4C is a bottom view of the supporting device of FIG. 4A.
Figure 4D:
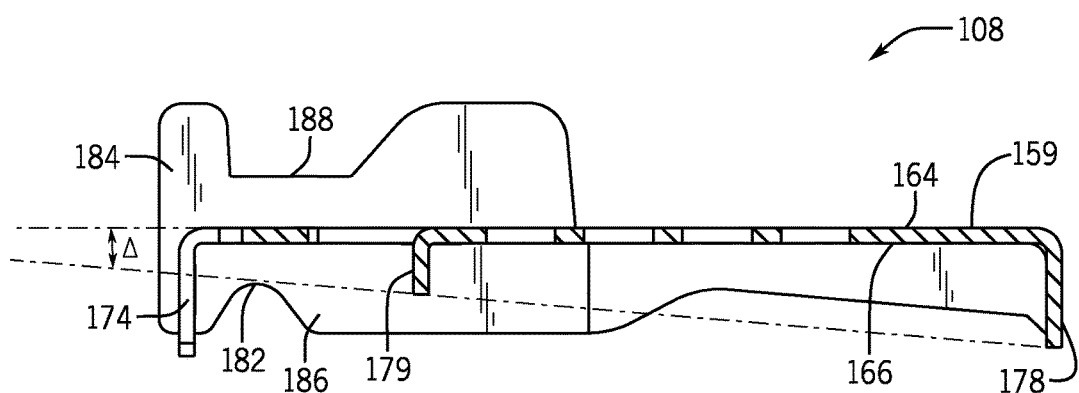
FIG. 4D is a cross sectional view of the supporting device of FIG. 4A, viewed along line 4D-4D of FIG. 4C.
Figure 5A:
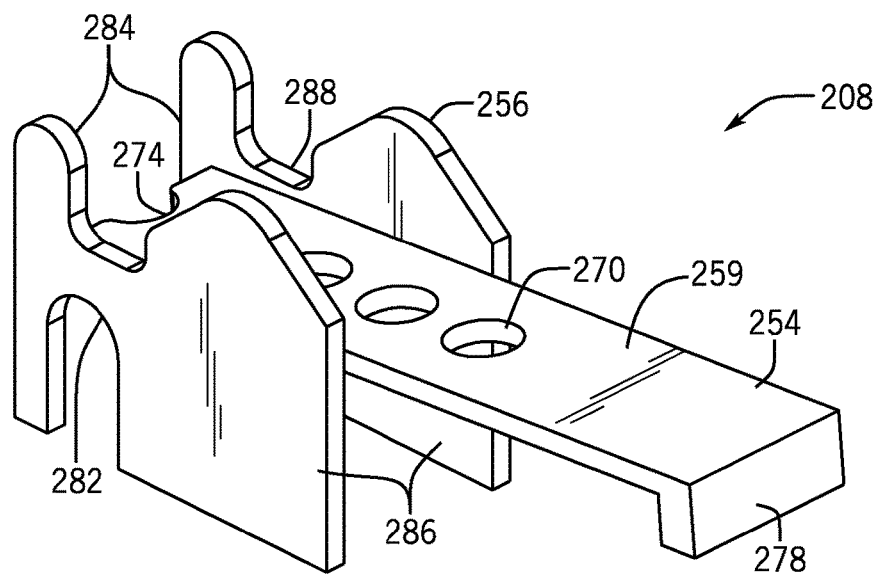
FIG. 5A is a perspective view of a second example of a supporting device, which could be used for the planting unit shown in FIG. 1.
Figure 5B:
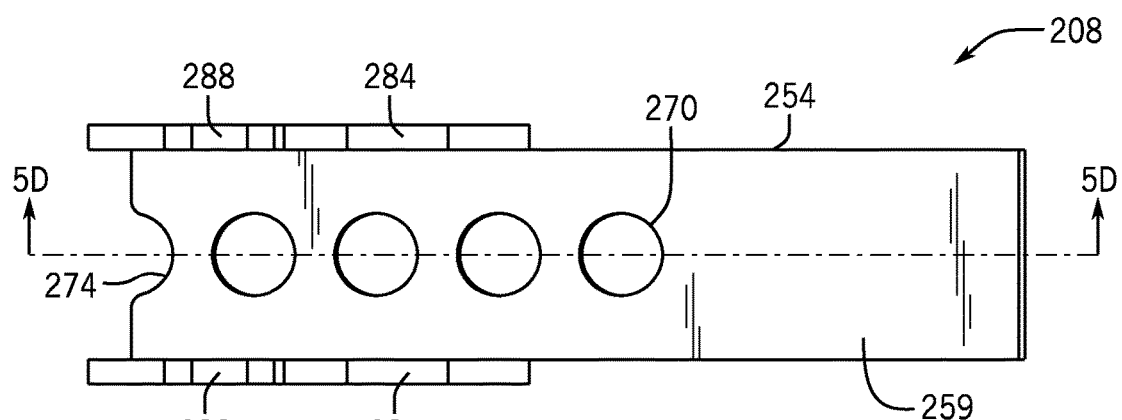
FIG. 5B is a top view of the second supporting device of FIG. 5A.
Figure 5C:
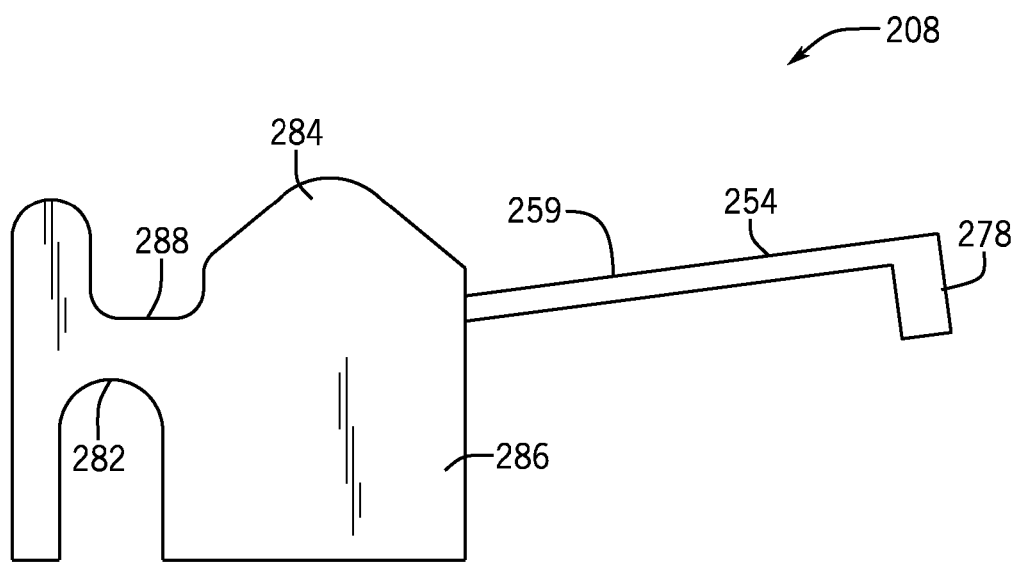
FIG. 5C is a side elevation view of the second supporting device of FIG. 5A.
Figure 5D:
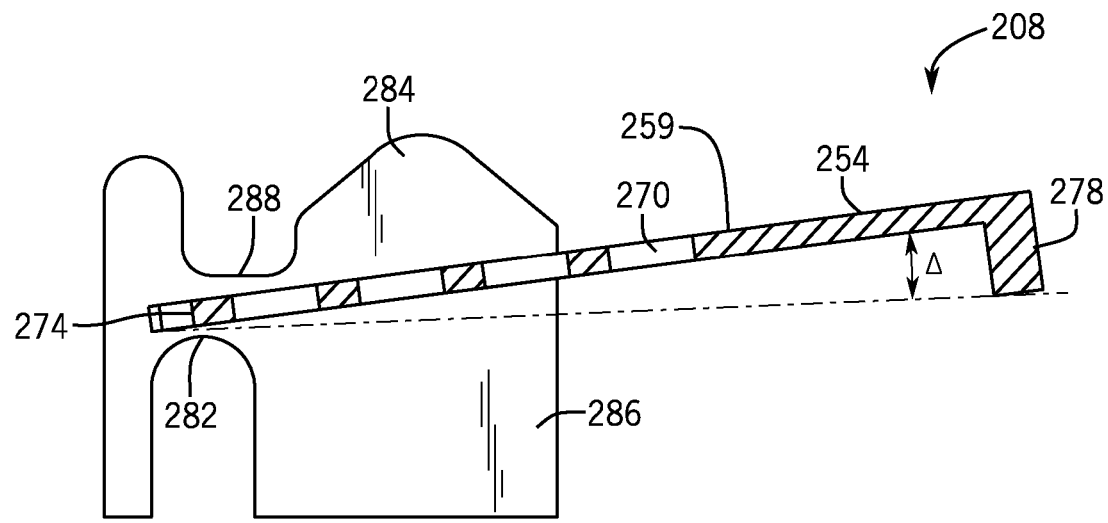
FIG. 5D is a cross sectional view of the second supporting device of FIG. 5A, viewed along line 5D-5D of FIG. 5B.

With reference to FIGS. 4A, 4C, and 4D, the connection element 154 may include a connection feature 170. The connection feature 170 may include one or more apertures formed in the elongated body 159 along the longitudinal dimension thereof. In some examples, the one or more apertures 170 may be formed as separate individual openings. The apertures 170 may be square, circular, triangular, hexagonal, or in any other suitable shape. At least one of the one or more apertures 170 of the connection element 154 may be configured to selectively align with one or more apertures 150 formed in the connection portion 144 of the seed follower 106. Fasteners 172 may be positioned through the aligned apertures 150, 170 for adjustably and/or securely attaching the seed follower 106 to the connection element 154 of the supporting device 108. When joined, a lower surface of the seed follower 106 may abut the top surface 164 of the connection element 154.

The connection element 154 of the supporting device 108 may include four apertures 170 formed therein. The second and the fourth apertures may be configured to align with two adjacent apertures 150 formed in the connection portion 144 of the seed follower 106. Fasteners 172, such as screws, or nuts and bolts, may be positioned through the aligned apertures 150, 170 for securing the seed follower 106 to the connection element 154 of the supporting device 108. In the case where square apertures may be formed in the elongated body 159 of the connection element 154, carriage bolts may be used to join the seed follower 106 to the supporting device 108 such that only one wrench may be needed to tighten or loosen the fasteners 172. In some examples, the centers of the apertures may be spaced apart at a distance of ⅜ inches, or at any other desired distance. As such, the second and the fourth apertures may position two fasteners 172 received therein at a distance of ¾ inches from each other to fit through two adjacent apertures 150 of the seed follower 106.

By selectively aligning one or more of the apertures 150 of the seed follower 106 and one or more of the apertures 170 of the supporting device 108, the position of the engaging portion 148 of the seed follower 106 relative to the seed tube 102 and relative to the furrow may be adjusted to work with different types of soil conditions. Specifically, a first one or a first pair or set of apertures 150 of the seed follower 106 may be selectively aligned with one or more apertures 170 of the supporting device 108 and attached thereto by fasteners 172 for working with a first type of soil. To adjust the seed follower 106 to work with a different type of soil, the seed follower 106 may be detached from the supporting device 108 and selectively repositioned on the supporting device 108 and secured thereto by fasteners 172. To reposition the seed follower 106, either a different one or a different pair or set of apertures 150 of the seed follower 106 and/or one or more different apertures 170 of the supporting device 108 may be selectively aligned with each other to adjust the position of the seed follower 106 relative to the supporting device 108 along the longitudinal axis thereof. As such, the supporting device 108 allows for an adjustable and/or secured attachment of the seed follower 106 to the seed tube 102.

Although the second and the fourth apertures of the supporting device 108 are shown as aligned with two adjacent apertures 150 of the seed follower 106, the first and the third apertures, or any other combination may be selected to align with two adjacent or non-adjacent apertures 150 of the seed follower 106 device depending on the spacing of the apertures 150 of the seed follower 106. In addition, more or less than four apertures 170 may be formed in the connection element 154 of the supporting device 108. The apertures 170 may also be formed with greater or less spacing between each other. The spacing between two adjacent apertures 170 may be constant or may vary. Two fasteners 172 are shown for joining the seed follower 106 to the supporting device 108 so as to reduce lateral and/or rotational shift of the seed follower 106 with respect to the supporting device 108. More or less fasteners 172 may be used.

With reference to FIGS. 4A, 4B, 4C, and 4D, the connection element 154 may include an alignment feature 174 to position the supporting device 108 at a desired location along a longitudinal dimension of the seed tube 102. The alignment feature may include two downward extending tab or flange-like extensions 174 formed adjacent to an upper end 160 of the elongated body 159. Each of the tab or flange-like extensions 174 may be positioned adjacent to a side edge of the elongated body 159. When the supporting device 108 is placed over the seed tube 102, each of the tab or flange-like extensions 174 may abut the upper terminal end 175 of a side wall of the upper leg 120 of the sensor assembly housing (see FIGS. 1, 2 and 3) to reduce upward and/or downward shifting of the supporting device 108 relative to the sensor assembly 104 and/or the seed tube 102. In addition, each of the tab or flange-like extensions 174 and an adjacent sidewall portion (described below) of the supporting device 108 may collectively define a L-shaped bracket for receiving one upper corner of the sensor assembly housing (e.g., the upper terminal end 175 of a side wall of the upper leg 120). The two L-shaped brackets formed by the tab or flange-like extensions 174 and their respective adjacent sidewall portions allow ease of placement and/or installation of the supporting device 108 over an upper portion of the seed sensor assembly 104.

Depending on the desired length of the supporting device 108 and the position of the supporting device 108 relative to the sensor assembly 104, the alignment feature 174 may be positioned at any suitable location between the upper end 160 and the lower end 162 of the elongated body 159. Furthermore, the alignment feature 174 may not be formed adjacent to the side edges 168 of the elongated body 159 to abut the upper terminal ends 175 of the upper leg 120. The alignment feature 174 may be formed along any suitable location along the width dimension of the elongated body 159 to abut other portions of the sensor assembly housing, such as the upper edge 176 of the access cover 122 of the sensor assembly housing, or one or more portions of the seed tube 102, or any suitable features of the sensor assembly 104 or the seed tube 102 that may serve as an anchor for the supporting device 108. Although two tab or flange-like extensions 174 are shown with a space there between to allow cables or harnesses 130 of the sensor assembly 104 to pass through, the alignment feature 174 may include one protrusion or more than two protrusions depending on the design of the seed tube 102 and/or the sensor assembly 104.

The alignment feature 174 may be formed by joining one or more downward extending pieces to the bottom surface 166 of the elongated body 159 by welding, gluing, or any suitable connection mechanism. In some examples, the one or more downward extending pieces and the elongated body 159 may be formed as an integral body by casting, molding, forging, bending, or any suitable method. For example, the one or more downward extending pieces may be formed by bending downward a portion of the material piece forming the connection element 154. The portion of the material piece bent down may be an edge portion of the material piece or a non-edge portion partially separated from the surrounding material.

With continued reference to FIGS. 4A, 4B, 4C, and 4D, the connection element 154 may include one or more stand or foot features 178, 179. In some examples, the connection element 154 may include a first stand or foot feature 178 positioned adjacent to the lower end 162 of the connection element 154. The connection element 154 may include a second stand or foot feature 179 positioned between the upper end 160 and the lower end 162 of the connection element 154 at a distance away from the first stand feature 178. The first stand feature 178 may be configured to support the plate portion of the connection element 154 above the access cover 122 of the sensor assembly housing at a first distance. The second stand feature 179 may support the plate portion of the connection element 154 above the access cover 122 at a second distance.

The first distance and the second distance may be determined based on the design of the seed tube 102, the seed sensor 104, the seed follower 106, and/or their connection to the planting unit 100 such that when the various components are joined to the planting unit 100, the seed follower 106 may enter the seed furrow at an angle that facilitates controlling of the positions of the seeds. The first distance may be configured to be greater or less than the second distance such that the connection element 154 of the supporting device 108 may be raised or lowered at its lower end with respect to the access cover 122 of the sensor assembly housing to create a desired angle between the engaging portion 148 of the seed follower 106 relative to the soil surface. In some examples, the supporting device 108 may include only one of the first or second stand features 178, 179 to support the connection element 154 and the seed follower 106 attached thereto at a desired angle. In some examples, the connection element 154 may be formed as a wedge having a varying thickness to allow the seed follower 106 to be positioned at a certain angle relative to the seed tube 102 and/or the furrow. In some examples, the first distance may be the same as the second distance to form a desired angle between the engaging portion 148 of the seed follower 106 and the soil surface. In this case, the connection element 154 of the supporting device 108 and/or the seed follower 106 attached thereto may be parallel to the access cover 122 of the seed sensor housing. In some examples, the supporting device 108 may not include a first or second stand feature 178, 179. The connection portion 144 may simply rest on the access cover 122 of the sensor assembly housing, if desired.

The first stand feature 178 and the second stand feature 179 may be configured to raise or lower the lower end 162 of the connection element 154 of the supporting device 108 such that the connection element 154 and the access cover 122 may form a predetermined angle Δ. In some examples, the angle Δ may range from 2 to 10 degrees. As one example, the lower end 162 of the connection element 154 may be raised by 5 degrees relative to the access cover 122 of the sensor assembly housing such that the engaging portion 148 of the seed follower 106 may enter the seed furrow at an angle of 30 degrees relative to the soil surface to optimize the performance of the seed follower 106. Depending on the specific designs of the seed follower 106, the seed tube 102, the seed sensor assembly 104, and/or the planting unit 100, other angles at which the supporting device 108 may support the seed follower 106, and/or at which the engaging portion 148 of the seed follower 106 may enter the furrow, may be used.

The first and/or the second stand feature 178, 179 may include one or more tabs, plates or flange-like extensions extending downward from the bottom surface 166 of the connection element 154. The first and/or the second stand feature 178, 179 may be formed by joining one or more downward extending pieces to the bottom surface 166 of the elongated body 159 by welding, gluing, or any suitable connection mechanism. In some examples, the one or more downward extending pieces and the elongated body 159 may be formed as an integral body by casting, molding, forging, bending, or any suitable method. For example, the one or more downward extending pieces may be formed by bending downward a portion of the material piece forming the connection element 154. The portion of the material piece bent down may be an edge portion of the material piece (for example, the first stand feature 178) or a non-edge portion partially separated from the surrounding material (for example, the second stand feature 179).

With reference again to FIGS. 4A, 4B, 4C, and 4D, the alignment element 156 of the supporting device 108 may include an alignment feature 180 and a positioning feature 182. The alignment feature 180 may be configured to axially align the supporting device 108 with the seed tube 102 along their respective longitudinal axes. The positioning feature 182 may be configured to position the supporting device 108 at a desired location along a longitudinal dimension of the seed tube 102.

The alignment feature 180 of the alignment element 156 may take the form of a pair of side plates or side walls formed along at least a portion, for example, an upper portion, of each of the side edges 168 of connection element 154 of the supporting device 108. In some examples, the side plates or side walls 180 may be formed along other suitable portions, or the entirety, of the side edges 168 of the connection element 154. The side plates or side walls 180 may extend substantially perpendicularly to the connection element 154. Other extension angles may be implemented depending on the design of the seed follower 106, the sensor assembly 104, and/or the seed tube 102. Each of the pair of side plates or side walls 180 may include a top sidewall portion 184 and a bottom sidewall portion 186. Although the pair of side plates or side walls 180 is shown symmetrical for forming simplicity, the side plates or side walls 180 may not be formed symmetrical to each other to accommodate various design structures of the seed follower 106, the sensor assembly 104 and/or the seed tube 102.

The top sidewall portions 184 extending upward from the top surface 164 of the connection element 154 of the supporting device 108 in combination with the connection element 154 may define in general a bracket for receiving a portion of the connection portion 144 of the seed follower 106. The top sidewall portions 184 may reduce lateral shift of the seed follower 106 when joined to the supporting device 108. The top sidewall portions 184 may extend along any suitable portions, or the entirety of, the side edges 168 of the connection element 154. The top sidewall portions 184 may even extend axially beyond the upper and/or lower ends 160, 162 of the connection element 154. Each of the top sidewall portions 184 may include a profiled top edge. At least a portion of each of the top sidewall portions 184 may extend from the top surface 164 of the connection element 154 at a height greater than the thickness of the connection portion 144 of the seed follower 106. As such, when the seed follower 106 is joined to the supporting device 108, at least a portion of the top sidewall portion 184 may extend above the top surface of the connection portion 144 of the seed follower 106. In some examples, the top edges of the top sidewall portions 184 may not be profiled. As such, the top sidewall portions 184 may extend from the top surface 164 of the connection element 154 at a constant height.

In some examples, each of the top sidewall portions 184 may include at least one securing structure 188 configured to receive a portion of a securing mechanism 190 for securing the supporting device 108 and/or seed follower 106 to the seed tube 102 as described below. In some examples, the at least one securing structure 188 may be a top recess formed at the top edge of the top sidewall portion 184. Other securing structures 188 may be utilized, such as grooves, indentations, trenches, apertures, holes, slots, opening, and so on. The at least one top recess formed at one of the top sidewall portions 184 may be transversely aligned with the at least one top recess formed at the other one of the top sidewall portions 184 relative to the connection element 154. In some examples, the bottom of each top recess may be configured to be lower than the top surface of the seed follower 106 to allow the securing mechanism 190 to rest against the top surface of the seed follower 106 instead of the bottom of each top recess. Such configuration may reduce wear on the securing mechanism 190 that may be caused by the edge portions (such as the bottom of each top recess) of the supporting device 108. It may further reduce any shifting of the seed follower 106 relative to the supporting device 108, the seed sensor assembly 104 and/or the seed tube 102 due to an increased contact surface between the securing mechanism 190 and the seed follower 106. In some examples, the bottom of each top recess may be configured to be higher than the top surface of the seed follower 106 for other considerations.

In some examples, each of the at least one top recesses may be formed at an upper portion of each top sidewall portion 184 along the longitudinal axis of the supporting device 108 such that the top recesses may be positioned at an upper position along the longitudinal axis relative to the apertures 170 of the connection element 154. Such configuration/positioning of the top recesses relative to the apertures 170 of the connection element 154 may reduce interference of the fasteners 172 for joining the seed follower 106 to the supporting device 108 and the securing mechanism 190 for joining the supporting device 108 and the seed follower 106 attached thereto to the seed tube 102. The top recesses may also be formed at a lower position along the longitudinal axis relative to the apertures 170 of the connection element 154. In some examples, multiple securing structures 188, such as multiple top recesses, may be formed at either top sidewall portion 184 for receiving the securing mechanism 190 at multiple positions, including positions transversely overlapping with the aperture 170 positions. Depending on the locations of the fasteners 172 for attaching the seed follower 106, the securing mechanism 190 may be received at select securing structures 188 to reduce the interference. The multiple securing structures 188 may also receive multiple securing mechanisms 190 for secured attachment.

In continuing reference to FIGS. 4A, 4B, 4C, and 4D, the side walls 180 of the supporting device 108 may include bottom sidewall portions 186 extending downward from side edges 168 of the connection element 154. The bottom sidewall portions 186 and the connection element 154 may collectively define in general a bracket for receiving a portion of the housing of the sensor assembly 104, for example, a portion of the upper leg 120 of the housing. In some examples, the bottom sidewall portions 186 may be configured to abut the side walls of the upper leg 120. As such, when the seed follower 106 and the supporting device 108 are positioned over the sensor assembly housing and the seed tube 102, the bottom sidewall portions 186 may facilitate axially aligning the seed follower 106 with the seed tube 102 and reduce lateral shift of the seed follower 106 relative to the seed tube 102. In some examples, the bottom sidewall portions 186 may be spaced apart by the connection element 154 at a distance slightly greater than the width of the upper leg 120 of the seed sensor assembly housing to provide some tolerance for easy installation of the supporting device 108 on the sensor assembly housing. As such, the portion of the connection element 154 joined to the inner surfaces of the side walls 180, for example, the upper portion 160 of the connection element 154, may include a width slighter greater than the portion of the connection element 154 that is not joined to the inner surfaces of the side walls 180, for example, the lower portion 162 of the connection element 154 (see FIGS. 4A and 4C). In some examples, the lower portion 162 of the connection element 154 may be configured with a width dimension slightly less than that of the upper portion 160 to minimize contact of the supporting device 108 and/or the securing mechanisms 190 attached thereto (described below) by adjacent furrow disks.

With further reference to FIGS. 4A, 4B, 4C, and 4D, the alignment element 156 may further include a positioning feature 182 for positioning the supporting device 108 at a desired location along a longitudinal dimension of the seed tube 102. In some examples, the positioning feature 182 may be a recess or a notch formed at the bottom edge of the bottom sidewall portion 186. The positioning feature 182 is placed over the side fasteners 134 for securing the sensor assembly 104 to the seed tube 102. Other positioning features 182 may be used, such as indentations, grooves, trenches, holes, apertures, slots, openings, and so on. In some examples, the positioning feature 182 may be a domed portion formed at either bottom sidewall portion 186 so as to cover the fasteners 134 that attach the sensor assembly 104 to the seed tube 102.

Although only one positioning feature 182 is shown on either bottom sidewall portion 186, the bottom sidewall portions 186 may include multiple transversely aligned pairs of positioning features 182 for selectively and/or adjustably positioning the supporting device 108 and the seed follower 106 attached thereto onto the sensor assembly 104 and/or the seed tube 102. Depending on the desired placement of the supporting device 108 relative to the seed tube 102 and/or the seed sensor assembly 104, the bottom sidewall portions 186 may be formed along any suitable portion or the entirety of the side edges 168 of the connection element 154. The bottom sidewall portions 186 may even extend axially beyond the upper and/or lower ends 160, 162 of the connection element 154 along the longitudinal axis thereof.

The side walls 180 of the alignment element 156 may be connected to the connection element 154 using any suitable method. In some examples, the side walls 180 may be formed with one or more slots 192. Alongside edges 168 of the connection elements 154, protrusions 194, 196 may be formed. By inserting the protrusions 194, 196 of the connection elements 154 into the slots 192 of the side walls 180, the alignment element 156 may be aligned with and connected to the side edges 168 of the connection element 154. Welding, gluing, adhering, or any other suitable connection mechanism may be used to reinforce the connection.

In some examples, to improve the structural strength of the alignment features 174 of the connection element 154, one or more tabs or tongues 194 may be formed along the side edge of each of the alignment features 174 (see FIGS. 4A and 4B). These tabs or tongues 194 may be inserted into a corresponding slot or groove 192 in the side wall 180. In some examples, to improve the structural strength of the second stand feature 179, one or more tabs 196 may be formed along the corresponding portion of the side edges 168 of the connection element 154. These tabs 196 may be inserted into a corresponding slot 192 in the side wall 180 (See FIGS. 4A and 4D). One or more tab-and-slot pairs may be formed in other suitable locations of the connection element 154 and the alignment element 156.

Further to reference to FIGS. 4A, 4B, 4C, and 4D, the supporting device 108 may further include a reinforcement element 158. In some examples, the reinforcement element 158 may include a pair of buttress-like structures. Each of the buttress-like structures may be joined to the bottom surface 166 of the elongated body 159 of the connection element 154 and to the adjacent surface of the first stand element 178 by welding, gluing, or any suitable method to support or reinforce the first stand element 178. In some examples, each of the buttress-like structures may be formed by extending the bottom sidewall portion 186 of the alignment element 156 toward the lower end of the connection element 154 and slightly bending the structures inward relative to the side edges 168 of the connection element 154 for better structural integrity (see FIGS. 4A and 4C). To fit the extension of the bottom sidewall 186 over the edge of the sensor assembly housing and onto or above the access cover 122, the bottom edge of the extension may be raised (see FIG. 4B). In some examples, each of the buttress-like structures may be formed as a separate structure from the side walls 180. Many other suitable methods may be used to form the buttress-like structures.

With reference to FIGS. 5A, 5B, 5C, and 5D, a second example of the supporting device 208 is described. Similar to the first supporting device 108, the second supporting device 208 may include a first element 254, such as a connection element, and a second element 256, such as an alignment element. The connection element 254 may be configured to operably support the seed follower 106 and/or attach the seed follower 106 thereto. The alignment element 256 may be configured to axially align the seed follower 106 with the seed tube 102 along their longitudinal axes.

The connection element 254 of the second supporting device 208 may include an elongated body 259 extending between an upper end and a lower end of the second supporting device 208. The elongated body 259 may take the form of a plate or the like. Thus, the elongated body 259 may include a substantially planar top surface facing the seed follower 106 attached thereto and a substantially planar bottom surface facing the access cover 122 of the sensor assembly 104. The plate may include two side edges delineating a width dimension of the connection element 254. The connection element 254 may be configured with a constant width or a varying width. In some examples, a width dimension of at least a portion of the connection element 254 may be configured to be similar to, or substantially the same as, the width dimension of the connection portion 144 of the seed follower 106 and/or the width dimension of the housing and the access cover 122 thereof of the sensor assembly 104. The connection element 254 of the second supporting device 208 may axially align with at least a portion of the connection portion 144 of the seed follower 106 and/or at least a portion of the access cover 122 of the sensor assembly 104 along their longitudinal axes when joined together as further described below.

The connection element 254 may include an alignment feature 274. The alignment feature 274 may be a recess or notch formed at an upper end of the elongated body 259. The recess may be configured to receive, in an abutting relationship, the connection fastener 138 positioned through the upper ear 136 of the access cover 122 and a corresponding ear formed at the upper leg 120 of the sensor assembly housing for joining the access cover 122 to the upper leg 120 of the sensor assembly housing. Positioning the connection fastener 138 in the recess of the connection element 254 may reduce upward shifting of the second supporting device 208 and/or the seed follower 106 attached thereto relative to the sensor assembly 104 and/or the seed tube 102. Depending on the desired length of the second supporting device 208 and the position of the second supporting device 208 relative to the sensor assembly 104, in some examples, the connection element 254 may not include a recess formed along its upper end. In some examples, the connection element 254 may include an aperture formed in an upper portion of the elongated body 259 and positioned in an alignment with the ears 136 of the sensor assembly housing for receiving there through the connection fastener 138.

With reference to FIGS. 5A, 5B, 5C, and 5D, the connection element 254 may include a connection feature 270. The connection feature 270 may be one or more apertures formed along the longitudinal dimension of the elongated body 259. In some examples, the one or more apertures 270 may be formed as separate individual openings. In some examples, the one or more apertures 270 may be defined by a slot having a varying width formed along the longitudinal center line of the connection portion 144. The wider portions of the slot may define the one or more apertures 270 connected by narrower portions of the slot. At least one of the one or more apertures 270 of the connection element 254 may be configured to selectively align with one or more apertures 150 formed in the connection portion 144 of the seed follower 106. Fasteners 172 may be positioned through the aligned apertures 150, 270 for adjustably and/or securely attaching the seed follower 106 to the connection element 254 of the second supporting device 208. Similar to the first supporting device 108, the second supporting device 208 also allows for an adjustable and/or secured attachment of the seed follower 106 to the seed tube 102 by selectively aligning one or more of the apertures 270 of the connection element 254 with one or more adjacent or non-adjacent apertures 150 of the seed follower 106 and joining the two using fasteners 172 positioned there through.

With reference to FIGS. 5A, 5B, 5C, and 5D, the alignment element 256 of the second supporting device 208 may include a pair of side plates or side walls formed along at least a portion, for example, an upper portion, of each of the side edges of connection element 254 of the second supporting device 208. In some examples, the side plates or side walls may be formed along other suitable portions, or the entirety, of the side edges of the connection element 254. The sidewalls may even extend axially beyond the upper and/or lower ends of the connection element 254. The side plates or the side walls may extend substantially perpendicularly to the connection element 254. Other extension angles may be implemented depending on the design of the seed follower 106, the sensor assembly 104, and/or the seed tube 102. Each of the top and/or bottom sidewall portions 284, 286 may include a profiled peripheral edge to reduce the material used to form the second supporting device 208.

Similar to the first supporting device 108, each of the pair of side walls may include a top sidewall portion 284 and a bottom sidewall portion 286. The top sidewall portions 284 extending upward from the top surface of the connection element 254 of the second supporting device 208 in combination with the connection element 254 may define in general a bracket for receiving a portion of the connection portion 144 of the seed follower 106. The top sidewall portions 284 may reduce lateral shift of the seed follower 106 when joined to the second supporting device 208. The bottom sidewall portions 286 extending downward from side edges of the connection element 254 in combination with the connection element 254 may collectively define in general a bracket for receiving a portion of the housing of the sensor assembly 104, for example, a portion of upper leg 120 of the housing. The bottom sidewall portions 286 may reduce lateral shift of the supporting device 208 and the seed follower 106 attached thereto relative to the sensor assembly 104 and/or the seed tube 102. The bottom sidewall portions 286 may extend downward beyond the upper leg 120 of the sensor housing, and may extend to cover portions of the side walls of the seed tube 102 to facilitate axial alignment between the seed tube 102 and the supporting device 208 and the seed follower 106 attached thereto.

In some examples, the top side wall portions 284 and/or the bottom sidewall portions 286 may be configured to abut the seed follower 106 and/or the upper leg 120 of the sensor housing, respectively. As such, when the seed follower 106 and the second supporting device 208 is positioned over the sensor assembly housing and the seed tube 102, the top and/or bottom sidewall portions 284, 286 may facilitate axially aligning the seed follower 106 with the seed tube 102 and reduce lateral shift of the seed follower 106 relative to the seed tube 102. In some examples, the side walls may be spaced apart at a distance slightly wider than the width dimension of the seed follower 106 and/or the width dimension of the upper leg 120 of the sensor housing to create a tolerance for easy installation of the various components.

Also similar to the first supporting device 108, each of the top sidewall portions 284 may include at least one securing structure 288 configured to receive a portion of a securing mechanism 190 for securing the second supporting device 208 and/or seed follower 106 to the seed tube 102 as described below. In some examples, the at least one securing structure 288 may be a top recess formed at the top edge of the top sidewall portion 284. Other securing structures 288 may be utilized, such as grooves, indentations, trenches, apertures, holes, slots, opening, and so on. The at least one top recess formed at one of the top sidewall portions 284 may be transversely aligned with the at least one top recess formed at the other one of the top sidewall portions 284 relative to the connection element 254.

Each of the at least one top recesses may be formed at an upper portion of each top sidewall portion 284 along the longitudinal axis of the second supporting device 208 such that the top recesses may be positioned at an upper position along the longitudinal axis relative to the apertures 270 of the connection element 254. Such configuration/positioning of the top recesses relative to the apertures 270 of the connection element 254 may reduce interference of the fasteners 172 for joining the seed follower 106 to the second supporting device 208 and the securing mechanism 190 for joining the second supporting device 208 and the seed follower 106 attached thereto to the seed tube 102. The top recesses may also be formed at a lower position along the longitudinal axis relative to the apertures 270 of the connection element 254. Alternatively, multiple securing structures 288, such as multiple top recesses, may be formed at either top sidewall portion 284 for receiving the securing mechanism 190 at multiple positions, including positions transversely overlapping with the aperture 270 positions. Depending on the locations of the fasteners 172 for attaching the seed follower 106, the securing mechanism 190 may be received at select securing structures 288 to reduce the interference. The multiple securing structures 288 may also receive multiple securing mechanisms 190 for secured attachment.

Further, similar to the first supporting device 108, each of the bottom sidewall portions 286 may include a positioning feature 282 for accommodating the side fasteners 134 for securing the sensor assembly 104 to the seed tube 102. In some examples, the positioning feature 282 may include a recess or a notch formed at the bottom edge of the bottom sidewall portion 286. Other positioning features 282 may be used, such as indentations, grooves, trenches, holes, apertures, slots, openings, and so on. In some examples, the positioning feature 282 may be a domed portion formed at either bottom sidewall portion 286 so as to cover the fasteners 134 that attach the sensor assembly 104 to the seed tube 102. A portion of the positioning feature 282 may be configured to abut the side fasteners 134 for joining the seed sensor assembly 104 to the seed tube 102. The abutment between the positioning feature 282 and the side fasteners 134 may reduce axial shift of the second supporting device 208 and the seed follower 106 attached thereto relative to the seed tube 102.

In some examples, the portion of the positioning feature 282 abutting the side fasteners 134 may abut the upper portion of the side fasteners 134. As described earlier, the connection element 254 of the second supporting device 208 may include a recess formed along its upper end abutting a lower portion of the top fastener 138 of the sensor assembly 104. The abutment between the positioning features 282 formed at the bottom sidewall portions 286 and the side fasteners 134 and the abutment between the recess formed along the upper end of the connection element 254 and the top fastener 138 may collectively reduce either upward or downward axial shift of the seed follower 106 along its longitudinal axis relative to the seed sensor assembly 104 and/or the seed tube 102. Depending on the location of the side fasteners 134 and the top fastener 138 of the seed sensor assembly 104, the positioning features 282 may abut a different portion of the side fasteners 134 to reduce axial shift of the seed follower 106.

With reference again to FIGS. 5A, 5C, and 5D, the connection element 254 may further include a stand feature or a foot feature 278 positioned adjacent to the lower end, or any suitable location, of the connection element 254 to support the connection element 254 at a predetermined angle relative to the access cover 122 of the sensor assembly housing, thereby supporting the seed follower 106 at a predetermined angle relative to the sensor assembly housing and the seed tube 102. As discussed earlier, the predetermined angle may range from 2 to 10 degrees to enhance the performance of the seed follower 106. In some examples, the stand feature 278 of the supporting device 208 may be configured to allow an angle of 30 degrees formed between engagement portion 148 of the seed follower 106 relative and the ground. Depending on the specific designs of the seed follower 106, seed tube 102, seed sensor assembly 104, and/or the planting unit 100, other angles, at which the supporting device 208 may support the seed follower 106, and/or at which the engaging portion 148 of the seed follower 106 may enter the furrow, may be used.

The stand feature 278 may include one or more tabs or plate-like extensions extending downward from the bottom surface of the connection element 254 to a predetermined distance and joined thereto. In some examples, the connection element 254 may simply include a downward extending flange formed along at least a portion of the lower end of the connection element 254. In some examples, the second supporting device 208 may not include a stand feature 278. The bottom of the connection element 254 may simply rest against the sensor assembly housing. In some examples, the connection element 254 may be formed as a wedge having a varying thickness to allow the seed follower 106 to be positioned at a certain angle relative to the seed tube 102 and/or the furrow.

Figure 6B:
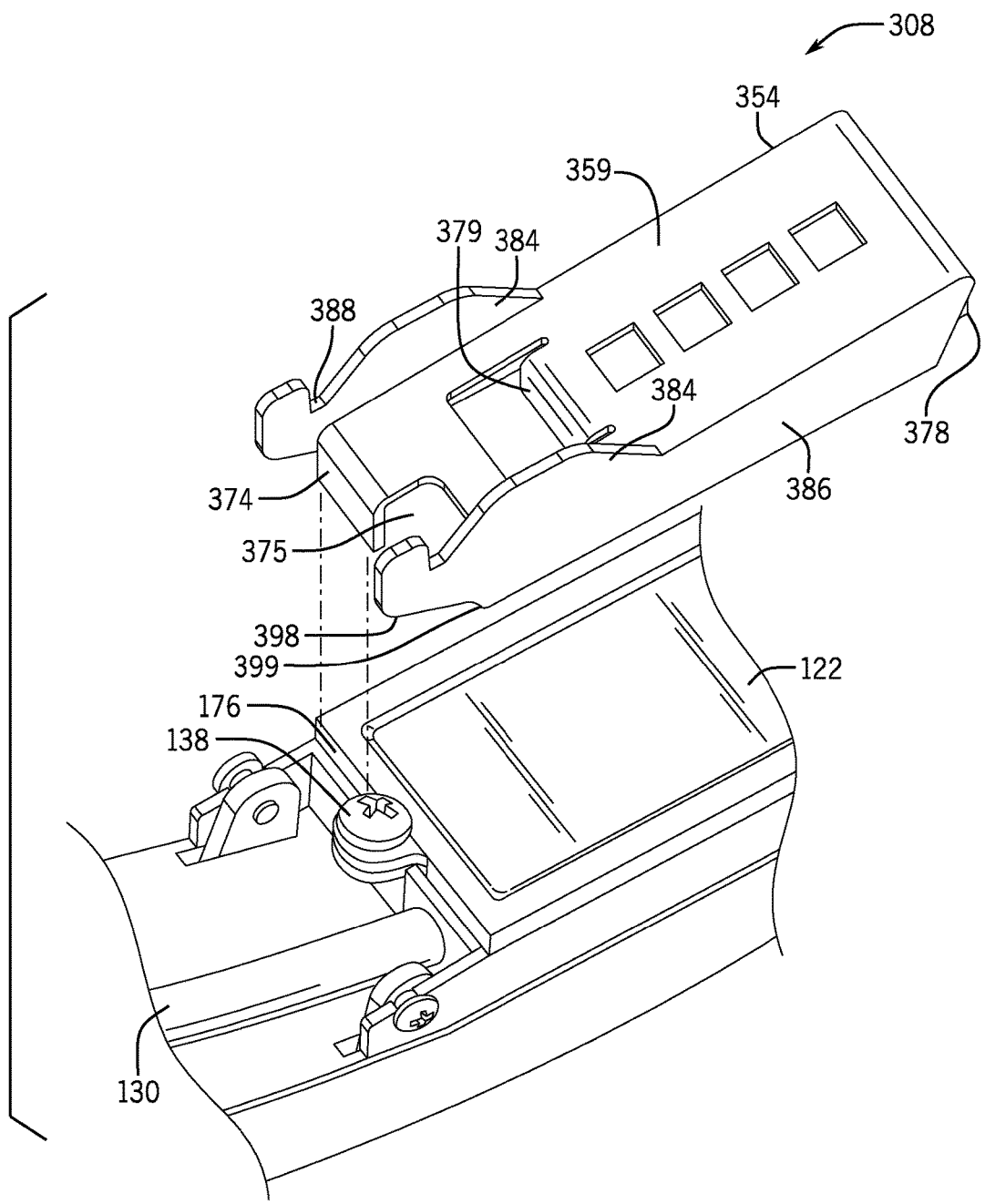
FIG. 6B is an exploded view of the portion of the planting unit of FIG. 6A, showing only portions of the seed tube and the third supporting device.

With reference to FIGS. 6A and 6B, a third example of a supporting device 308 is described. FIG. 6A shows a perspective view of a portion of a planting unit 100 similar to that of FIG. 1, incorporating the third example of the supporting device 308. To better illustrate the structure of the supporting device 308, the securing mechanisms 190 (e.g., one or more zip ties) are removed. Similar to the first and second examples of the supporting devices 108, 208, the third supporting device 308 may include a first element 354, such as a connection element, and a second element, such as an alignment element. The connection element 354 may be configured to operably support the seed follower 106 and/or attach the seed follower 106 thereto. The alignment element may be configured to axially align the seed follower 106 with the seed tube 102 along their longitudinal axes.

The connection element 354 of the third supporting device 308 may include a connection feature similar to that of the first supporting device 108. The connection feature may include one or more axially aligned apertures along the longitudinal dimension of the third supporting device 308 formed in the elongated, plate-like portion 359 of the connection element 354. Select apertures of the connection element 354 may align with select apertures 150 of the seed follower 106. One or more fasteners 172 may be positioned through one or more pairs of aligned apertures 150 to secure the seed follower 106 to the supporting device 308. The connection element 354 of the third supporting device 308 may further include one or more stand features 378, 379, such as a first stand feature 378 and/or a second stand feature 379 similar to the first and second stand features 178, 179 of the first supporting device 108. The one or more stand features 378, 379 may be configured to support the plate-like portion of the connection element 354 and the seed follower 106 attached thereto at a predetermined angle Δ relative to the access cover 122 of the sensor assembly housing. The predetermined angle Δ may be formed by either raising or lowering one end of the plate-like portion relative to the other end of the plate-like portion with respect to the access cover 122 of the sensor assembly housing.

The connection element 354 of the third supporting device 308 may further include an alignment feature 374 to reduce upward and/or downward shifting of the supporting device 308 relative to the seed sensor 104 and/or the seed tube 102. The alignment feature 374 of the connection element 354 may include a downward extending tab or flange-like extension at an upper end of the elongated plate-like portion 359 of the connection element 354 (see FIG. 6B). Unlike the two tab or flange-like extensions of the first supporting device 108, each of which may abut an upper terminal end 175 of the upper leg 120 of the sensor assembly housing, the one tab or flange-like extension 374 of the third supporting device 308 may abut a portion of an upper edge 176 of the access cover 122 of the sensor assembly housing (see FIG. 6B). Referring back to FIG. 3, the upper edge 176 of the access cover 122 may include a left portion and a right portion with the ear 136 and the connection fastener 138 positioned in between. Depending on the design of the sensor assembly 104, the left portion and the right portion of the upper edge 176 of the access cover 122 may have similar dimensions. In some examples, one of the left and/or the right portions of the upper edge 176 of the access cover 122 may be wider than the other. The tab or flange-like extension 374 of the third supporting device 308 may be configured to abut either one of the left portion or the right portion of the upper edge 176 of the access cover 122 (see FIG. 6C). Thus, an opening 375 may be formed between the tab or flange-like extension 374 and one side wall of the third supporting device 308 (described below) to allow the cables or harnesses 130 of the sensor assembly 104 to pass through.

In some examples, the tab or flange-like extension may be configured to be similar to, or substantially the same as, the width dimension of the abutting left or right portion of the upper edge 176 of the access cover 122. In some examples, the tab or flange-like extension may be configured to be smaller than the width dimension of the abutting left or right portion of the upper edge 176 of the access cover 122, but may be no less than a predetermined width to reduce lateral or rotational shift of the connection element 354 relative to the seed sensor housing. In the case where the width dimension of the tab or flange-like extension may be smaller than the width dimension of the abutting left or right portions of the upper edge 176 of the access cover 122, the tab or flange-like extensions may be positioned off centered with respect to the access cover 122 to help minimize rotational shift of the supporting device 308 relative to the sensor assembly housing. Although one tab or flange-like extension is described herein, the connection element 354 of the supporting device 308 may be configured with more than one tab or flange-like extension abutting portions of the left portion and/or the right portion of the upper edge 176 of the access cover 122.

The alignment element of the third supporting device 308 may include a pair of side plates or side walls extending substantially perpendicularly, or at any suitable angle, relative to the connection element 354. Each side plate or side wall may include a top side wall portion 384 and a bottom side wall portion 386 formed along the side edge of connection element 354 of the third supporting device 308. In some examples, the top sidewall portions 384 may extend upward along an upper or middle portion of the side edge of the connection element 354. The bottom sidewall portion 386 may extend downward along the entirety of the side edge of the connection element 354 to engage a longer portion of the sensor housing assembly 104 as compared to the first and second supporting devices 108, 208. The top and/or bottom sidewall portions 384, 386 may extend along any suitable portions of the side edge of the connection element 354 and may even extend axially beyond the upper and/or lower ends of the connection element 354. The top and/or bottom sidewall portions 384, 386 may include profiled peripheral edges to reduce the material used to form the supporting device 308.

Similar to the first and second supporting devices 108, 208, the third supporting device 308 may form a first bracket, such as a top bracket defined by the top sidewall portions 384 and the connection element 354, for receiving a portion of the seed follower 106, and a second bracket, such as a bottom bracket defined by the bottom sidewall portions 386 and the connection element 354, for receiving portions of the seed sensor assembly 104 and/or the seed tube 102. The top bracket and/or the bottom bracket of the first, second, and/or third supporting devices 108, 208, 308 may facilitate axial alignment of the supporting device 108, 208, 308, the seed follower 106, the seed sensor assembly 104, and/or the seed tube 102 along their longitudinal axes, and may reduce lateral or rotational shift of the components relative to each other.

A pair of transversely aligned securing structures 388, similar to the securing structures 188, 288 of the first and second supporting devices 108, 208, may be formed along the top edges of the top sidewall portions 384 of the third supporting device 308 and configured to receive portions of a securing mechanism 190 for securing the supporting device 308 and/or seed follower 106 to the seed tube 102. The securing structures 388 may take the form of recesses, grooves, indentations, trenches, apertures, holes, slots, opening, and so on. The pair of the securing structures 388 may be formed at an upper position along the longitudinal axis relative to the apertures of the connection element 354 to reduce possible interference of the fasteners 172 for joining the seed follower 106 to the supporting device 308 and the securing mechanism 190 for joining the supporting device 308 and the seed follower 106 attached thereto to the seed tube 102. Other suitable positions to form the securing structures 388 may be contemplated. The bottom of each securing structure 388 may be configured to be lower than the top surface of the seed follower 106 such that the securing mechanism 190 may rest against the top surface of the seed follower 106 instead of the bottom edge portion of the securing structure 388. Such configuration reduces wear on the securing mechanism 190 and may further reduce any shifting of the seed follower 106 relative to the supporting device 308, the seed sensor assembly 104, and/or the seed tube 102 due to the increased contact surface between the securing mechanism 190 and the seed follower 106. More than one pair of transversely aligned securing structures 388 may be formed.

The alignment element of the third supporting device 308 may also include a positioning feature for positioning the supporting device 308 at a desired location along the longitudinal dimension of the seed tube 102. The positioning feature may be a slanted edge portion 398 formed by cutting out a corner portion of each of the bottom sidewall portions 386 of the alignment element. In some examples, the corners of the bottom sidewall portions 386 that are adjacent to the side connection fasteners 134 for attaching the seed sensor assembly 104 to the seed tube 102 may be cut out. The supporting device 308 may be positioned on the seed tube 102 and/or the seed sensor assembly 104 in a manner such that the slanted edge portion 398 of each bottom sidewall portion 386 formed by the cut may be positioned in close proximity to the side connection fasteners 134, or may engage or abut a portion of the connection fastener 134 to reduce downward and/or upward shifting of the supporting device 308 along the longitudinal axis of the seed tube 102 and/or the seed sensor assembly 104. Although the word "cut" or "cut out" is used herein to aid understanding, the side walls may be formed with a slanted edge portion 398 using any suitable method, such as molding, casting, and so on.

In some examples, the slanted edge portion 398 may include a curved edge portion 399 adjacent to the side connection fastener 134 of the seed sensor assembly 104. The curved edge portion 399 may conform to and/or engage or abut a portion of the periphery of the side connection fasteners 134. In some examples, the curved edge portion 399 may be configured to surround and/or abut a downward half of the periphery of the connection fastener 134. As such, the curved edge portion 399 of each bottom sidewall portion 386 may essentially form an upward opening recess surrounding a lower side of the connection fastener 134. Many other suitably curved edge portions 399 may be contemplated to engage a portion of the side connection fastener 134 so as to position the supporting device 308 at a desired location along the longitudinal axis of the seed tube 102.

As described earlier, the alignment feature of the connection element 354 of the third supporting device 308, such as the downward extending tab or flange-like extension 374, may abut a portion of the upper edge 176 of the access cover 122 of the sensor assembly housing. The close proximity, engagement, or abutment between the positioning feature and the downward portions of the side fasteners 134 of the seed sensor assembly 104, in combination with the abutment between the alignment feature and the access cover 122 of the seed sensor assembly, may limit upward and/or downward shifting of the supporting device 308 and the seed follower 106 attached thereto relative to the seed sensor assembly 104 and/or the seed tube 102.

The side walls of the alignment element may be joined to the connection element 354 in a similar manner as described above with respect to the first and second supporting devices 108, 208. The side walls of the alignment element may be joined to the connection element 354 by welding, gluing, adhering, and so on. Mating structures may also be formed along the side edges of the connection elements 354 and in the side walls, such as tab and slot or tongue and groove pairs. The side walls of the alignment element and the connection element 354 may be formed as an integral piece by casting, molding, and so on. Any other suitable method may be contemplated.

Figure 6C:
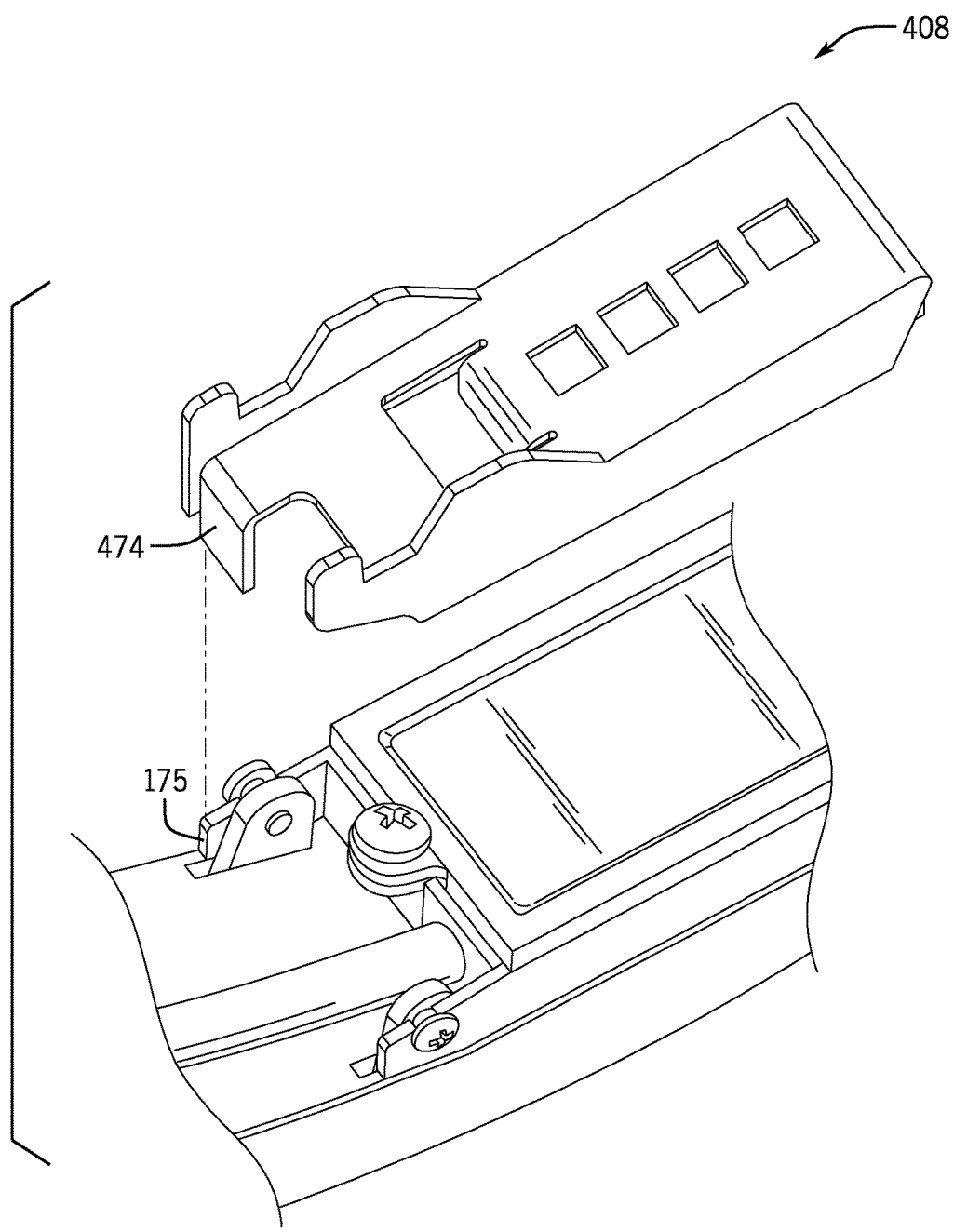
FIG. 6C is an exploded view, similar to FIG. 6B, showing portions of the seed tube and a fourth example of a supporting device.
Figure 7A:
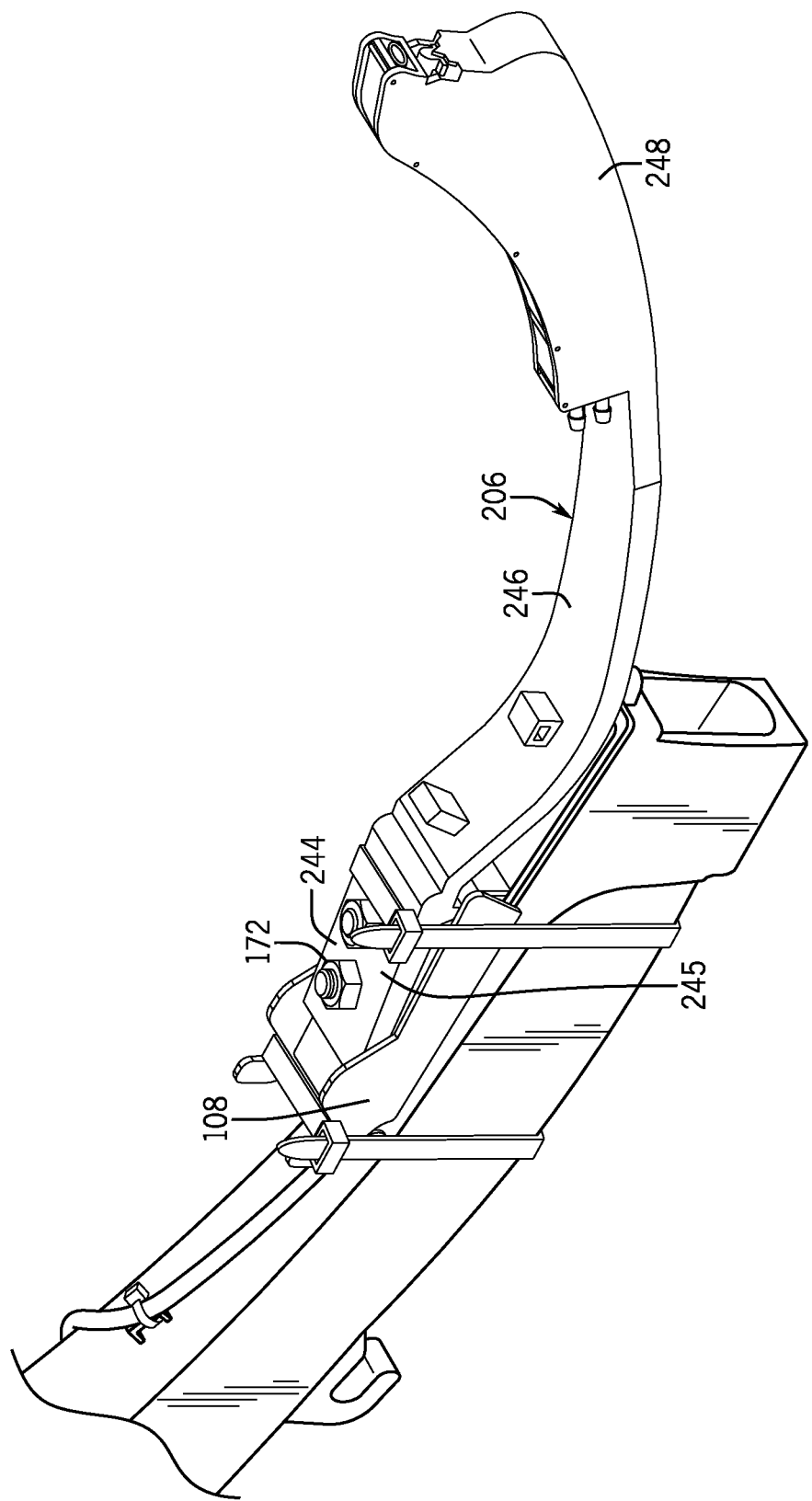
FIG. 7A is a perspective view of a portion of a planting unit similar to that of FIG. 1, incorporating the fourth example of the supporting bracket and a second example of a seed follower different from that shown in FIG. 1.
Figure 7D:
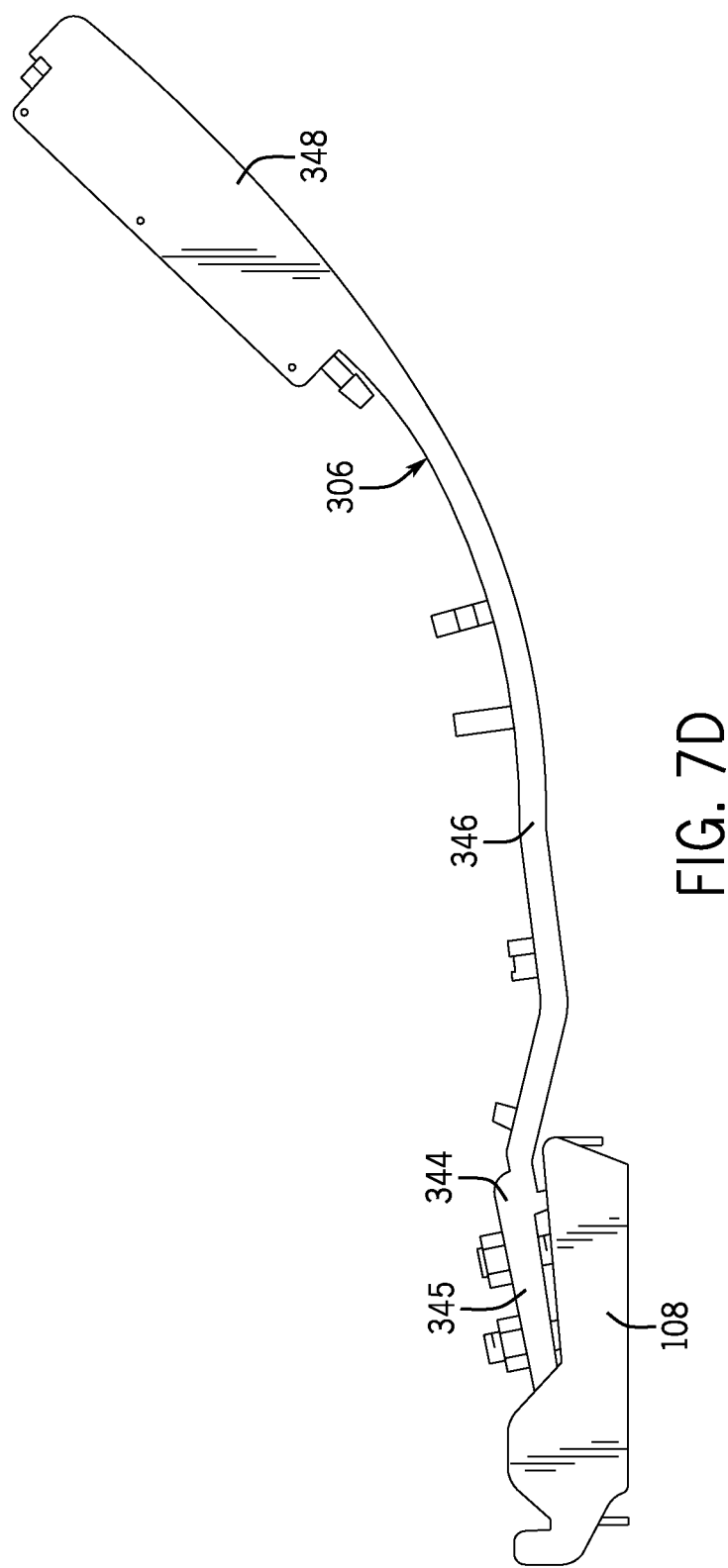
FIG. 7D is a side elevation view, similar to FIG. 7B, showing the supporting bracket and a third example of a seed follower.
Figure 8A:
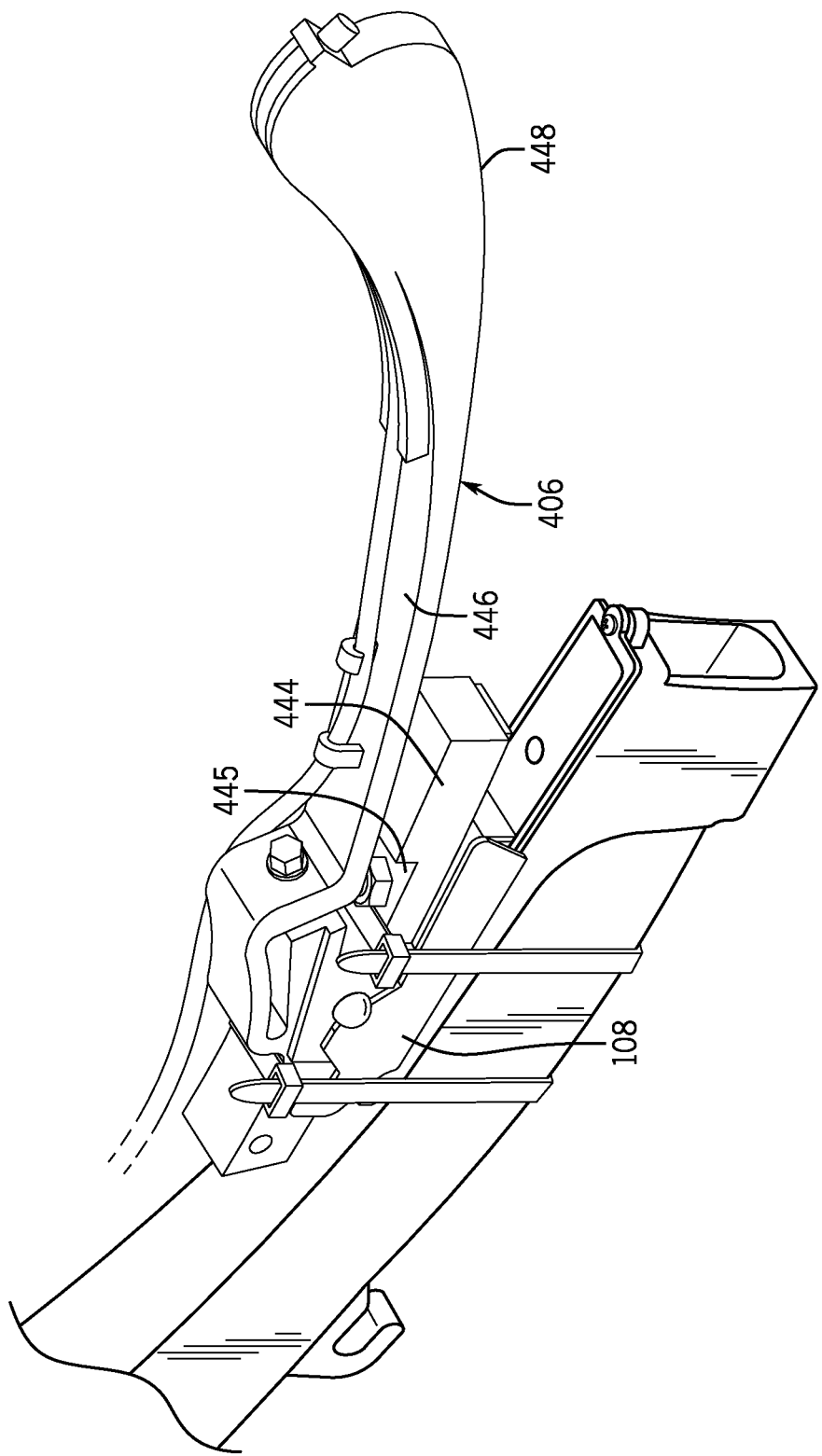
FIG. 8A is a perspective view of a portion of a planting unit similar to that of FIG. 1, incorporating the fourth example of the supporting bracket and a third example of a seed follower.

Referring to FIG. 6C, a fourth example of a supporting device 408 is described. The fourth supporting device 408 is similar to the supporting devices 108, 208, 308 as described above in that the fourth supporting device 408 may include a connection element for supporting and/or connecting a seed follower 106 to the seed tube 102 and an alignment element for positioning the seed follower 106 at a desired location of the seed tube 102 and for axially aligning the seed follower 106 with the seed tube 102 along their longitudinal axes.

The connection element may include a connection feature (e.g., one or more apertures for attaching the seed follower thereto) and a stand feature (e.g., one or more plate or flange-like extensions configured to support the seed follower at a desired angle relative to the furrow) that are similar to the connection features 170, 270 and stand features 178, 179, 278, 378, 379 as described above with respect to the other examples of supporting devices 108, 208, 308. The connection element may also include an alignment feature 474 to reduce axial shift of the supporting device 408 relative to the seed tube 102. Similar to the third example of the supporting device 308, the alignment feature 474 of the fourth supporting device 408 may include one downward extending tab or flange-like extension positioned opposite the seed sensor cables or harnesses 130 with respect to the upper connection fastener 138 for joining the access cover 122 to the housing body 118. Different from the third supporting device 308 while similar to the first supporting device 108, the downward extending tab or flange-like extension 474 of the fourth supporting device 408 may be configured to abut the upper terminal end 175 of a side wall of the upper leg 120 of the sensor assembly housing (see FIG. 6C and FIG. 3).

The alignment element of the fourth supporting device 408 may be similar to the previous examples in that it is configured to axially align the seed follower 106 with the seed tube 102 along their longitudinal axes, although the specific structures may be different. The alignment element of the fourth supporting device 408 may include a pair of side plates or side walls similar to that of the third example 308, except that the side wall portion adjacent to the alignment feature 474 of the connection element, i.e. the downward extending tab or flange-like extension of the connection element, may be configured to be similar to a corresponding portion of the first supporting device 108. As such, the alignment feature 474 of the connection element and the adjacent sidewall portion (more specific, a portion of the bottom sidewall portion adjacent to the alignment feature) may be configured to form a T-beam like structure for improved structural strength. A positioning feature similar to that of the first supporting device 108, such as a recess or a notch, may also be formed at the same bottom sidewall portion at the location corresponding to the side connection fastener 134 of the seed sensor assembly 104.

With reference to FIGS. 7A, 7B, 7C, 7D, 8A, and 8B, another three examples of seed followers 206, 306, 406 are described. The second, third and fourth seed followers 206, 306, 406 each may be a seed firmer configured to press seeds into the seed furrow. Each of the seed firmers may include a connection portion 244, 344, 444 at an upper end of the seed firmer, an engaging portion 248, 348, 448 at an lower end of the seed firmer and a neck portion 246, 346, 446 joining the connection portion 244, 344, 444 and the engaging portion 248, 348, 448. The connection portion 244, 344, 444 may include a planar portion 245, 345, 445. One or more apertures may be formed through the planar portion 245, 345, 445 for receiving one or more fasteners 172 for joining the seed firmer to one of the supporting devices 108, 208, 308, 408 described herein. Different from the first example of the seed follower 106 of FIG. 1, the engaging portion 248, 348, 448 of each of the second, third and fourth seed followers 206, 306, 406 may be configured with a raised elevation when viewed from the side (see FIGS. 7B, 7C, 7D, and 8B) and a reduced width dimension when viewed from the top (see FIGS. 7A and 8A) as compared to their respective connection portions 244, 344, 444. As such, the neck portion 246, 346, 446 of each seed firmer may include a varying width dimension along the longitudinal dimension of the seed firmer. The seed firmer may further include channels or hooks for guiding liquid fertilization tubes or such.

Connecting the second, third, or the fourth seed followers 206, 306, 406 using a supporting device 108, 208, 308, 408 as described herein provides many advantages as compared to existing connection methods for these or similar seed followers. The supporting device 108, 208, 308, 408 may allow the entrance position of the second, third, or the fourth seed follower 206, 306, 406 into a furrow to be adjusted by selectively aligning the apertures of the second, third, or the fourth seed follower 206, 306, 406 and the connection element 154, 254, 354 of the supporting device 108, 208, 308, 408 so as to work on different type of soils. The stand feature 178, 179, 278, 378, 379 of the supporting device 108, 208, 308, 408 may further allow the second, third, or fourth seed followers 206, 306, 406 to enter the seed furrow at a desired angle. As such, the adjustable attachment of the second, third, or fourth seed follower 206, 306, 406 to the seed tube 102 offered by the supporting device 108, 208, 308, 408 as described herein may allow the pressure applied by the second, third, or fourth seed followers 206, 306, 406 onto the seeds to be adjusted. Therefore, the supporting device 108, 208, 308, 408 may overcome issues associated with excessive pressure applied by the second, third, or the fourth seed followers 206, 306, 406 when using traditional attachment methods. Furthermore, the supporting device 108, 208, 308, 408 as described herein may also reduce longitudinal, lateral, and/or rotational shift of the second, third, or the fourth seed followers 206, 306, 406 relative to the seed tube 102.

Referring back to FIGS. 1, 2, 3, 7A, and 8A, one or more securing mechanisms 190 may be provided for further securing any of the seed followers 106, 206, 306, 406 as described herein to the seed tube 102. In some examples, the securing mechanisms 190 may include one or more elongated members, such as one or more zip ties. Other securing mechanisms 190 may be used, such as straps, hook and loop fasteners, ropes, tapes, and so on. Each of the zip ties 190 may be looped around the top surface of the seed follower 106, 206, 306, 406, opposing side walls 128 of the seed sensor assembly housing, opposing side walls 114 of the seed tube 102, and/or the bottom wall 112 of the seed tube 102 to secure the seed follower 106, 206, 306, 406 and the support device 108, 208, 308, 408 to the seed sensor assembly 104 and the seed tube 102. At least one of the zipper ties 190 may be received in the securing structures 188, 288, 388 of the top sidewall portions of the supporting device 108, 208, 308, 408 so as to reduce the axial shift of the zipper tie 190, the seed follower 106, 206, 306, 406, and/or the supporting device 108, 208, 308, 408 from axially shift relative to the seed tube 102. In some examples, the tail portions of the one or more zipper ties 190 may remain (see FIGS. 1, 2, 3, and 7A). In some examples, the tail portions may be cut off (see FIG. 8A).

The supporting devices 108, 208, 308, 408 as described herein may be formed using many suitable methods. The supporting devices 108, 208, 308, 408 may be cast or molded as an integral body or built up with multiple parts welded or glued together or any other suitable connection mechanism. The supporting devices 108, 208, 308, 408 may be formed from a metal plate such as steel, steel alloy, or other metals. Hardening, annealing, or other heat treatments may be provided. The supporting devices 108, 208, 308, 408 may be corrosion resistant by being made from stainless steel or being galvanized, painted, or otherwise protected. The supporting devices 108, 208, 308, 408 may also be coated or formed from suitable materials to magnetically shield the seed sensor assembly 104 from adjacent planting unit components. The supporting devices 108, 208, 308, 408 may also be formed from suitable plastics. The connection element 154, 254, 354 and/or the side walls 180 of the supporting devices 108, 208, 308, 408 may have a thickness ranging from approximately 0.03 inches to approximately 0.2 inches. Other thickness ranges may also be provided.

Figure 9:
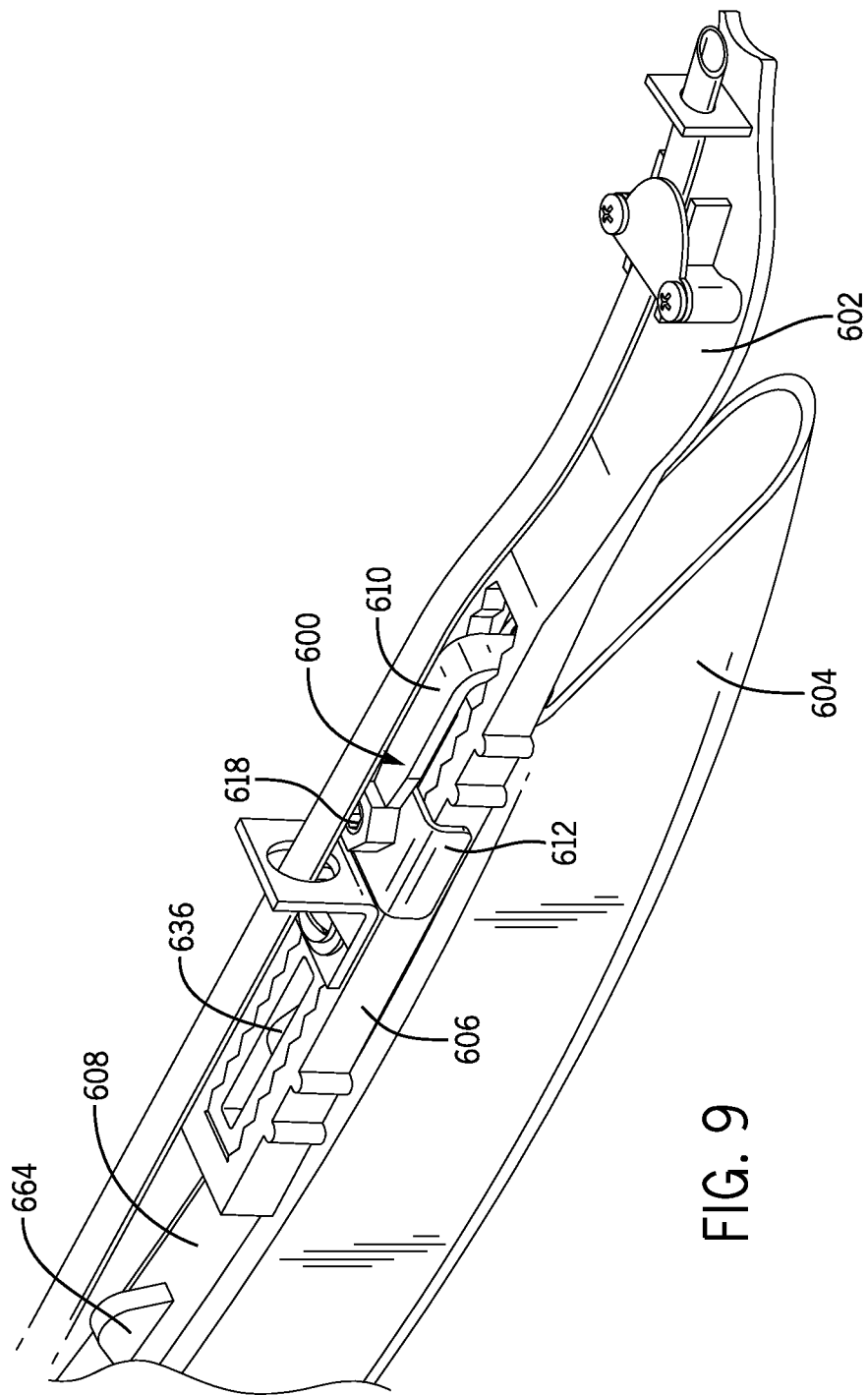
FIG. 9 is a perspective view of a portion of a planting unit for placing seeds into a furrow and depicts a fifth example of a supporting bracket or device.

Referring to FIGS. 9-14A, a bracket assembly 600 for at least partially securing a seed tube extension 602 to a seed tube 604 is shown. The bracket assembly 600 may be useful to attach a seed tube extension 602 to seed tubes 604 having a variety of different structural formations. Referring to FIG. 9, a supporting device, such as a bracket assembly 600, is shown for releasably securing a seed tube extension 602 (also referred to above as a seed tube follower or a furrow device) to a seed tube 604. Specifically, the bracket assembly 600 releasably secures a connection portion 606 of the seed tube extension 602 to a lower end of the top surface 608 of the seed tube 604. The bracket assembly 600 may releasably secure the seed tube extension 602 to the seed tube 604 with no other attachment mechanisms needed, or may be used in conjunction with one or more additional attachment mechanisms, such as a tie strap 628 (plastic, metal or other) (see FIG. 11C), threaded fastener, or the like. The bracket assembly 600 may also allow adjustment of the relative longitudinal position of the seed tube extension 602 on the seed tube 604.

The bracket assembly 600 of FIGS. 10A-C includes a clip portion 610 and a retainer portion 612 operably associated together to engage the connection portion 606 and maintain it in a desired longitudinal and lateral orientation with respect to the seed tube 604. The clip portion 610 includes a top member, bottom member, and an intermediate member 613, together forming a generally U-shaped structure. The top member and bottom member extend from the intermediate member 613 to form a top leg 614 and a bottom leg 616, respectively, each of which defines a terminal end. The legs 614, 616 may be the same length, or may be different lengths. In one example, the clip portion 610 is a relatively rigid member having a rectangular, circular, oval, square or other similarly shaped cross section having a major dimension less than the width dimension of the top surface 608 of the seed tube 604. The cross section of the clip 610 may be consistent from one end to another, or may vary along the length of the clip 610. The rigidity of the U-shape of the clip portion 610 provides a portion of the clamping force, as described below, to keep the seed tube extension 602 in place and secured to the seed tube 604. The end of the bottom leg 616 may have a wider or narrower lateral dimension than shown if desired. The deflection of the top and bottom legs 614, 616 away from each other under the clamping load is acceptable to the extent that a fastener 618 is long enough to be further extended through a clip aperture 620 and into abutment with the seed tube 604 or connection portion 606 (as described below) to maintain the desired clamping load.

Continuing with the clip structure as shown in FIGS. 10A-C, the aperture 620 is formed through the top leg 614 to receive a removable pin 618. The aperture 620 may be positioned at or adjacent to the respective terminal end of the top leg 614. The insertion of the pin 618 into and through the aperture 620 may be selectively adjustable, such as by the aperture 620 being threaded to receive a complimentarily threaded pin 618. In one example, the pin 618 may be a set screw adjustable in the aperture 620 by a tool, such as an Allen wrench. The aperture 620 may be formed by a hex nut 621 mounted, such as by welding, onto the top leg 614 of the clip 610. Other structures to allow adjustable movement of the pin 618 in the aperture 620 are contemplated.

The retainer portion 612 is shaped to at least partially conform to the top and sidewalls of the connection portion 606 when in position as part of the bracket assembly 600. In one example, the retainer portion 612 is a relatively wide and thin rigid structure defining a central portion 623 from which extends laterally spaced flanges 622. The central portion 623 defines an anchor aperture 624 (see, for instance, FIG. 11D) through which the pin 618 of the clip 610 may selectively extend, as described in more detail below. The anchor aperture 624 may be sized to receive the pin 618 there through, and in some instances may be tightly toleranced therewith. The anchor aperture 624, in one example, is positioned centrally in the central portion 623, but may be positioned elsewhere. Generally, the anchor aperture 624 is positioned to be relatively concentric with the clip aperture 620 in the top leg 614 of the clip 610, which in some instances is along the longitudinal medial line of the central portion 623 (extending parallel to the flanges 622). The clip and retainer portions 610, 612 may be separate elements positioned together when in use on the connection portion 606, or may be configured as a combined unit and fixed together even when not in use. As shown, for instance, in FIG. 11C, when positioned on the seed tube extension 602 to secure it with the seed tube 604, the top leg 614 of the clip 610 extends over the central portion 623 of the retainer portion 612, with the clip aperture 620 and anchor aperture 624 aligned to receive the pin 618.

Figure 11B:
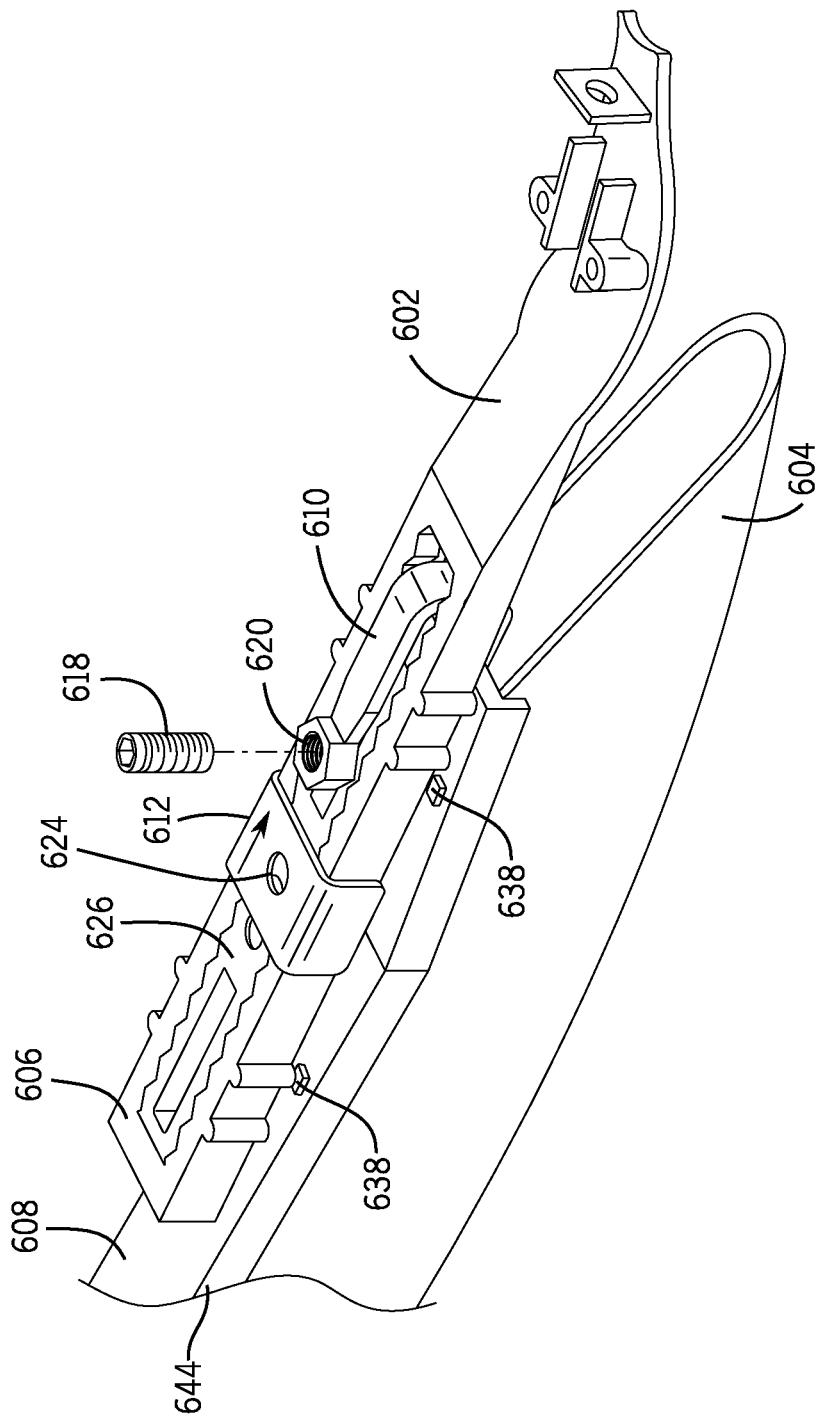
FIG. 11B is a partially exploded view of the portion of the planting unit of FIG. 11A, with the supporting device of FIG. 9.
Figure 11C:
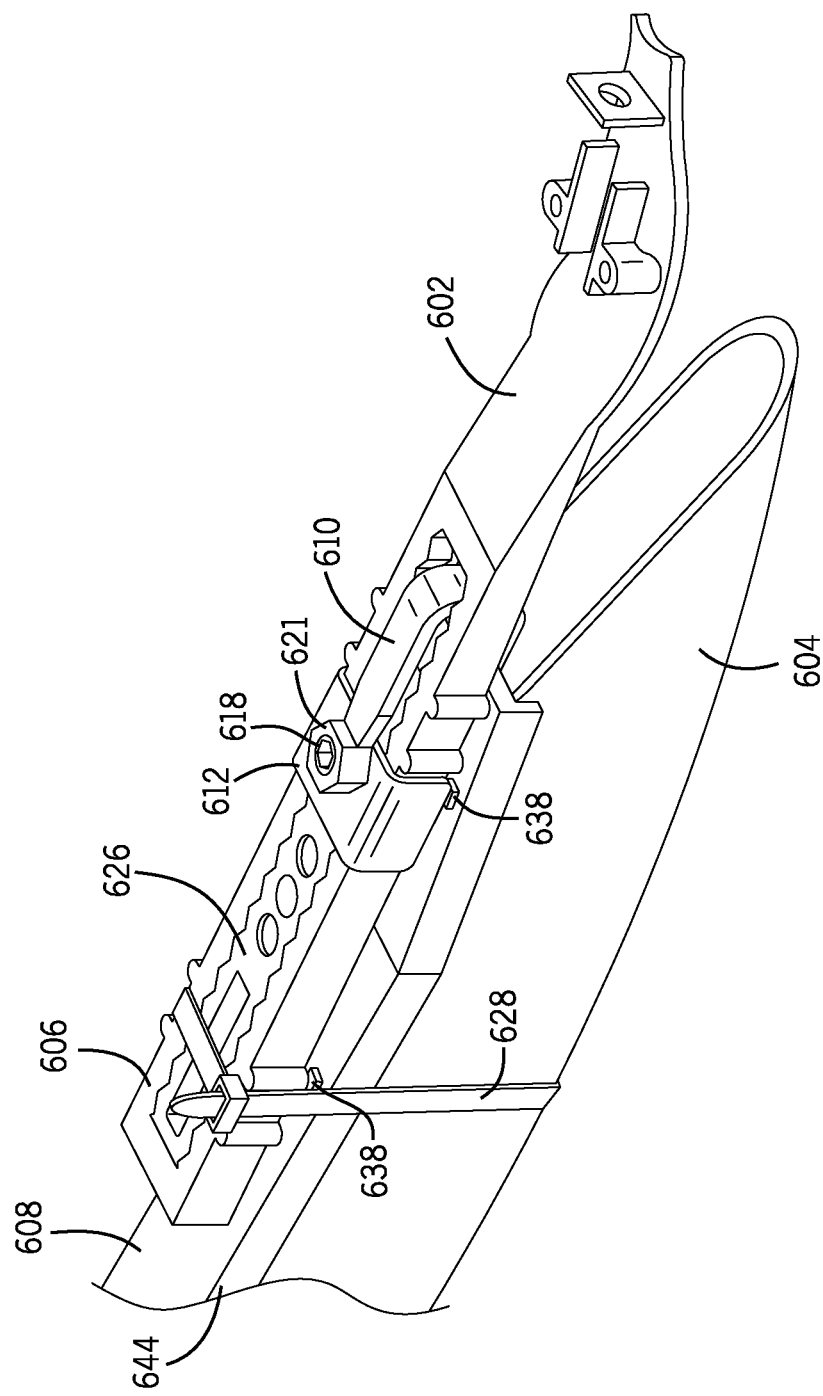
FIG. 11C is a perspective view of the portion of the planting unit of FIG. 11A, with the supporting device of FIG. 9.
Figure 11D:
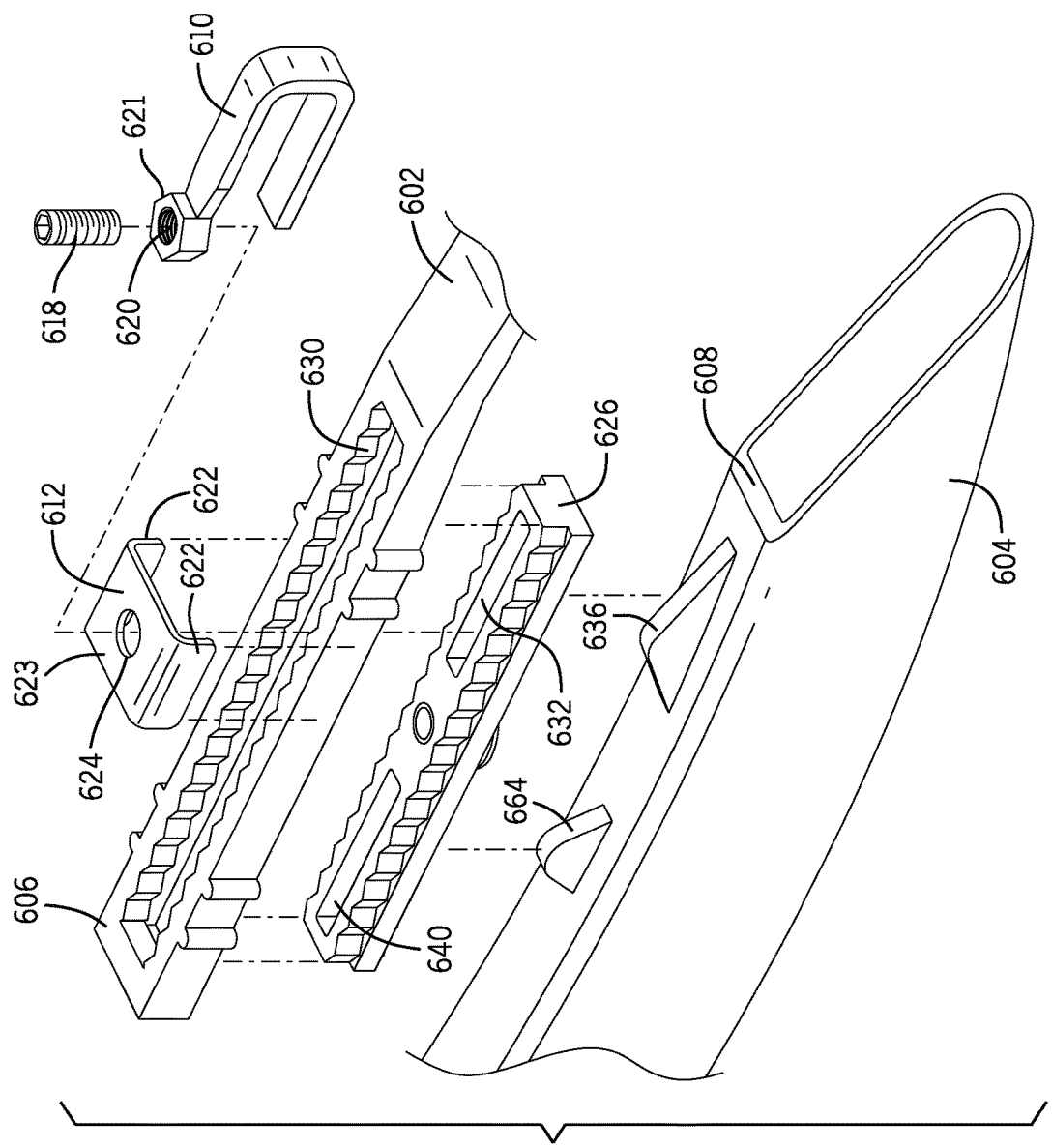
FIG. 11D is an exploded view of a portion of a planting unit similar to that of FIG. 9, with the supporting device of FIG. 9.

Generally the bracket assembly 600 removably secures the seed tube extension 602 to the seed tube 604. The bracket assembly 600 mounts over the top of the connection portion 606 to secure the seed tube extension 602 to the seed tube 604. FIGS. 11A-D show the bracket assembly mounting procedure in general. FIG. 11A is an exploded view of the seed tube 604, the seed tube extension 602, an adjustment insert 626, the clip 610, and the retainer 612 prior to installation. FIG. 11B shows the adjustment insert 626 positioned on the top of the seed tube 604, the seed tube extension 602 positioned in engagement with the adjustment insert 626, and the clip 610 positioned to extend in the seed tube 604 and over the adjustment insert 626, with the fastener 618 ready for securement in the clip aperture 620. FIG. 11C shows the retainer 612 in place with its anchor aperture 624 aligned with the clip aperture 620 in the clip 610, the fastener 618 inserted through the aligned apertures 620, 624, and a tie strap 628 (in this example) applied around the seed tube 604 and the connection portion 606 of the seed tube extension 602 to help clamp the upper portion of the seed tube extension 602 in position. FIG. 11D shows an exploded view of the structure where the seed tube 604 is formed with an integral cover.

Continuing with reference to FIGS. 11A-C, in one example, as shown in FIG. 11A, the connection portion 606 defines an elongated adjustment slot 630 for receiving the elongated adjustment insert 626 having a length shorter than the adjustment slot 630 so as to leave a portion of the adjustment slot 630 open. The edges of the adjustment slot 630 and adjustment insert 626 are serrated in complementary shapes to allow the adjustment insert 626 to be removably positioned in selected longitudinal locations within the adjustment slot 630. The adjustment insert 626 defines slits 632, 640 and apertures 634 to receive one or more positioning protrusions, fins, or tabs that may extend upwardly from the top surface 608 of the seed tube 604, or to receive fasteners, pins, or the like extending downwardly from the bracket assembly 600 as is described in further detail below.

Note that it is contemplated that the connection portion 606 may not include an elongated adjustment slot 630 and elongated adjustment insert 626. Instead, with reference to FIG. 11E, an alternate connection portion 706 may be formed of one integral piece and define central slots or slits 730, apertures 731, and openings 778, similar to those noted as being present in the connection portion 606 and adjustment insert 626, for receiving one or more positioning protrusions, fins, or tabs that may extend upwardly from the top surface 608 of the seed tube 604, or receive fasteners, pins, or the like extending downwardly from the bracket assembly 600 as noted in further detail below.

Continuing with FIG. 11A, the seed tube 604 may be a tube having a vertically elongated cross sectional shape, and is attached to the planter or other implement to extend in a downwardly and rearwardly sweeping direction, and may be curved, linear, or a combination. The seed tube 604 may be formed of one piece of molded or extruded plastic (see FIG. 11D), or may be made of two or more pieces formed together. Other materials, such as metal, or a combination of materials, is contemplated. In one example, as shown in FIGS. 11A, B, and C, the seed tube 604 has a first U-shaped bottom portion 642 and a top portion or cover forming a lid 644 extending between the free-end of the U-shaped bottom portion 642. The lid 644 has short flanges that extend downwardly from lateral edges to fit along the outside wall of the U-shaped bottom portion 642 and provide resistance to deflection of the outer walls. The lid 644 is generally elongated to extend along the length of the U-shaped bottom portion 642 and help to enclose the seed tube 604 along at least a portion of its length. The top portion, cover or lid 644 may be referred to herein as a top surface 608, top wall or top portion.

Also referring to FIGS. 11A-11C, the top surface 608 of the seed tube 604, whether it is a separate lid 644 (see FIGS. 11A-11C) or integrally formed (see FIG. 11D), may have protrusions extending upwardly from it. For instance, there may be one or more rounded fins 636, 664 (see FIGS. 11A and 11D) protruding from the top surface 608, and where there are more than one, they are spaced apart and aligned along a centerline thereof. In some examples, at least one protrusion (such as the rounded fin 636) is located at, near, or adjacent to the terminal end 676 of the seed tube 604. There may also be protrusions, such as tabs 638, positioned at, near, or adjacent a lateral edge of the top surface 608. These protrusions may be spaced apart along the length of the seed tube 604 and positioned in opposing pairs along the lateral edges. There may be more than one pair of tabs 638 positioned at spaced apart locations along the length of the top surface 608 of the seed tube 604. In some examples, only one pair of tabs 638 is found at, near, or adjacent the terminal end 676 of the seed tube 604. As described in more detail below, the protrusions may assist in laterally and longitudinally positioning, and controlling the movement of, the seed tube extension 602 on the seed tube 604.

Figure 12:
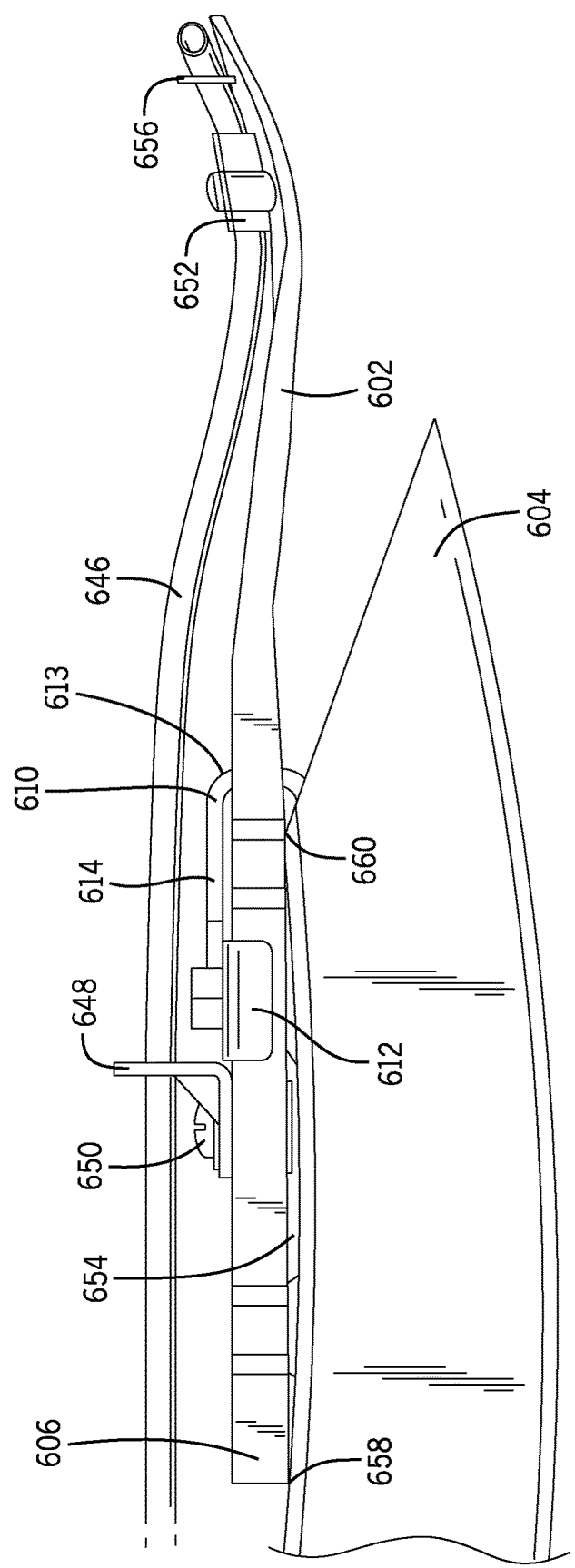
FIG. 12 is a side elevation view of the supporting device of FIG. 9 used on a seed tube without edge tabs, and without a supplemental attachment mechanism.

FIG. 12 is a side view of the seed tube extension 602 assembled with the seed tube 604 by use of the bracket assembly 600 described above. A fertilizer (or other liquid) tube 646 extends along the length of the seed tube 604 and seed tube extension 602, and is held in place by a series of tube clips 648, 652, 656 attached to the seed tube extension 602. A first clip 648 is positioned on the connection portion 606 of the seed tube extension 602, and is secured thereto by a fastener 650. A second clip 652 is positioned near the terminal end of the seed tube extension 602, and a third clip 656 is positioned between the second clip 652 and the terminal end of the seed tube extension 602 to position the fertilizer tube 646 as desired. Also shown in FIG. 12 is a gap 654 formed between the seed tube 604 and the seed tube extension 602 along a portion of their coextensive length. The gap 654 is formed from a top (left end in FIG. 12) point of contact 658 and a bottom (right end in FIG. 12) point of contact 660 of the connection portion 606 and the top surface 608 of the seed tube 604. The seed tube 604 may curve along the length overlapping with the connection portion 606, creating the gap 654 there along. The gap 654 may allow the seed tube 604 to flex without stressing the connection point(s) with the seed tube extension 602.

Figure 13A:
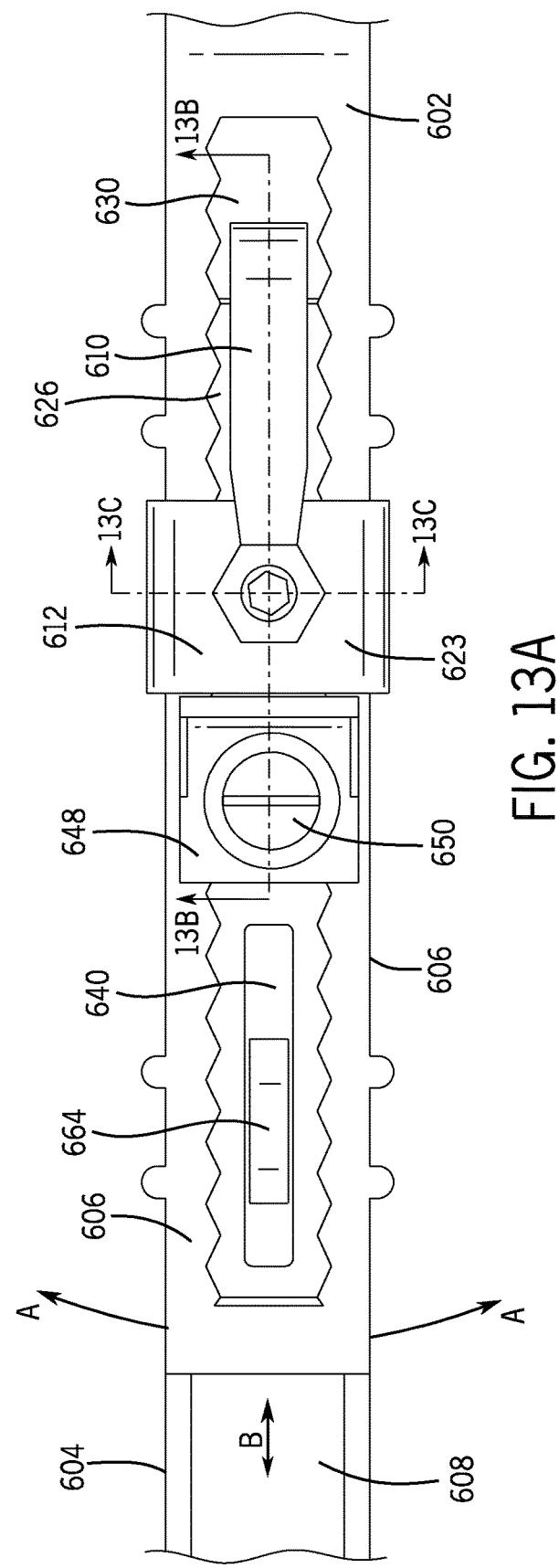
FIG. 13A is a top plan view of a portion of a planting unit similar to that of FIG. 9, with the supporting device of FIG. 9.

FIG. 13A is a top view of the seed tube extension 602 assembled with the seed tube 604 using the bracket assembly 600, and is similar to that combination shown in FIG. 9. As shown in FIG. 12, the first clip 648 for the liquid hose 646 is shown attached above (to the left of) the bracket assembly 600 by a fastener 650 that is, in this example, threaded into a boss 651 (see FIG. 13B).

Figure 13B:
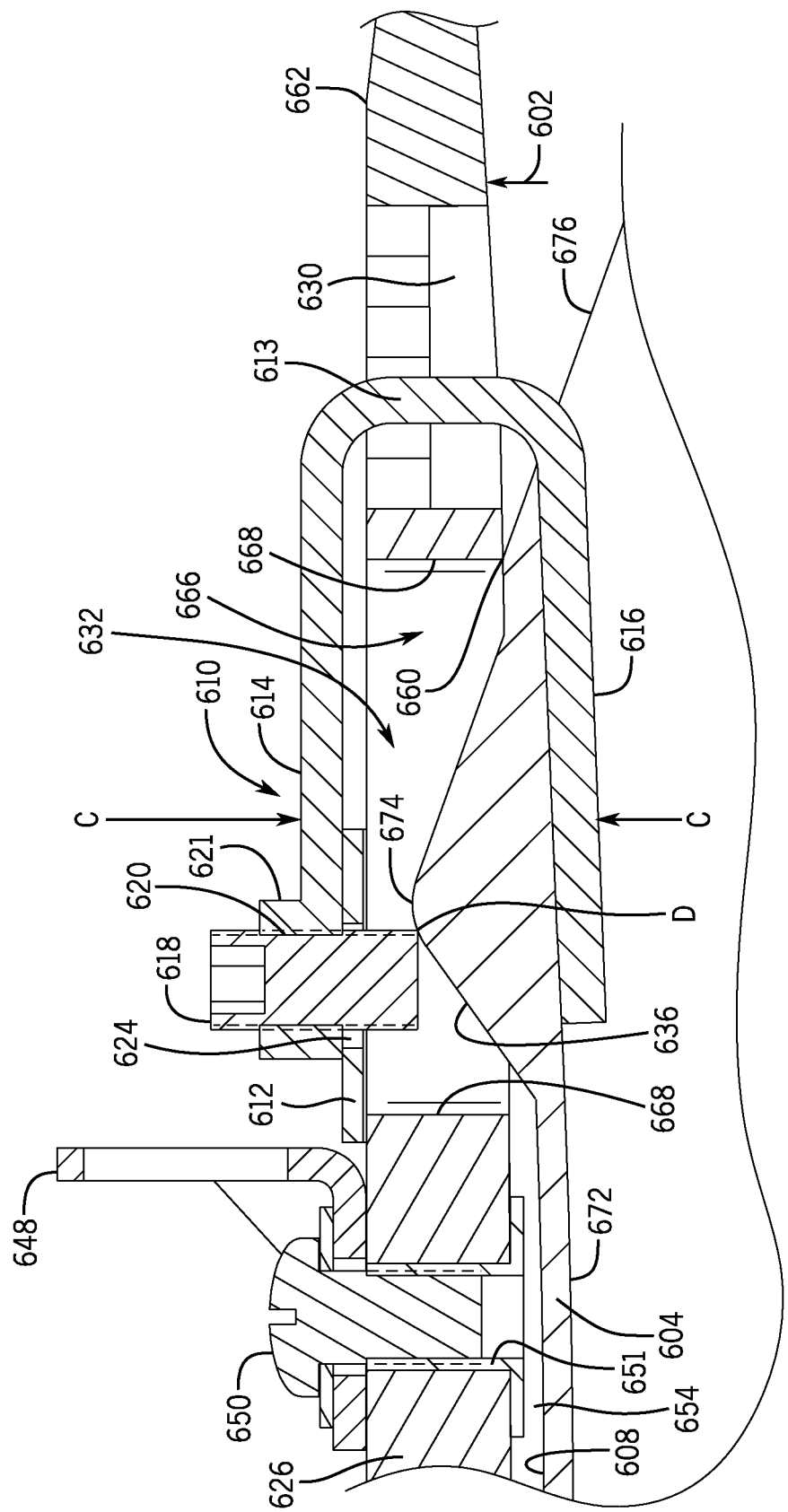
FIG. 13B is a cross sectional view of the supporting device of FIG. 9, viewed along line 13B-13B of FIG. 13A.
Figure 13C:
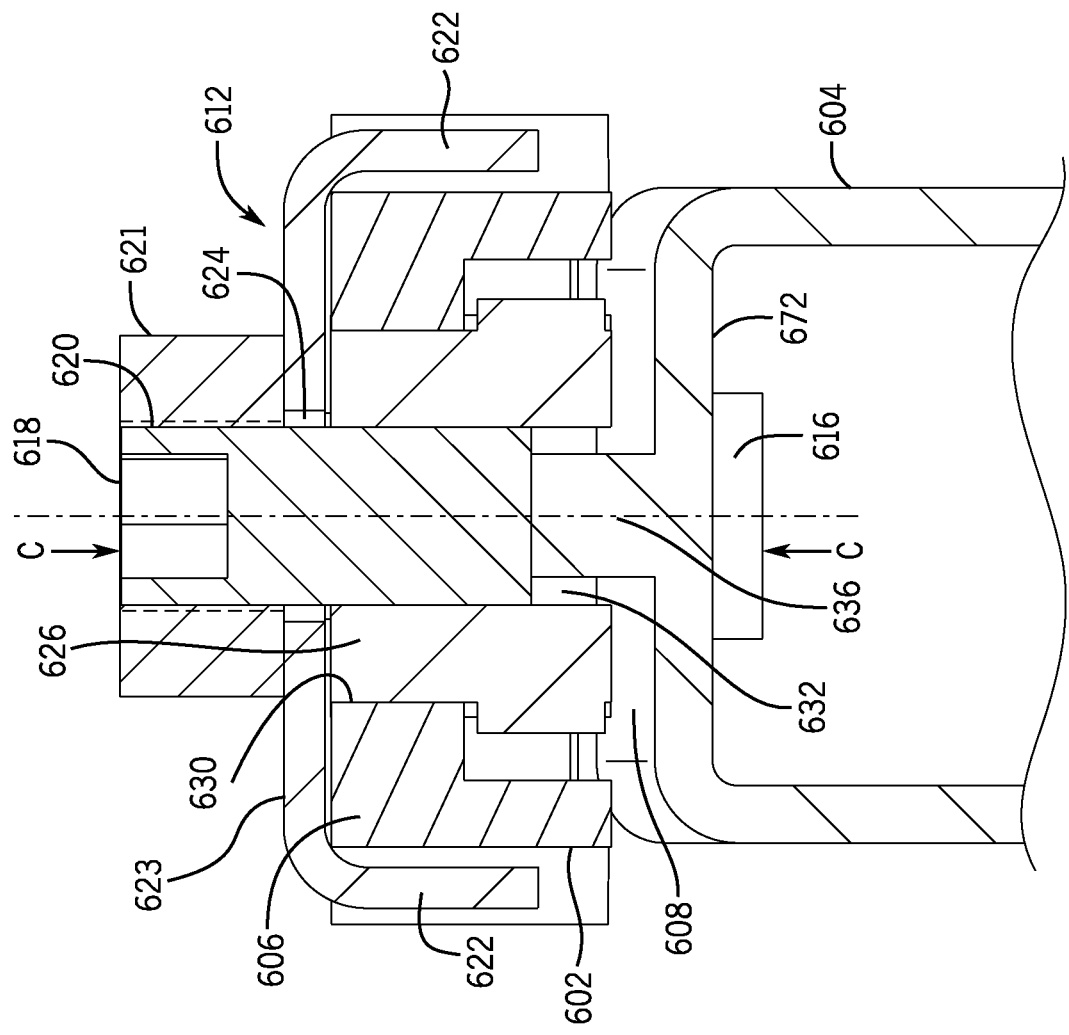
FIG. 13C is a cross sectional view of the supporting device of FIG. 9, viewed along line 13C-13C of FIG. 13A.

FIGS. 13B and 13C are cross sections of the bracket assembly 600 in position on the seed tube 604 and holding the seed tube extension 602 thereto. The secure mounting of the seed tube extension 602 in one example is at least in part due to the bracket assembly 600, and in another example is at least in part due also to the use of a supplemental attachment mechanism, such as the tie strap 628 noted above. Both of these aspects of mounting the seed tube extension 602 to the seed tube 604 address at least the creation of a clamping or compressive contact load between the connection portion 606 and the seed tube 604 to keep them in engagement with one another. This is described to some extent above, and is described in more detail below.

The secure engagement of the connection portion 606 to the seed tube 604 may also be enhanced allowing no or limited movement of the seed tube extension 602 in planar directions across (laterally) or along (longitudinally) the top surface 608 of the seed tube 604 (see the arrows A and B in FIG. 13A). While the bracket assembly 600, and when used the tie strap 628 or the like, inhibits this planar motion, this undesired motion is also effectively eliminated, reduced or controlled by the engagement of the connection portion 606 with the protrusions (noted above) extending from the seed tube 604, and in particular from the top surface 608 of the seed tube 604.

Continuing with reference to at least FIGS. 13A-C, the engagement of the protrusions with the connection portion 606 is described. In mounting the connection portion 606 to the seed tube 604, the lower slit 632 in the adjustment insert 626 is received over one of the protrusions on the top surface 608 of the seed tube 604. In this example the slit 632 is the one nearest the neck 662 of the seed tube extension 602, and the protrusion is the fin 636 located nearest the terminal end 676 of the seed tube 604. Other slits and protrusions on the adjustment insert 626 and seed tube 604, respectively may be used. For instance, in FIGS. 9 and 13A-C, a second protrusion 664 is positioned on the top surface 608 of the seed tube 604 and is received in a slit 640 formed in the upper end of the adjustment insert 626 to provide resistance to lateral and planar motion. Additionally, the slits and protrusions utilized for this purpose do not need to be near, under, or adjacent to the bracket assembly 600.

The fin 636 is surrounded by the side and end walls 666, 668 of the slit 632, and thus the connection portion 606 cannot move too much in any direction (if it moves at all) without the fin 636 contacting one of the slit boundary walls 666, 668. This interfering abutment or engagement helps anchor the connection portion 606 against lateral movement, and in some examples longitudinal movement, relative to the seed tube 604. Longitudinal movement is limited where the length dimension of the fin 636 is generally the same as the length of the slit 632. Additionally, planar movement of the connection portion 606 relative to the top surface 608 of the seed tube 604 may be inhibited by the other protrusions on the top surface 608 of the seed tube 604, such as the laterally spaced tabs 638 (see FIGS. 11A, 11B and 11C). Since the tabs 638 extend upwardly along the edges of the seed tube 604, and the connection portion 606 is positioned between the tabs 638, the connection portion 606 cannot move laterally relative to the seed tube 604 without the tabs 638 interfering with the motion. The tabs 638 thus also assist in the restriction of the planar motion of the seed tube extension 602 relative to the top surface 608 of the seed tube 604.

This planar motion is also to some extent restricted by the engagement of the bracket assembly 600 with the connection portion 606 through the friction between the surfaces clamped together under the compression load created by the bracket assembly 600. It is also limited by the pin 618 being positioned through the anchor aperture 624 in the retainer 612, which is held in lateral position on the connection portion 606 by opposing side flanges 622, as well as the structural resistance to twisting or torsion of the top and bottom legs 614, 616 and base member 613 of the clip 610.

Continuing with FIGS. 13A, 13B, and 13C, the clip 610 is positioned such that the top leg 614 extends along the middle (between the longitudinal sidewalls) of the connection portion 606, in this example over the adjustment insert 626 (FIG. 13A), with the clip aperture 620 formed therein aligned generally over the fin 636. The bottom leg 616 is positioned inside the seed tube 604 and extends along the inside inner surface 672 of the top wall of the seed tube 604. The length of the bottom leg 616 in this example is about the same length as the upper leg 614, and extends at least to the extension of the common axis of the aligned upper leg 614 and clip and anchor apertures 620, 624, and may extend beyond or short of that position. The retainer 612 is positioned on top of the connection portion 606 with its flanges 622 extending over the lateral edges of the connection portion 606 to secure it against lateral movement. The retainer 612 is also positioned at least partially underneath the top leg 614 of the clip 610, with the anchor aperture 624 formed therein aligned with the clip aperture 620. The fastener 618 is adjustably positioned, such as by threaded engagement, in the clip aperture 620 and also positioned (adjustably or freely) through the anchor aperture 624. The fastener 618, in the example shown in FIGS. 13A-C, is a threaded pin, and is threaded by the user into contact with the top of the fin protrusion 636 received in the slit 632, as referenced by the load contact point D in FIG. 13B.

Referring still to FIGS. 13B and 13C, the contact of the fastener 618 with the fin 636 at the load contact point D draws the bottom leg 616 of the clip 610 into tight engagement with the inner surface 672 of the top of the seed tube 604, thus creating a clamping force C (FIGS. 13B and 13C). The fastener 618, also referred to as the pin, is also considered a load member for adjustably applying a load to the seed tube 604, and may be in operable engagement with the seed tube 604, either directly in engagement with the seed tube 604 or indirectly in engagement with the seed tube 604 through the seed tube extension 602.

This clamping force compresses the layer or layers at least between the lower end of the pin 618 and the bottom leg 616 of the clip 610. While the connection portion 606 may not have to be tightly clamped into contact with the top surface 608 of the seed tube 604 for the bracket assembly 600 to securely connect it to the seed tube 604, such clamped and secure engagement between the two members (connection portion 606 and top surface 608 of seed tube 604) may be beneficial. The engagement point of the pin 618 relative to the fin 636 may help securely position the clip 610 in its longitudinal location on the seed tube 604. The fin 636 defines a high point 674, or crest, which slopes away to either side in a longitudinal direction along the seed tube 604. The lower end of the pin 618 engages the sloped sidewall of the fin 636 on the side of the crest 674 that slopes away from the terminal end 676 of the seed tube 604. The sloped sidewall effectively acts as a cam surface, inhibiting the end of the pin 618 from moving "uphill" against the inclined slope, which thus arrests or limits the movement of the clip 610 towards the terminal end 676 of the seed tube 604. This relatively position of point of contact between the fin 636 and pin 618 is not necessary for the adequate function of the bracket assembly 600. It is contemplated that the thickness of the top leg 614 of the clip 610 may be sized to maintain engagement along at least a part of the length of the connection portion 606 between the intermediate member 613 of the clip 610 and the retainer 612 to provide a larger surface area for the clamping force to be applied. The clamping force created by the bracket assembly 600 may be sufficient to keep the connection portion 606 from disengaging from the other protrusion 664 received in the upper portion of the connection portion 606.

The clamping load limit is that load which causes the clip 610 to deform, such as by the upper and lower legs 614, 616 deflecting away from each other. The deflection may be resilient or plastic (permanent) deformation. The clip 610 may be strengthened against this deformation by using stronger materials, by structural reinforcement of the U-shape, or by using a differently shaped clip 610. Also, the pin 618 may be replaced with one having a longer length so long as the pin 618 engages the fin 636, or other structure as explained below, to create a sufficient clamping load.

The clip 610 may be used to secure the seed tube extension 602 to the seed tube 604 without the retainer 612. A portion of the clip 610 is received inside of the seed tube 604 for applying the clamping force when the load element operably engages the seed tube 604.

Figure 13D:
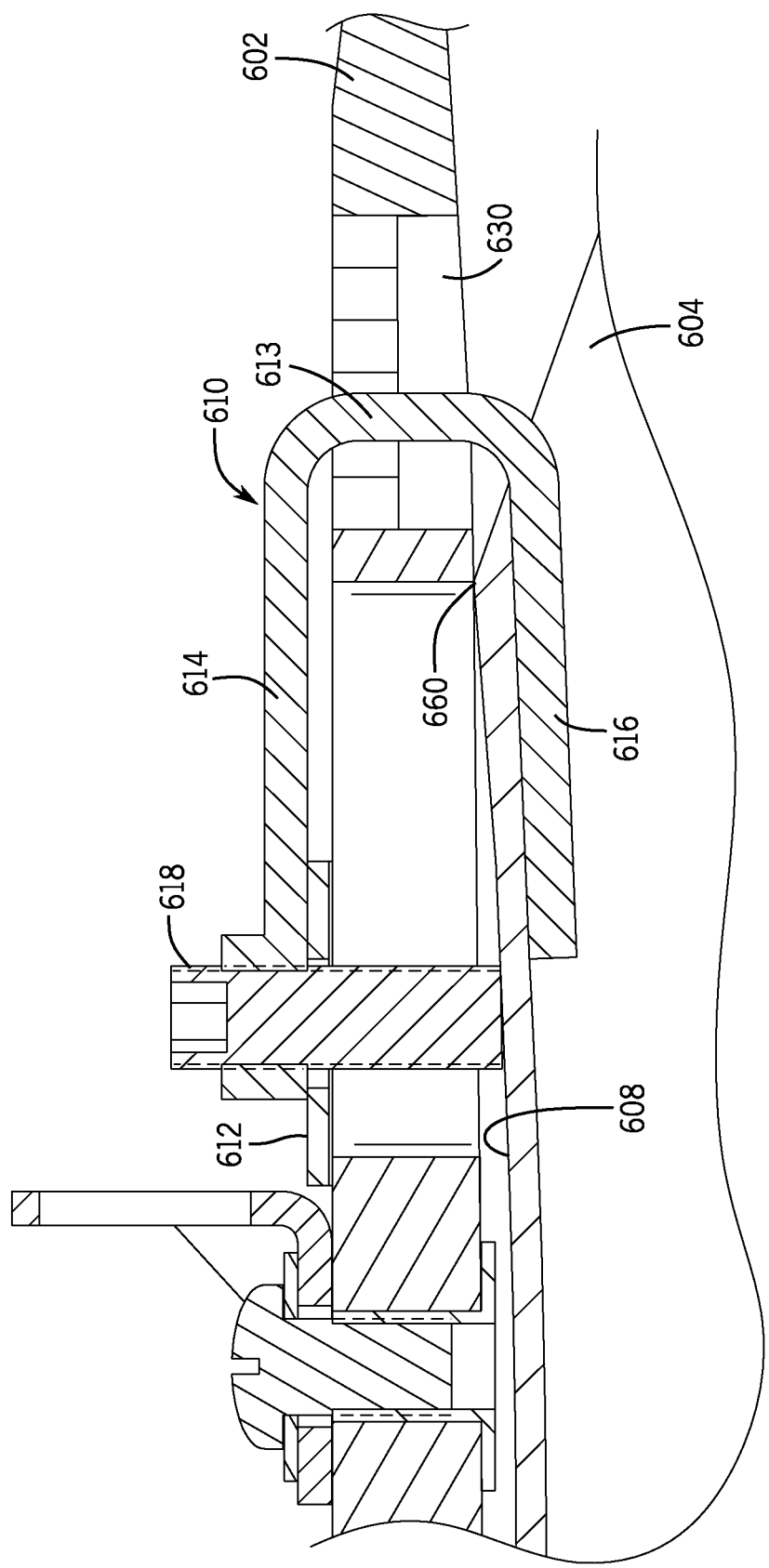
FIG. 13D is a cross sectional view of the supporting device of FIG. 9 attached to a portion of a planting unit similar to that of FIG. 9.

FIGS. 13D and 13E both show alternative contact points for the fastener 618 by which a clamping load may be created. The elements of the structure in FIGS. 13D and 13E are similar if not the same to those shown in FIGS. 13A-C, but for the particular structure detailed below. In FIG. 13D, the fastener 618 extends through the clip and anchor apertures 620, 624 and contacts the top surface 608 of the seed tube 604, not on a fin 636. This engagement may effectively create a clamping load sufficient for the intended purpose and does not rely on the alignment of the fin 636 being directly below the clip aperture 620, nor the engagement of the fastener 618 with a sloped edge of the fin 636 as in the other example described above. FIG. 13E shows the end of the fastener 618 engaging the bottom of a recess 678 formed in the top surface of the engagement portion (whether in the adjustment insert 626 or in an integrally formed connection portion 706 as shown in FIG. 11E) to create the clamping load. No protrusion is received in a slit or opening in this part of the connection portion 606 in this example. In this example the fastener 618 is not in direct contact with the seed tube 604. The recess 678 may take the form of a shallow well, and may be only large enough to receive the end of the fastener 618. Additionally, it is contemplated that the fastener 618 may contact a portion of the top surface of the connection portion 606 without being received in or in contact with any particular feature intended to receive the end of the fastener 618. This configuration may also create a clamping load sufficient to engage the layer or layers together between the fastener 618 and the bottom leg 616 of the bracket assembly 600 sufficient to securely position the seed tube extension 602 onto the seed tube 604.

Figure 14A:
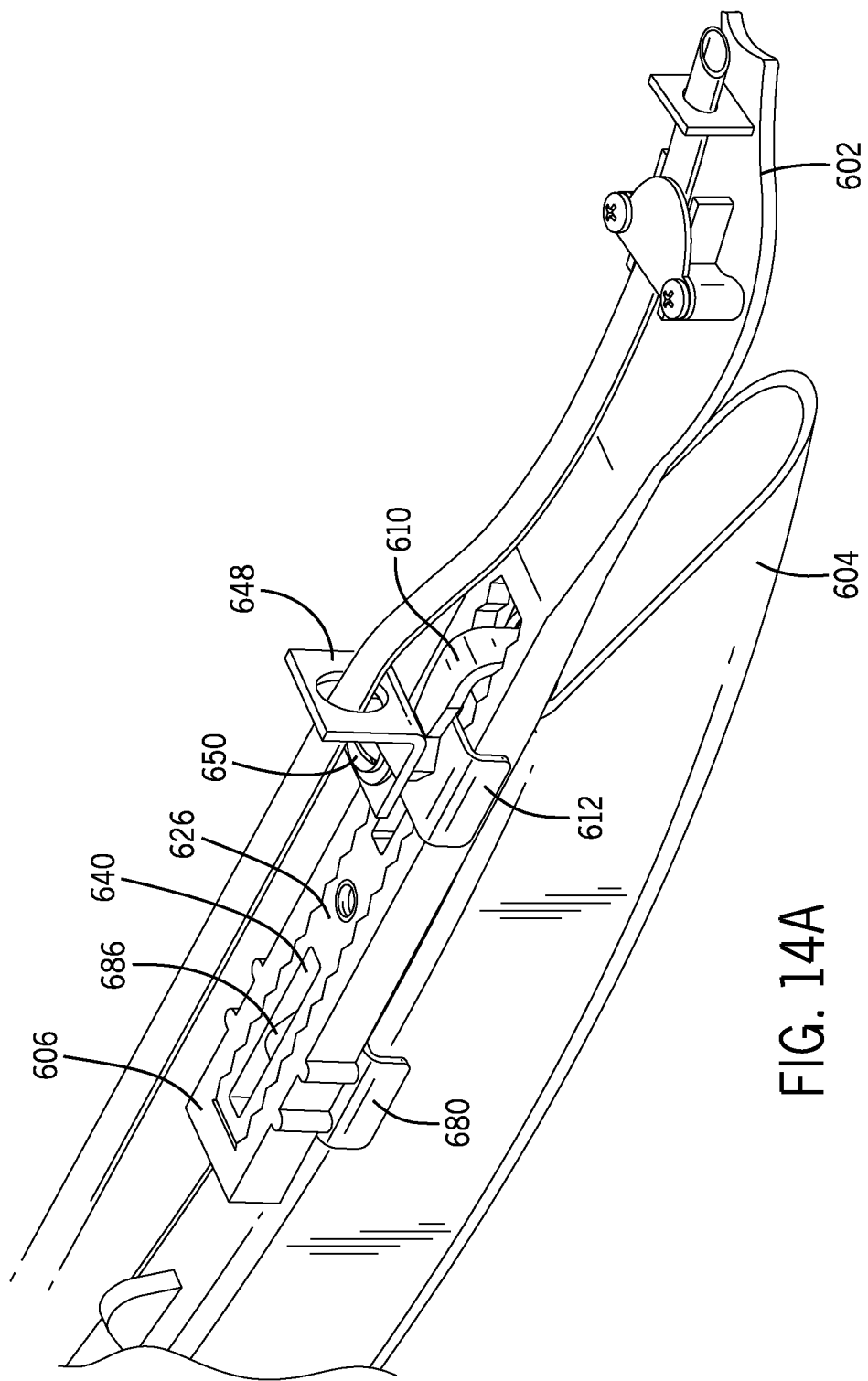
FIG. 14A is a perspective view of a portion of a planting unit similar to that of FIG. 9, with a single fastener attaching the supporting device of FIG. 9 and a fertilizer tube clip to the portion of the planting unit.
Figure 14C:
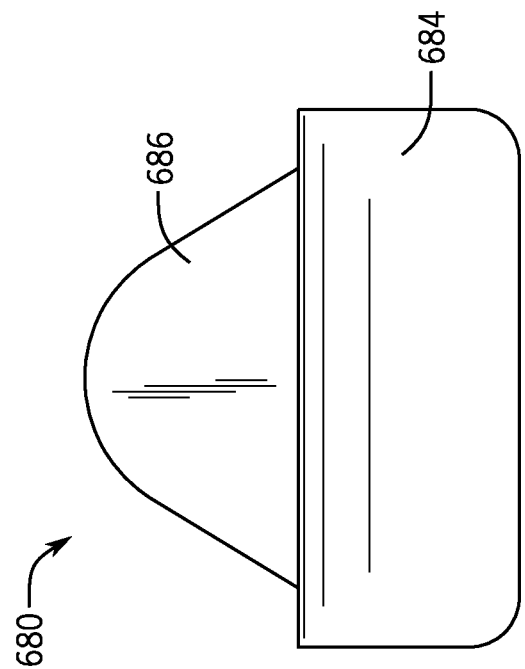
FIG. 14C is another side elevation view of the supplemental bracket of FIG. 14B.
Figure 14B:
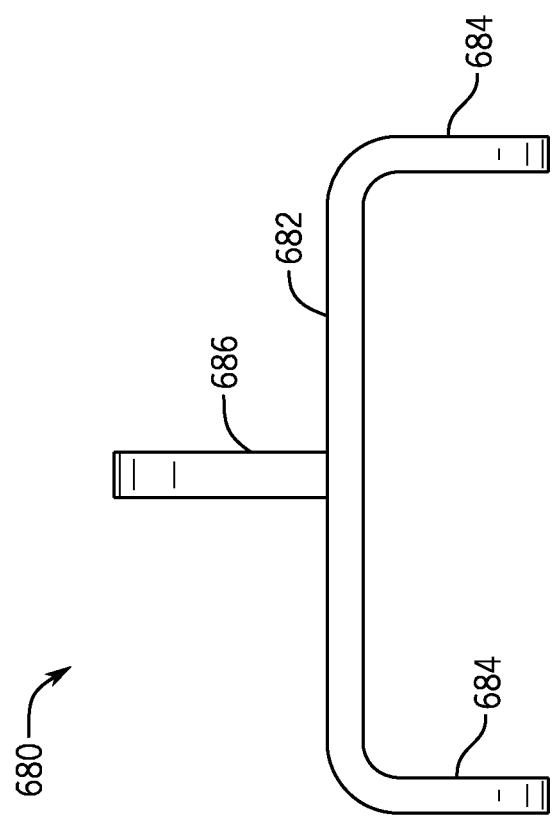
FIG. 14B is a side elevation view of a supplemental bracket of the portion of the planting unit of FIG. 14A for providing a protrusion where needed to help anchor the extension on the seed tube.

Some seed tube designs may only include one protrusion sufficient to help facilitate attachment of the seed tube extension 602 to the seed tube 604. In at least one example, such as that shown in FIG. 14A, the seed tube 604 includes only one protrusion 636, which is in the same location as that shown in FIGS. 13A and B. This allows the bracket assembly 600 to be mounted as noted with respect to FIGS. 13A and B above. The upper end of the connection portion 606, however, without a protrusion received in a slit or slot formed at that end, is not necessarily stable against planar rotation due to forces acting on the seed tube extension 602 during use (such as by contact with the ground). As noted above, this end may be secured with a supplemental fastener, such as a circumferential fastener 628 (e.g. a tie strap), or another type of fastener securing it to the seed tube 604. Additionally, as shown in FIG. 14A-C, a supplemental bracket or mount 680 may be used to position a protrusion 686 where desired, in order for the protrusion 686 to be received in a recess, slit or slot formed in the connection portion 606. The protrusion 686, when received in the connection portion 606, provides a limit or hindrance to the planar motion of the upper end of the connection portion 606 relative to the seed tube 604. The clamping force created by the bracket assembly 600 provides sufficient anchoring of the seed tube extension 602 to the seed tube 604 to keep the seed tube extension 602 from moving longitudinally on the seed tube 604, and the supplemental mount 680 resists or limits the planar motion (such as rotation around the point of load the bracket assembly). One example of the supplemental mount is the bracket 680 shown in FIGS. 14B and C. The bracket 680 may be a U-shaped plate with a planar middle portion 682 and flanges 684 formed along lateral edges and extending in one direction from the middle portion 682. A protrusion 686 extends from a central location of the middle portion 682, and extends in the direction opposite the flanges 684. In this example the protrusion 686 has a fin-shape like that shown and described above, and is narrow in width, and in the longitudinal direction defines a rounded crest with sidewalls sloping to the middle portion 682 of the bracket 680.

The supplemental bracket 680 is positioned on the seed tube 604 at a location calculated to be under the upper end (left end in FIG. 14A) of the connection portion 606 of the seed tube extension 602, and to be received in a slit, slot 640, or opening formed therein. The flanges 684 extend over the sidewalls of the seed tube 604 to stabilize the bracket 680 from lateral movement relative to the seed tube 604. The protrusion 686, received in the slit, slot 640, or opening on the connection portion 606, limits the lateral and planar movement of the upper end of the seed tube extension 602. The clamping force from the bracket assembly 600 restricts the relative vertical separation movement of the connection portion 606 engaged with the supplemental bracket 680. These restricted degrees of freedom of movement together sufficiently secure the upper end of the connection portion 606 to the seed tube 604. This supplemental bracket 680 may be useful in mounting the seed tube extension 602 to a seed tube 604 where the seed tube 604 has no protrusions. It may be useful in providing a protrusion at both the lower and upper end of the seed tube 604. Also note, in FIG. 14A, the fastener 650 for securing the bracket assembly 600 is also used to secure the liquid hose clip 648.

If desired, a circumferential engagement device 628 may be used as further securement means.

With reference now to FIGS. 15A-D, in some instances, it may be desired to utilize an additional bracket feature, referred to as a positioning clip 688, in addition to the clip 610 described above, in order to keep the seed tube extension 602 aligned with the seed tube 604 when securing the seed tube extension 602 at its upper end to the seed tube 604 utilizing a circumferential engagement device 628, such as a tie strap. On occasion the top surface 608 of the seed tube 604, in the area of the top end of the seed tube extension 602 when attached thereto, does not have one or more fins, protrusions, or protuberances extending upwardly therefrom. These protrusions assist in aligning the seed tube extension 602 on the seed tube 604 when secured thereto so that the seed tube extension 602 is positioned over the seed tube 604 as desired. If the lateral alignment of the top end of the seed tube extension 602 is not within a certain range of accuracy, the terminal end of the seed tube extension 602 may laterally skew from a centerline of the seed tube 604 as it extends past the lower end 676 of the seed tube 604. Since the middle (generally) of the seed tube extension 602 is secured by the clip 610 described above to the terminal end 676 of the seed tube 604, that attachment point may act as a pivot point about which the seed tube extension 602 may laterally deviate if the top end of the seed tube extension 602 is not secured firmly in the proper alignment along the longitudinal axis of the seed tube 604.

When the tie strap 628 is pulled tight, without a protrusion or fin to help define the proper location, the seed tube extension 602 may pull to one side at that securement position, which skews the opposite terminal end so that it is not lined up with a central axis extending from seed tube 604.

The additional bracket feature, referred to as a positioning clip 688, may be used to create a protrusion 698 where desired to align the top of the seed tube extension 602. As shown in FIGS. 15A-D, the positioning clip 688 has a main body 690 having a rectangular shape and defining a width similar to the top surface 608 of the seed tube 604. This width may be greater than or less than the width of the top surface 608 of the seed tube 604. More than likely a width just smaller than the width of the top surface 608 of the seed tube 604 is advantageous because the circumferential fastener 628 helps center the main body 690 on the top surface 608 as it passes over the edge of the main body 690 to engage the seed tube 604 on either side.

A flange 692 extends upwardly along each longitudinal side of the main body 690, with a notch 694 in each flange 692 at about the mid-length of the flange 692. The notch 694 in this example extends from the top of the flange 692 to the top surface 697 of the main body 690. A protrusion 698 is formed along a center line of the main body 690, and positioned in line and centered with the notch 694. In this example, the protrusion 698 has a triangular shape and is formed from an integral portion of the main body 690 that is punched and bent into the desired shape. The flange 692 extends from one end of the main body 690 to about two-thirds of the length of the main body 690. It may extend more or less as long as the notch 694 can be located as needed. An aperture 699 is formed at the end of the main body 690, which in this example may be square in shape. Other shapes are contemplated.

The positioning clip 688 in use is positioned with the bottom surface of the main body 690 engaging the top surface 608 of the seed tube 604. The flanges 692 extend upwardly from the main body 690. The seed tube extension 602 is positioned in the positioning clip 688, between the flanges 692, with a slot positioned over the protrusion 698. The clip 610 described above is used to secure the seed tube extension 602 to the terminal end 676 of the seed tube 604.

A tie strap 628, or other circumferential fastener, is positioned through each notch 694, and around the seed tube 604, and fastened to itself to secure the seed tube extension 602 to the seed tube 604. The tie strap 628 keeps the edges of the main body 690 aligned generally with the edges of the seed tube 604, and the protrusion 698 on the main body 690 laterally positions the top portion of the seed tube extension 602 on the seed tube 604.

The flanges 692 help keep the sides of the seed tube extension 602 aligned on the main body 690 above and below the lateral line of seed tube extension 602 across the seed tube extension 602 and through the clips. The bracket 688 may be used in connection with, for example, the Edge Vac™ seed tube, which only has one notch sticking up on the back side of the seed tube where most other planter seed tubes have 2 notches sticking up on the back side (one near the end of the seed tube for use with the regular bracket, and one positioned further up the seed tube, in the area of the top portion of the extension).

The bracket assembly 600 as defined herein provides many benefits in its function of securing the seed tube extension 602 to the seed tube 604. One example is that the typical use of a tie strap 628 to connect the lower end of the connection portion 606 to the end of the seed tube 604 is no longer necessary. The bracket assembly 600 is easily applied and removed to allow for adjustment of the seed tube extension 602 as desired. Also, use of this lower tie strap 628 was occasionally problematic in that it was difficult to adjust since it had to be destroyed to allow the position of the seed tube extension 602 to be adjusted. Further, in some instances, as the furrow opener discs wore down, they sometimes would rub on the tie strap 628 and wear through it during use. The bracket assembly 600 is positioned on the top surface 608 of the seed tube 604, and does not extend appreciably beyond the sidewalls of the seed tube 604, if at all, so that it has a very low profile and is not likely to interfere with other equipment. The bracket assembly 600 is also reusable, and is not subject to wear and tear from exposure to the elements. The application and removal of the bracket assembly 600 is also able to be performed from above the top surface 608 of the seed tube 604 and does not require access to the sides of the seed tube 604, which can be difficult where the seed tube 604 is between furrow discs. These are examples of the benefits of one or more structural or functional features or aspects of the bracket assembly 600, and may be achieved by individual or in any combination of individual or collective components.

While multiple supporting devices are described herein as examples, still other examples of the supporting device may be contemplated. Each of the various aspects and features of the exemplary supporting devices may advantageously be used separately in some instances, or in combination with other aspects and features of the supporting devices in other instances.

A seed follower is described herein as an exemplary component that may be connected to the seed tube using the supporting devices as described herein. Other planting unit components, including other furrow devices, may be connected to the seed tube using the supporting devices. In fact, the connection features of the supporting devices provide additional mounting points for various planting unit components, which allow more secured attachments and offer more flexibility for supporting and/or connecting various planting unit components to the seed tube.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the disclosure, and do not create limitations, particularly as to the position, orientation, or use of the disclosure unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. It is intended that all matter contained in the above description or shown in the accompanying drawings shall be interpreted as illustrative only and not limiting. Changes in detail or structure may be made without departing from the scope of the disclosure as defined in the appended claims.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the scope of the disclosure. Accordingly, the proper scope of the disclosure is defined by the appended claims. The various embodiments, operations, components and configurations disclosed herein are generally exemplary rather than limiting in scope.

What is claimed is:

1. A supporting device for operably connecting a furrow device to a seed tube of a planting unit for planting seeds into a furrow, the supporting device comprising:
a bracket assembly including a clip;
the clip engaging the furrow device and the seed tube, wherein the clip is at least partially positioned inside the seed tube and is positioned through an aperture formed in the furrow device, with the clip at least partially engaging a top surface of the furrow device; and
further comprising a supplementary clip positioned on the seed tube and spaced away from an end of the seed tube, the supplementary clip including side flanges defining a notch in each side flange, wherein a portion of the furrow device is positioned in the supplementary clip and between the side flanges.

2. A supporting device according to claim 1, wherein the clip applies a clamping load between the furrow device and the seed tube.

3. A supporting device according to claim 2, wherein:
the seed tube defines at least one protrusion extending outwardly therefrom;
the furrow device defines at least one feature that receives the at least one protrusion; and
the clamping load created by the clip resists disengagement of the furrow device from the at least one protrusion.

4. A supporting device according to claim 3, wherein the clip includes a load member, the load member applying a load directly or indirectly to the seed tube to create the clamping load between the load member and the clip that is at least partially positioned inside the seed tube.

5. A supporting device according to claim 4, wherein the load member applies a load directly to the seed tube, which creates the clamping load.

6. A supporting device according to claim 4, wherein the load member applies a load directly to the furrow device, which in turn applies a load to the seed tube, which creates the clamping load.

7. A supporting device according to claim 4, wherein:
the clip defines an aperture;
the load member is a pin positioned in the aperture; and
the clamping load is created by adjusting the pin within the aperture to force the pin into operable engagement with the seed tube.

8. A supporting device according to claim 7, wherein the pin directly contacts the seed tube.

9. A supporting device according to claim 7, wherein the pin directly contacts the furrow device.

10. A supporting device according to claim 4, wherein:
a supplemental bracket is positioned on the seed tube, the supplemental bracket defining a protrusion;
the furrow device receives the protrusion mounted on the supplemental bracket; and
the clamping load created by the clip resists the furrow device disengaging from the protrusion positioned on the supplemental bracket.

11. A supporting device according to claim 1, wherein:
the clip includes an upper leg and a lower leg;
the upper leg engages the top surface of the furrow device; and
the lower leg is at least partially received inside the seed tube and engages an inner wall of a top surface of the seed tube.

12. A supporting device according to claim 1, further comprising a circumferential fastener positioned around the seed tube, the furrow device, and the supplemental clip.

13. A supporting device according to claim 1, wherein the clip and the supplementary clip together assist in aligning the furrow device to extend generally in line with an axis defined by the seed tube.

14. A supporting device for operably connecting a furrow device to a seed tube of a planting unit for planting seeds into a furrow, the supporting device comprising:
a bracket assembly including:
a clip that engages the furrow device and the seed tube, wherein the clip is at least partially positioned inside the seed tube and the clip at least partially engages a top surface of the furrow device, wherein the clip applies a clamping load between the furrow device and the seed tube and includes a load member, the load member applying a load directly or indirectly to the seed tube to create a clamping force between the load member and a portion of the clip positioned inside the seed tube; and
a retainer that engages the furrow device and resists movement of the furrow device, with the clip and the retainer being separate elements, wherein the seed tube defines at least one protrusion extending outwardly therefrom and the furrow device defines at least one feature that receives the at least one protrusion; the clamping load created by the clip resists disengagement of the furrow device from the at least one protrusion; and a supplemental bracket is positioned on the seed tube, the supplemental bracket defining a protrusion and the furrow device receives the protrusion mounted on the supplemental bracket, with the clamping force created by the clip resisting the furrow device disengaging from the protrusion positioned on the supplemental bracket.

15. A supporting device according to claim 14, wherein the clip is positioned through an aperture formed in the furrow device.

16. A supporting device for operably connecting a furrow device to a seed tube of a planting unit for planting seeds into a furrow, the supporting device comprising:
a bracket assembly including a clip that defines an aperture and includes a load member that is a pin positioned in the aperture;

the clip engaging the furrow device and the seed tube and applying a clamping load between the furrow device and the seed tube, wherein the clip is at least partially positioned inside the seed tube and is positioned through an aperture formed in the furrow device, with the clip at least partially engaging a top surface of the furrow device, wherein the seed tube defines at least one protrusion extending outwardly therefrom; the furrow device defines at least one feature that receives at least one protrusion; and the clamping load created by the clip resists disengagement of the furrow device from the at least one protrusion and the load member applies a load directly or indirectly to the seed tube to create the clamping load between the load member and the clip that is at least partially positioned inside the seed tube wherein the clamping load is created by adjusting the pin within the aperture to force the pin into operable engagement with the seed tube and the pin directly contacts the furrow device.

17. A supporting device according to claim 16, wherein the load member applies a load directly to the seed tube, which creates the clamping load.

18. A supporting device according to claim 16, wherein the load member applies a load directly to the furrow device, which in turn applies a load to the seed tube, which creates the clamping load.

19. A supporting device according to claim 16, wherein the pin directly contacts the seed tube.

20. A supporting device according to claim 16, wherein:
a supplemental bracket is positioned on the seed tube, the supplemental bracket defining a protrusion;
the furrow device receives the protrusion mounted on the supplemental bracket; and
the clamping load created by the clip resists the furrow device disengaging from the protrusion positioned on the supplemental bracket.

21. A supporting device according to claim 16, wherein:
the clip includes an upper leg and a lower leg;
the upper leg engages the top surface of the furrow device; and
the lower leg is at least partially received inside the seed tube and engages an inner wall of a top surface of the seed tube.

22. A supporting device according to claim 16, further comprising a supplementary clip positioned on the seed tube and spaced away from an end of the seed tube, the supplementary clip including side flanges defining a notch in each side flange, wherein a portion of the furrow device is positioned in the supplementary clip and between the side flanges.

23. A supporting device according to claim 22, further comprising a circumferential fastener positioned around the seed tube, the furrow device, and the supplemental clip.

24. A supporting device according to claim 16, wherein the clip and the supplementary clip together assist in aligning the furrow device to extend generally in line with an axis defined by the seed tube.

25. A supporting device for operably connecting a furrow device to a seed tube of a planting unit for planting seeds into a furrow, the supporting device comprising:
a bracket assembly including a clip that includes a load member;
the clip engaging the furrow device and the seed tube and applying a clamping load between the furrow device and the seed tube, wherein the clip is at least partially positioned inside the seed tube and is positioned through an aperture formed in the furrow device, with the clip at least partially engaging a top surface of the furrow device, wherein the seed tube defines at least one protrusion extending outwardly therefrom; the furrow device defines at least one feature that receives at least one protrusion; and the clamping load created by the clip resists disengagement of the furrow device from at least one protrusion and the load member applies a load directly or indirectly to the seed tube to create the clamping load between the load member and the clip that is at least partially positioned inside the seed tube, wherein:
a supplemental bracket is positioned on the seed tube, the supplemental bracket defining a protrusion; the furrow device receives the protrusion mounted on the supplemental bracket; and the clamping force created by the clip resists the furrow device disengaging from the protrusion positioned on the supplemental bracket.

26. A supporting device according to claim 25, wherein the load member applies a load directly to the seed tube, which creates the clamping load.

27. A supporting device according to claim 25, wherein the load member applies a load directly to the furrow device, which in turn applies a load to the seed tube, which creates the clamping load.

28. A supporting device according to claim 25, wherein:
the clip defines an aperture;
the load member is a pin positioned in the aperture; and
the clamping load is created by adjusting the pin within the aperture to force the pin into operable engagement with the seed tube.

29. A supporting device according to claim 28, wherein the pin directly contacts the seed tube.

30. A supporting device according to claim 28, wherein the pin directly contacts the furrow device.

31. A supporting device according to claim 25, wherein:
the clip includes an upper leg and a lower leg;
the upper leg engages the top surface of the furrow device; and
the lower leg is at least partially received inside the seed tube and engages an inner wall of a top surface of the seed tube.

32. A supporting device according to claim 25, further comprising a circumferential fastener positioned around the seed tube, the furrow device, and a supplemental clip.

33. A supporting device according to claim 32, wherein the clip and the supplementary clip together assist in aligning the furrow device to extend generally in line with an axis defined by the seed tube.

* * * * *